United States Patent
Sakano et al.

(10) Patent No.: US 8,917,341 B2
(45) Date of Patent: Dec. 23, 2014

(54) SOLID-STATE IMAGE PICKUP APPARATUS, DRIVING METHOD FOR SOLID-STATE IMAGE PICKUP APPARATUS AND ELECTRONIC DEVICE

(75) Inventors: Yorito Sakano, Kanagawa (JP); Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 779 days.

(21) Appl. No.: 13/027,351

(22) Filed: Feb. 15, 2011

(65) Prior Publication Data

US 2011/0211103 A1     Sep. 1, 2011

(30) Foreign Application Priority Data

Feb. 26, 2010   (JP) .................................. 2010-041413
Mar. 24, 2010   (JP) .................................. 2010-068506

(51) Int. Cl.
H04N 5/335       (2011.01)
H01L 27/146      (2006.01)
H04N 5/355       (2011.01)
H04N 5/3745      (2011.01)

(52) U.S. Cl.
CPC ......... H04N 5/3559 (2013.01); H04N 5/37452 (2013.01)
USPC ....................................... 348/308; 250/208.1

(58) Field of Classification Search
CPC ..... H04N 5/378; H04N 5/335; H04N 5/3575; H04N 5/3745; H04N 3/155; H01L 27/14643; H01L 27/14689; H01L 27/14616
See application file for complete search history.

(56) References Cited

U.S. PATENT DOCUMENTS

| | | | |
|---|---|---|---|
| 6,091,793 A | 7/2000 | Kamashita | |
| 6,317,154 B2 * | 11/2001 | Beiley | 348/308 |
| 7,408,210 B2 * | 8/2008 | Ogura et al. | 257/233 |
| 7,800,673 B2 * | 9/2010 | Sugawa et al. | 348/308 |
| 7,821,560 B2 * | 10/2010 | Sugawa et al. | 348/308 |
| 2003/0076431 A1 | 4/2003 | Krymski | |
| 2004/0041077 A1 | 3/2004 | Fossum | |
| 2006/0022166 A1 | 2/2006 | Wilson et al. | |
| 2007/0221823 A1 * | 9/2007 | Xu et al. | 250/208.1 |
| 2009/0045319 A1 * | 2/2009 | Sugawa et al. | 250/208.1 |
| 2009/0251582 A1 | 10/2009 | Oike | |

FOREIGN PATENT DOCUMENTS

| | | |
|---|---|---|
| EP | 1868377 | 12/2007 |
| JP | 2000-165755 | 6/2000 |
| JP | 2005-005573 | 1/2005 |
| JP | 2006-217410 | 8/2006 |
| JP | 2006-245522 | 9/2006 |
| JP | 2006-246450 | 9/2006 |
| JP | 3874135 | 11/2006 |
| JP | 2008-028678 | 2/2008 |

(Continued)

OTHER PUBLICATIONS

European Search Report corresponding to European Serial No. 11154881 dated May 20, 2011.

(Continued)

Primary Examiner — Luong T Nguyen
(74) Attorney, Agent, or Firm — Dentons US LLP

(57) ABSTRACT

A solid-state imaging device with a photodiode, a first charge accumulation region electronically connected to the photodiode, a second charge accumulation region electronically connected to the photodiode, where a charge generated in the photodiode is distributed into the first charge accumulation region and the second charge accumulation region based on an amount of charge.

16 Claims, 48 Drawing Sheets

(56) References Cited

FOREIGN PATENT DOCUMENTS

| JP | 2008-546201 | 12/2008 |
| JP | 2009-194764 | 8/2009 |
| JP | 2009-268083 | 11/2009 |
| WO | WO 2011/096340 A1 | 8/2001 |
| WO | WO 2005/083790 A1 | 9/2005 |

OTHER PUBLICATIONS

Japanese Office Action issued in connection with related Japanese Patent Application No. 2010-068506 dated Oct. 29, 2013.

* cited by examiner

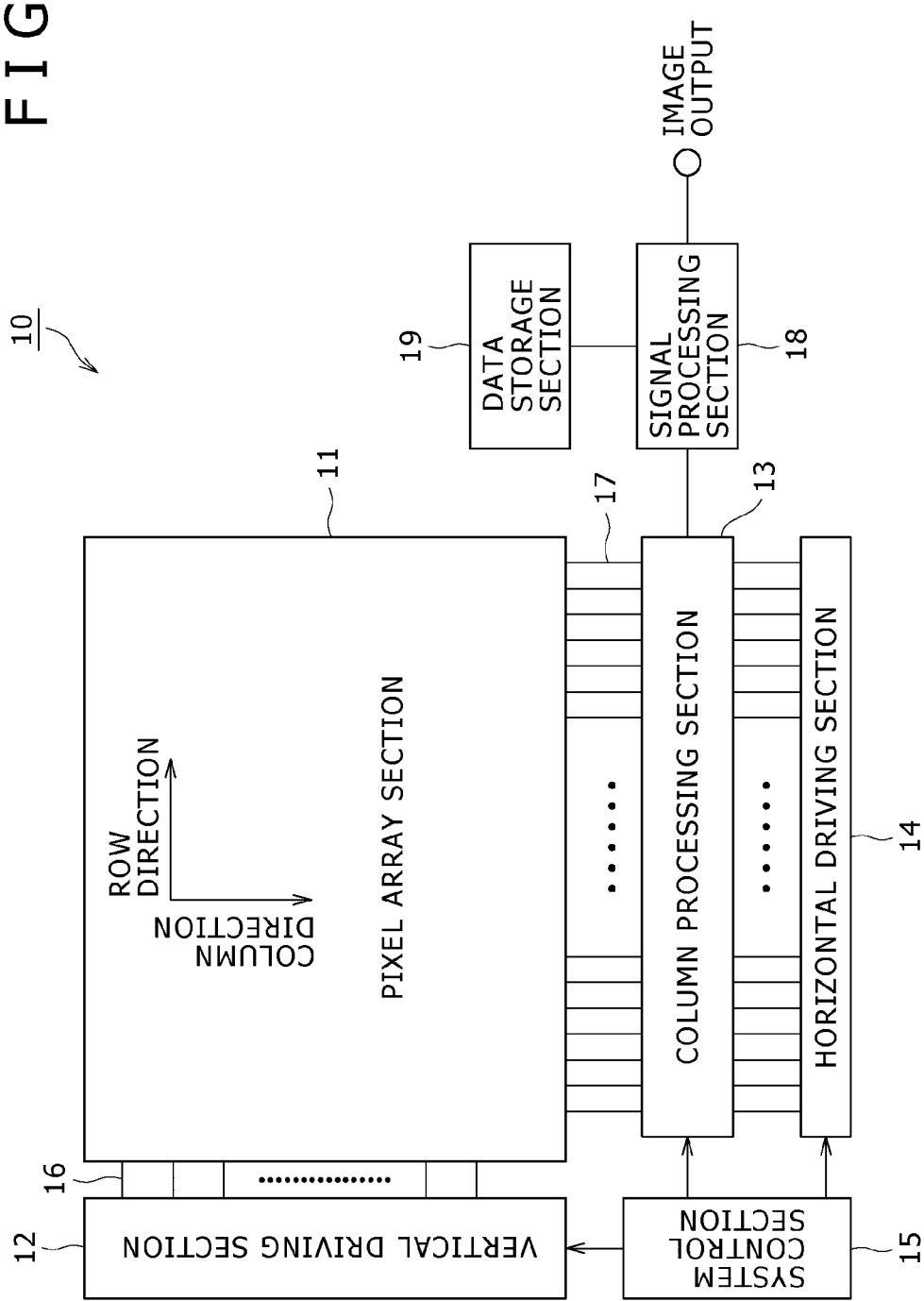

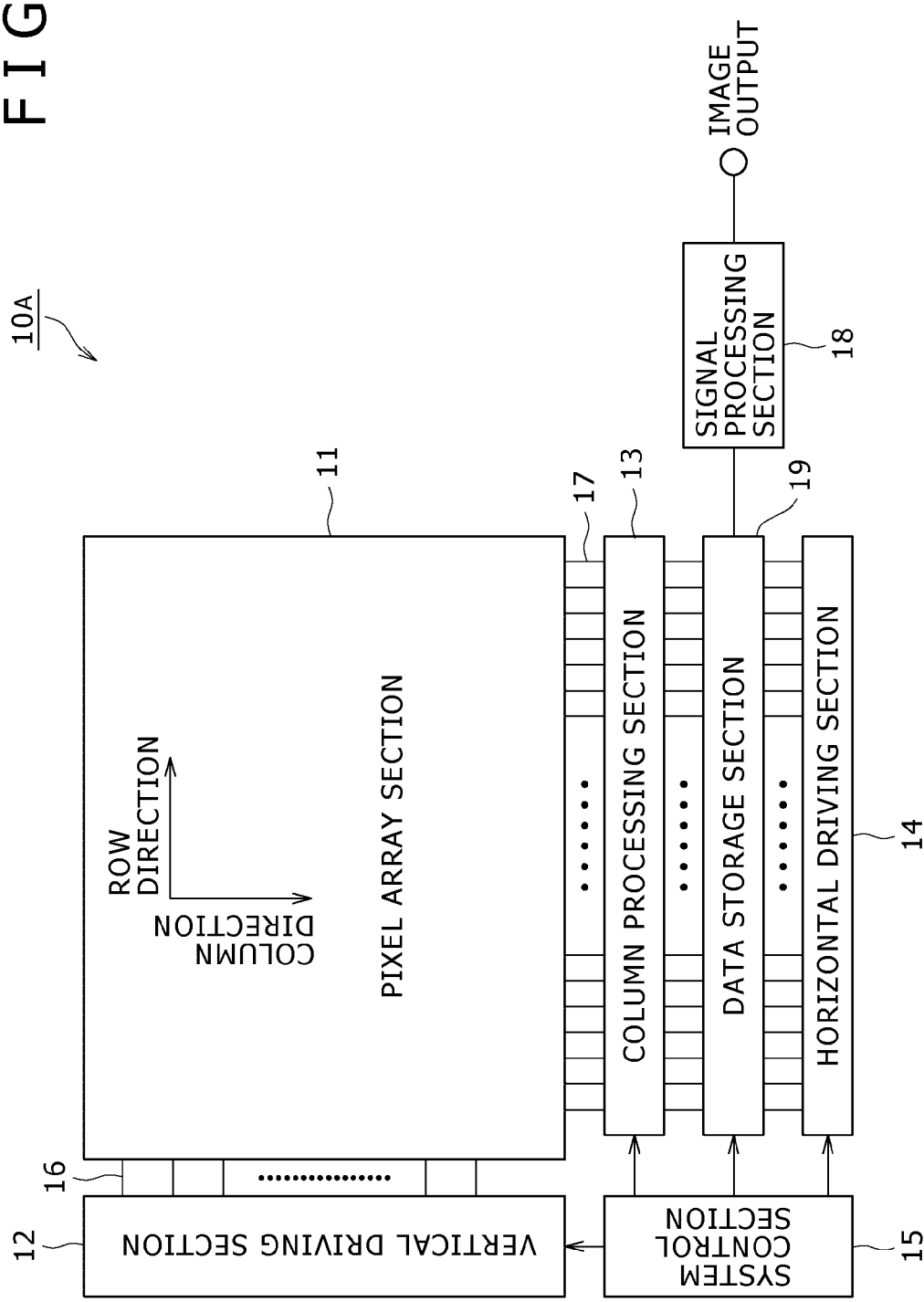

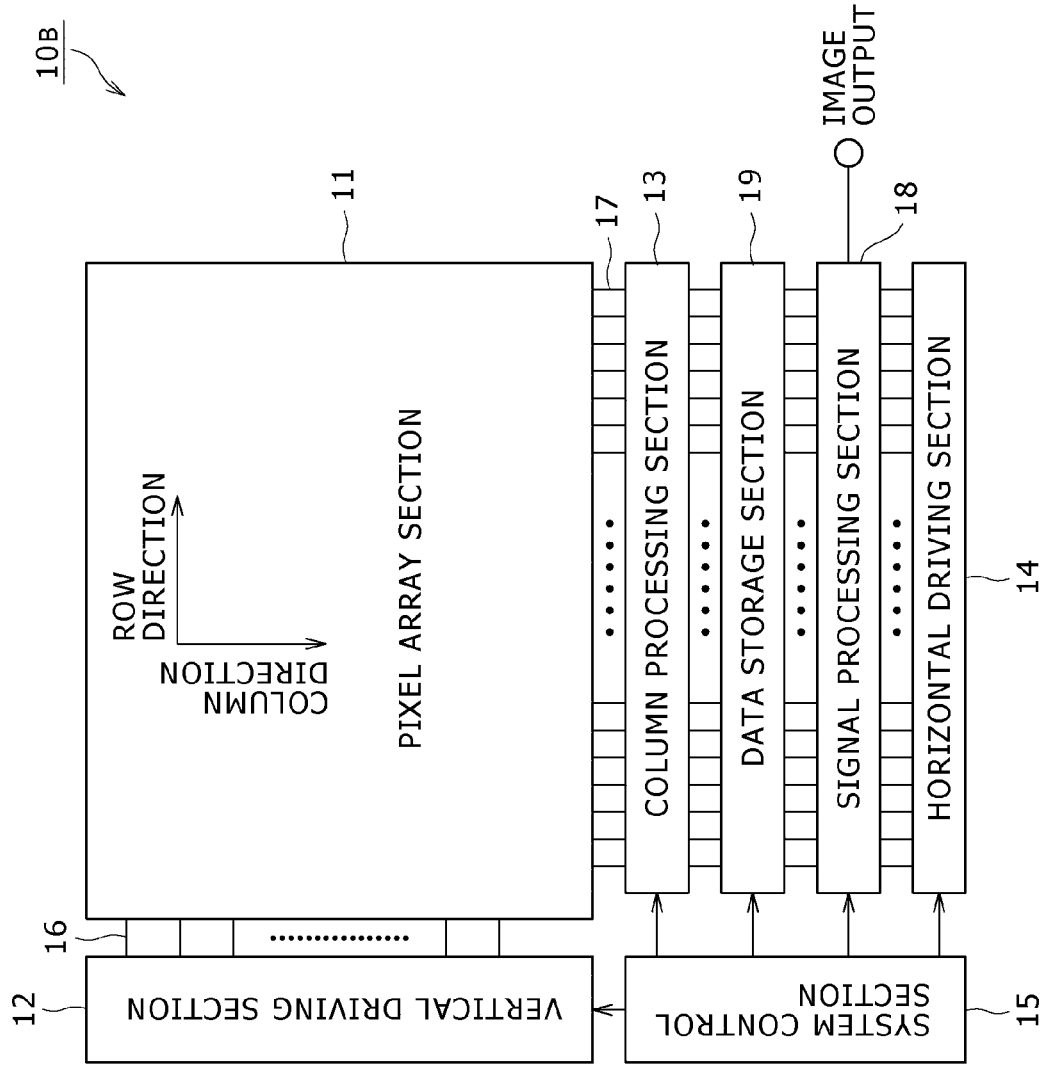

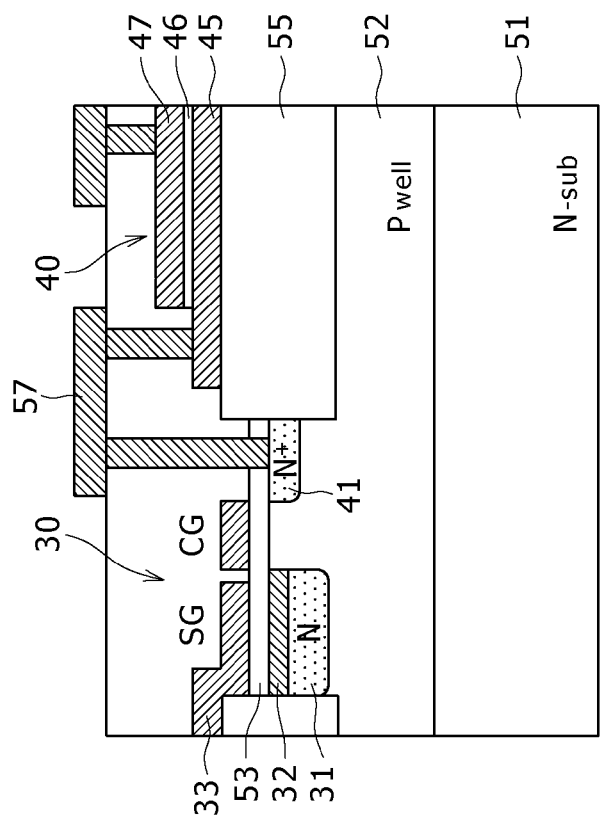
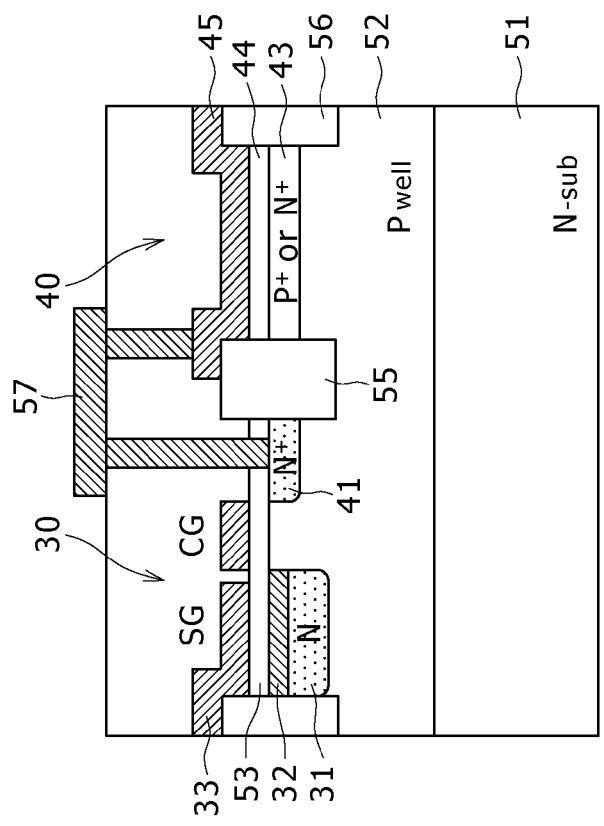

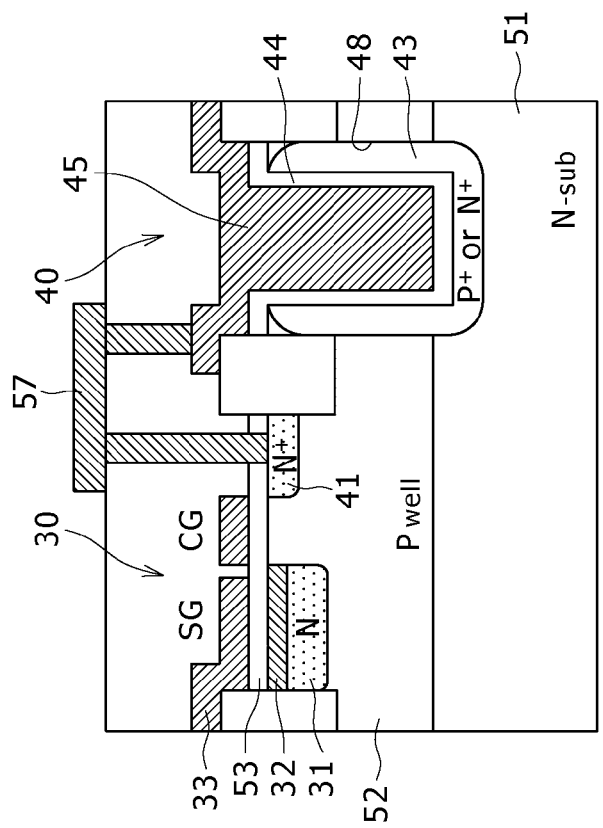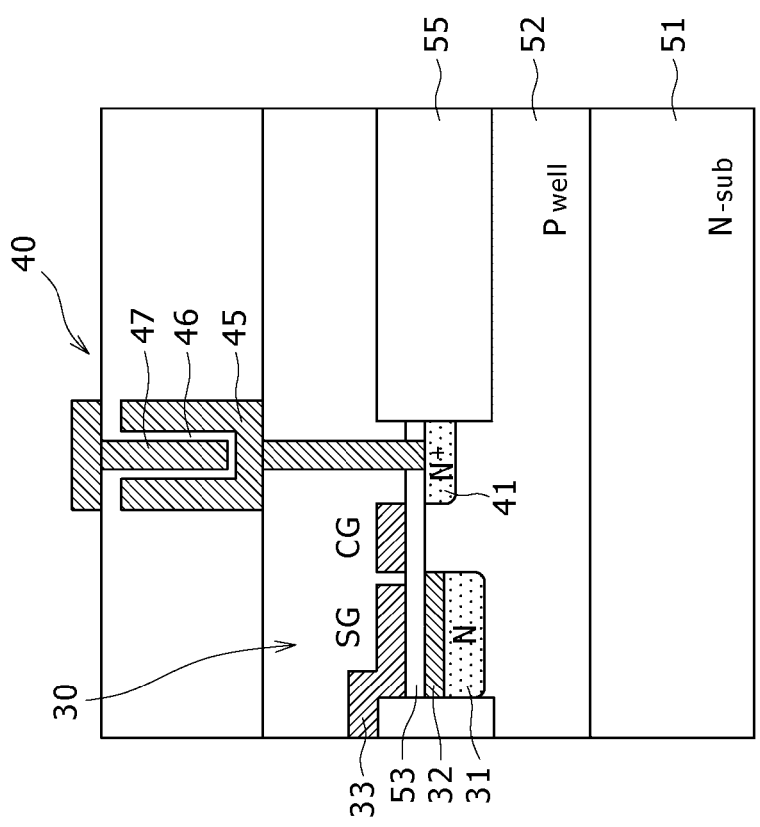
FIG.7A
FIG.7B

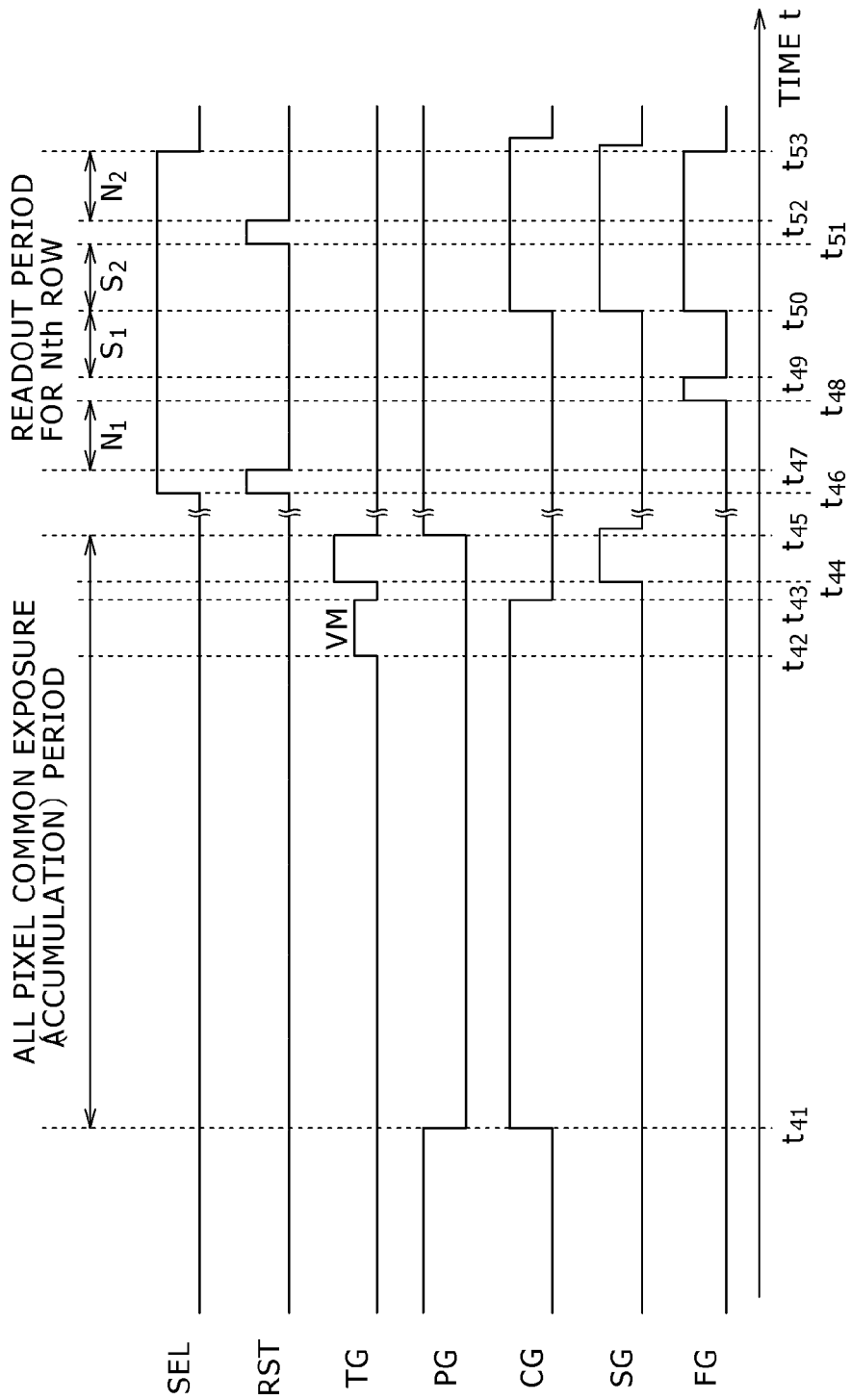

SOLID-STATE IMAGE PICKUP APPARATUS, DRIVING METHOD FOR SOLID-STATE IMAGE PICKUP APPARATUS AND ELECTRONIC DEVICE

RELATED APPLICATION DATA

The present application contains subject matter related to that disclosed in Japanese Priority Patent Application JP 2010-068506 filed with the Japan Patent Office on Mar. 24, 2010 and Japanese Priority Patent Application JP 2010-041413 filed with the Japan Patent Office on Feb. 26, 2010, the entire contents of which are hereby incorporated by reference.

BACKGROUND OF THE INVENTION

This invention relates to a solid-state image pickup apparatus, a driving method for a solid-state image pickup apparatus and an electronic device.

A solid-state image pickup apparatus such as a CMOS (Complementary Metal Oxide Semiconductor) image sensor which is a kind of solid-state image pickup apparatus of the X-Y address type carries out operation of sequentially scanning photocharge generated by and accumulated in a photoelectric conversion portion for each pixel or for each row. In this sequential scanning, where a rolling shutter is used as an electronic shutter, the start time and the end time of exposure for accumulating photocharge cannot be made coincide among all pixels. Therefore, the sequential scanning has a problem in that, upon image pickup of an image pickup object which is moving, a picked up image suffers from distortion.

For image pickup of an image pickup object moving at a high speed which cannot permit image distortion of the type described or for sensing applications which require simultaneity of a picked up image, a global shutter which executes starting of exposure and ending of exposure at the same timings with regard to all pixels in a pixel array is adopted as an electronic shutter. In order to implement the global shutter an embedded MOS (Metal Oxide Semiconductor) capacitor is provided as a region for accumulating photocharge, that is, as a charge accumulation portion, separately from a photodiode which is a photoelectric conversion portion, as disclosed in Japanese Patent No. 3874135 (hereinafter referred to as Patent Document 1).

However, in order for the embedded MOS capacitor to accept, upon global shutter operation, all photocharge generated by photoelectric conversion by and accumulated in the photodiode, the embedded MOS capacitor has to have a saturation charge amount greater than that of the photodiode. Conversely speaking, where the unit pixel size is same, the area of the photodiode is reduced significantly due to the presence of the embedded MOS capacitor in the unit pixel. Therefore, there is a problem that the saturation charge amount of the photodiode is reduced.

As a countermeasure, a technique that photocharge generated by photoelectric conversion in the photodiode is accumulated in both of the photodiode and the embedded MOS capacitor has been proposed and is disclosed in Japanese Patent Laid-Open No. 2009-268083 (hereinafter referred to as Patent Document 2). According to this related art, the saturation charge amount is equal to the sum of the saturation charge amount of the photodiode and the saturation charge amount of the embedded MOS capacitor.

However, the related art disclosed in Patent Document 2 is significantly inferior in terms of the saturation charge amount if it is compared with a CMOS image sensor which does not have the global shutter function. This is because, in order to achieve the global exposure, it is necessary to additionally provide not only a charge accumulation portion, which is, in the related art, the embedded MOS capacitor, but also a transistor in the unit pixel.

Separately from the related art which achieves global exposure described above, also it can be imagined readily to use not an embedded MOS capacitor but a capacitor having a higher capacitance value per unit area as the charge accumulation portion. However, a capacitor having a higher capacitance value per unit area generally exhibits high leak current, and this makes a problem that deterioration of properties at dark such as dark current or white spots becomes conspicuous.

Therefore, it is desirable to provide a solid-state image pickup apparatus which can assure an increased saturation charge amount without deterioration of the picture quality of a picked up image at dark or in a low illuminance state, a driving method for the solid-state image pickup apparatus and an electronic device which includes the solid-state image pickup apparatus.

SUMMARY

The present invention provides a solid-state imaging device comprising a photodiode, a first charge accumulation region electronically connected to the photodiode, a second charge accumulation region electronically connected to the photodiode, where a charge generated in the photodiode is distributed into the first charge accumulation region and the second charge accumulation region based on an amount of charge.

In another embodiment, the first charge accumulation region has a different capacitance than that of the second charge accumulation region.

In another embodiment, the second charge accumulation region has a capacitance higher than that of the first charge accumulation region.

In another embodiment, the solid-state imaging includes a floating diffusion region, a first transfer unit in electrical communication with the photodiode and the first charge accumulation region, a second transfer unit in electrical communication with the first charge accumulation unit and the floating diffusion region, and a third transfer unit in electrical communication with the second charge accumulation region and the floating diffusion region.

In another embodiment, the first transistor unit has an overflow path along which a photocharge exceeding a predetermined amount is transferred.

In another embodiment, the solid-state imaging device includes a reset line, a reset unit in electrical communication with the floating diffusion region and the reset line, a signal line, an amplifying unit in electrical communication with the floating diffusion and the signal line, and a selection unit in electrical communication with the amplifying unit and the signal line.

In another embodiment, the solid-state imaging device includes a fourth transfer unit in electrical communication with the photodiode, the third transfer unit and the second charge accumulation region.

In another embodiment, the solid-state imaging device includes a first transfer unit in electrical communication with the photodiode and the first charge accumulation region, a floating diffusion region, a second transfer unit in electrical communication with the first charge accumulation region and the floating diffusion, and a third transfer unit in electrical communication with the first charge accumulation region and the second charge accumulation region.

In another embodiment, the solid-state imaging device includes a reset line, a reset unit in electrical communication with the second charge accumulation region and the reset line, a signal line, an amplifying unit in electrical communication with the floating diffusion and the signal line, and a selection unit in electrical communication with the amplifying unit and the signal line.

In another embodiment, the first charge accumulation region is an embedded MOS capacitor.

In another embodiment, the second charge accumulation region is a stack type capacitor.

In another embodiment, a charge in a low state is accumulated in the first charge accumulation region.

In another embodiment, a charge in a high state is accumulated in the at least the second charge accumulation region.

Another embodiment consistent with the present invention provides an electronic apparatus including (a) a photodiode, (b) a first charge accumulation region electrically connected to the photodiode and (c) a second charge accumulation region electrically connected to the photodiode where a charge generated in the photodiode is distributed into the first charge accumulation region and the second charge accumulation region based on an amount of charge.

In another embodiment, the electronic apparatus includes a lens unit positioned in front of the solid state imaging device.

In another embodiment, the electronic apparatus is included in a camera.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention.

In the drawings:

FIG. 1 depicts a block diagram showing a general system configuration of a CMOS image sensor that is consistent with the present invention;

FIGS. 2 and 3 depict block diagrams showing different general configurations of the CMOS image sensor that are consistent with the present invention;

FIGS. 6A and 6B depict schematic sectional views of different examples of a configuration of a second charge accumulation portion that are consistent with the present invention;

FIGS. 7A and 7B depict schematic sectional views of different examples of a configuration of the second charge accumulation portion that are consistent with the present invention;

FIG. 24 depicts a timing chart illustrating circuit operation of the unit pixel that is consistent with the present invention;

DETAILED DESCRIPTION OF THE PREFERRED EMBODIMENT

Figure 4B:
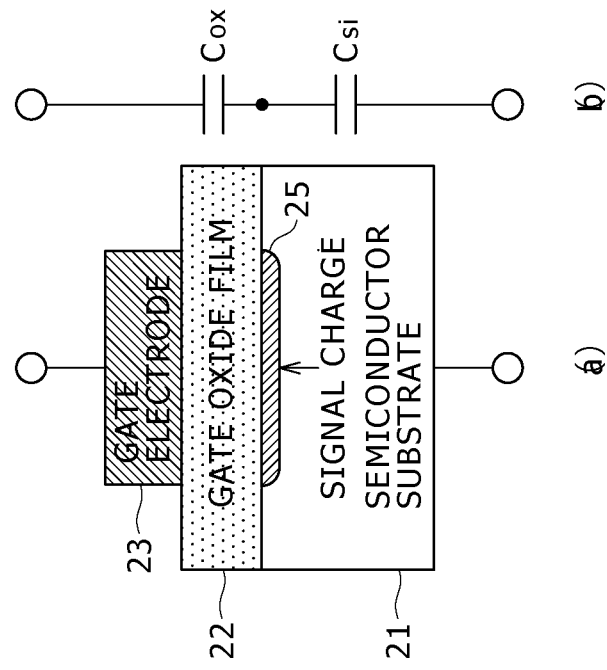
FIGS. 4A and 4B depict views showing an embedded MOS capacitor and a surface type MOS capacitor, respectively.

1. Solid-State Image Pickup Apparatus to which the Present Invention is Applied In the solid-state image pickup apparatus consistent with the present invention, an embedded MOS capacitor is used as the first charge accumulation portion and a capacitor having a capacitance value per unit area higher than that of the first charge accumulation portion is used as the second charge accumulation portion, resulting in the total capacitance value of the charge accumulation portions can be increased. Here, the reason why the total capacitance value of the charge accumulation portions can be increased is described below using numerical value examples.

For example, it is assumed to form a capacitor of an area of 1 $\mu m^2$. If it is assumed that the capacitance value per unit area of the first charge accumulation portion is 1 fF/$\mu m^2$ while the capacitance value per unit area of the second charge accumulation portion is 10 fF/$\mu m^2$ and the entire capacitor of the area of 1 $\mu m^2$ is formed from the first charge accumulation portion, then the capacitance value of the capacitor of the area of 1 $\mu m^2$ is 1 fF.

At this time, if one half of the area of 1 $\mu m^2$ is replaced by the second charge accumulation portion, then the capacitance value of the capacitor of the area of 1 $\mu m^2$ is 5.5 fF (=½ $\mu m^2$×1 fF+½ $\mu m^2$×10 fF). In particular, if the half area is replaced by the second charge accumulation portion, then the capacitance value of the capacitor of the area of 1 $\mu m^2$ is 5.5 times that in the case in which the half area is not replaced.

Further, if three fourths of the area of 1 $\mu m^2$ are replaced by the second charge accumulation portion, then the capacitance value of the capacitor of the area of 1 $\mu m^2$ is 7.75 fF, which is 7.75 times that in the case in which three fourths are not replaced. Further, where one half of the area of 1 $\mu m^2$ is replaced by the second charge accumulation portion, if the capacitance value per unit area of the second charge accumulation portion is 20 fF/$\mu m^2$, then the capacitance value of the capacitor of the area of 1 $\mu m^2$ is 10.5 fF, which is 10.5 times that in the case in which one half is not replaced.

On the other hand, a capacitor having a high capacitance value per unit area generally exhibits a great amount of leak current, and there is a problem that the second charge accumulation portion exhibits conspicuous deterioration of properties at dark such as dark current or white spots. Therefore, photocharge in a low illuminance state in which the charge amount to be handled is small is accumulated into the first charge accumulation portion. Since the first charge accumulation portion is formed from a capacitor of the embedded type, it is less likely to be influenced by the interference level, a defect or the like and is good in property at dark in comparison with the second charge accumulation portion.

Meanwhile, photocharge in a high illuminance state in which the charge amount to be handled is great is accumulated into both of the first and second charge accumulation portions. In a high illuminance state in which the handled charge amount is great, a high S/N ratio can be assured, and therefore, the first and second charge accumulation portions are less likely to be influenced by properties in dark such as dark current or white spots. Accordingly, even if photocharge in a high illuminance state is accumulated into the second charge accumulation portion which exhibits a comparatively great amount of leak current, the influence on the picture quality is very little.

As apparent from the foregoing description, by using an embedded MOS capacitor as the first charge accumulation portion and using a capacitor having a capacitance value per unit area higher than that of the first charge accumulation portion as the second charge accumulation portion, the total capacitance value of the charge accumulation portions can be increased. Besides, by accumulating photocharge in a low illuminance state into the first charge accumulation portion, which has good properties at dark, but accumulating photocharge in a high illuminance state into the second charge accumulation portion which is not good in property at dark, the picture quality of a picked up image at dark and in a low illuminance state is not deteriorated from that of the prior art which implements the global exposure.

In summary, with the solid-state image pickup apparatus, when global exposure which is suitable for use with image pickup of an image pickup object which moves at a high speed is carried out, a greater saturation charge amount can be assured without deteriorating the picture quality of an image picked up at dark or in a low illuminance state.

1-1. Basic System Configuration

FIG. 1 shows a general configuration of a solid-state image pickup apparatus to which the present invention is applied, for example, a CMOS image sensor which is a kind of solid-state image pickup apparatus of the X-Y address type. The CMOS image sensor is an image sensor produced by applying, or partly applying, a CMOS process.

Referring to FIG. 1, the CMOS image sensor 10 according to the present embodiment includes a pixel array section 11 formed on a semiconductor substrate or chip not shown, and a peripheral circuit section integrated on the semiconductor substrate on which the pixel array section 11 is formed. The peripheral circuit section includes a vertical driving section 12, a column processing section 13, a horizontal driving section 14 and a system control section 15.

The CMOS image sensor 10 further includes a signal processing section 18 and a data storage section 19. The signal processing section 18 and the data storage section 19 may be mounted on the substrate on which the CMOS image sensor 10 is mounted or on another substrate different from the substrate on which the CMOS image sensor 10 is mounted. Processing carried out by the signal processing section 18 and the data storage section 19 may be carried out otherwise by an external signal processing section provided on a substrate different from that on which the CMOS image sensor 10 is mounted such as a DSP (Digital Signal Processor) circuit or by software.

The pixel array section 11 is configured such that a plurality of unit pixels each having a photoelectric conversion portion for generating and accumulating photocharge corresponding to the amount of light received thereby are disposed two-dimensionally in a row direction and a column direction, that is, in a matrix. It is to be noted that a unit pixel is sometimes referred to simply as pixel. The row direction signifies an arrangement direction of pixels in a pixel row, that is, a horizontal direction, and the column direction is an arrangement direction of pixels in a pixel column, that is, a vertical direction. A particular circuit configuration of a unit pixel and details of a pixel structure are hereinafter described.

In the pixel array section 11, a pixel driving line 16 is wired in a row direction for each pixel row for the pixel array of a matrix, and a vertical signal line 17 is wired in a column direction for each pixel column. The pixel driving line 16 transmits a driving signal for carrying out driving when a signal is to be read out from the pixels. While the pixel driving line 16 in FIG. 1 is shown as one wiring line, the number of such pixel driving lines 16 is not limited to one. The pixel driving line 16 is connected at one end thereof to an output terminal corresponding to each row of the vertical driving section 12.

The vertical driving section 12 is configured from a shift register, an address decoder or the like and drives the pixels of the pixel array section 11 at the same time or in a unit of a row or the like. In particular, the vertical driving section 12 cooperates with the system control section 15, which controls the vertical driving section 12, to configure a driving section for driving the pixels of the pixel array section 11. Although a particular configuration of the vertical driving section 12 is not shown, it is generally configured such that it includes two scanning systems including a readout scanning system and a sweep-out scanning system.

The readout scanning system selectively scans the unit pixels of the pixel array section 11 successively in a unit of row in order to read out a signal from the unit pixels. The signal read out from a unit pixel is an analog signal. The sweep-out scanning system carries out sweep-out scanning for a readout row, whose readout scanning is to be carried out by the readout scanning system, preceding by a period of time of the shutter speed to the readout scanning.

By the sweep-out scanning by the sweep-out scanning system, unnecessary charge is swept out from the photoelectric conversion portions of the unit pixels of the readout row thereby to reset the photoelectric conversion portions. Then, by the sweep-out of the unnecessary charge by the sweep-out scanning system (resetting), electronic shutter operation is carried out. Here, the electronic shutter operation is operation of abandoning the photocharge of the photoelectric conversion portion and newly starting exposure, that is, starting accumulation of photocharge.

A signal read out by the readout operation by the readout scanning system corresponds to the amount of light received after immediately preceding readout operation or electronic shutter operation. Then, the period from a sweep-out timing by the immediately preceding readout operation or a readout timing by the electronic shutter operation to a readout timing by a current readout operation becomes an exposure period of photocharge to the unit pixel.

Signals outputted from the unit pixels of a pixel row selectively scanned by the vertical driving section 12 are inputted to the column processing section 13 individually through the vertical signal lines 17 for the pixel columns. The column processing section 13 carries out predetermined signal processing for the signals outputted from the pixels of the selected row through the vertical signal lines 17 for the individual pixel columns of the pixel array section 11 and temporarily stores the pixel signals after the signal processing.

In particular, the column processing section 13 carries out at least a noise removing process a CDS (Correlated Double Sampling) process as the signal processing. By the CDS process by the column processing section 13, reset noise and fixed pattern noise which is unique to the pixels such as threshold value dispersion of an amplification transistor in the pixels are removed. The column processing section 13 may have an AD (Analog-to-Digital) conversion function in addition to the noise removing process so that an analog pixel signal can be converted into and outputted as a digital signal.

The horizontal driving section 14 is configured from a shift register, an address decoder or the like and selects the unit circuits corresponding to the pixel columns of the column processing section 13 in order. By the selective scanning by the horizontal driving section 14, the pixel signals after processed for each unit pixel circuit by the column processing section 13 are outputted in order.

The system control section 15 is configured from a timing generator which generates various timing signals or the like and carries out driving control of the vertical driving section 12, column processing section 13, horizontal driving section 14 and so forth based on the various timings generated by the timing generator.

The signal processing section 18 has at least a calculation processing function and carries out various kinds of signal processing such as a calculation process for a pixel signal outputted from the column processing section 13. The data storage section 19 temporarily stores data necessary for a process by the signal processing section 18 so as to allow the signal processing section 18 to carry out the process.

The CMOS image sensor 10 having the configuration described above adopts global exposure of executing starting of exposure and ending of exposure at the same timings for all pixels in the pixel array section 11. This global exposure is executed under the driving by the driving section including the vertical driving section 12 and the system control section 15. A global shutter function of implementing the global exposure is shutter operation suitable for use for sensing applications which require image pickup of an image pickup object which moves at a high speed or simultaneity of a picked up image.

1-2. Other System Configurations

A CMOS image sensor to which the present invention is applied is not limited to the CMOS image sensor 10 having the system configuration described above. The CMOS image sensor may have such other system configurations.

In one embodiment, the CMOS image sensor may be such a CMOS image sensor $10_A$ as shown in FIG. 2. Referring to FIG. 2, the CMOS image sensor $10_A$ has such a system configuration that the data storage section 19 is disposed on the stage next to the column processing section 13 such that pixel signals outputted from the column processing section 13 are supplied to the signal processing section 18 through the data storage section 19.

Further, the CMOS image sensor may be such a CMOS image sensor $10_B$ as shown in FIG. 3. Referring to FIG. 3, the CMOS image sensor $10_B$ has such a configuration that the column processing section 13 has an AD conversion function of carrying out AD conversion for each column or for each plurality of columns of the pixel array section 11 and the data storage section 19 and the signal processing section 18 are provided in parallel to the column processing section 13.

2. Embodiment

In order to implement the global exposure, a solid-state image pickup apparatus according to an embodiment of the present invention such as a CMOS image sensor includes first and second charge accumulation portions in each unit pixel in order to assure a greater amount of saturation charge without deteriorating the picture quality of a picked up image at dark or in a low illuminance state in comparison with the related art which implements the global exposure. Further, an embedded MOS capacitor is used as the first charge accumulation portion while a capacitor having a higher capacitance value per unit area than that of the first charge accumulation portion is used as the second charge accumulation portion.

Preferably, the first charge accumulation portion and the second charge accumulation portion have a magnitude relationship of the saturation charge amounts set in the following manner. In other words, the first charge accumulation portion preferably has a saturation charge amount smaller than that of the photoelectric conversion portion.

When the saturation charge amount of the first charge accumulation portion is set smaller than the saturation charge amount of the photoelectric conversion portion, the deficient amount is compensated for by the second charge accumulation portion. Accordingly, the second charge accumulation portion has to have a saturation charge amount with which the sum of the saturation charge amount of the first charge accumulation portion is higher than the saturation charge amount of the photoelectric conversion portion.

As described hereinabove, by providing the first and second charge accumulation portions in each unit pixel and using an embedded MOS capacitor as the first charge accumulation portion while using a capacitor having a capacitance value per unit area higher than that of the first charge accumulation portion as the second charge accumulation portion, the following working-effects can be achieved.

In particular, it is possible to significantly increase the capacitance value by which photocharge can be accumulated, that is, to assure a greater saturation charge amount, in comparison with an alternative case in which an embedded MOS capacitor is formed over an area same as the total area of the first charge accumulation portion and the second charge accumulation portion. Besides, an embedded MOS capacitor is used for a signal in a low illuminance state and is less likely to be influenced by the interface level, a defect or the like. Thus, in comparison with the related art which implements the global exposure, properties at dark are not deteriorated. Consequently, the picture quality of a picked up image in a low illuminance state is not deteriorated.

As a result, a CMOS image sensor which includes a global shutter function which exhibits properties similar to those of a CMOS image sensor of the same unit pixel size which does not have a global shutter function can be implemented. Further, a CMOS image sensor which achieves significant increase of the dynamic range with respect to a CMOS image sensor in the past having the same unit pixel size and a global shutter function can be implemented.

2-1. Reason why Division of the Charge Accumulation Portion can Increase the Total Capacitance Value of the Charge Accumulation Portion Where an embedded MOS capacitor is used as the first charge accumulation portion and a capacitor having a capacitance value per unit area higher than that of the first charge accumulation portion is used as the second charge accumulation portion in this manner, the total capacitance value of the charge accumulation portion can be increased. Here, the reason why the total capacitance value of the charge accumulation portion can be increased is described below using numerical value examples.

It is assumed to form a capacitor of an area of 1 $\mu m^2$. If it is assumed that the capacitance value per unit area of the first charge accumulation portion is 1 $fF/\mu m^2$ while the capacitance value per unit area of the second charge accumulation portion is 10 $fF/\mu m^2$ and the entire capacitor of the area of 1 $\mu m^2$ is formed from the first charge accumulation portion, then the capacitance value of the capacitor of the area of 1 $\mu m^2$ is 1 fF.

At this time, if one half of the area of 1 $\mu m^2$ is replaced by the second charge accumulation portion, then the capacitance value of the capacitor of the area of 1 $\mu m^2$ is 5.5 fF (=½ $\mu m^2$×1 fF+½ $\mu m^2$×10 fF). In particular, if the half area is replaced by the second charge accumulation portion, then the capacitance value of the capacitor of the area of 1 $\mu m^2$ is 5.5 times that in the case in which the half area is not replaced.

Further, if three fourths of the area of 1 $\mu m^2$ are replaced by the second charge accumulation portion, then the capacitance value of the capacitor of the area of 1 $\mu m^2$ is 7.75 fF, which is 7.75 times that in the case in which three fourths are not replaced. Further, where one half of the area of 1 $\mu m^2$ is replaced by the second charge accumulation portion, if the capacitance value per unit area of the second charge accumulation portion is 20 $fF/\mu m^2$, then the capacitance value of the capacitor of the area of 1 $\mu m^2$ is 10.5 fF, which is 10.5 times that in the case in which one half is not replaced.

On the other hand, a capacitor having a high capacitance value per unit area generally exhibits a great amount of leak current, and there is a problem that the second charge accumulation portion exhibits conspicuous deterioration of properties at dark such as dark current or white spots. Therefore, when photocharge is transferred from the photoelectric conversion portion at the same time with regard to all pixels, photocharge in a low illuminance state is accumulated into the first charge accumulation portion. Here, the "photocharge in a low illuminance state" is photocharge lower than the saturation charge amount of the first charge accumulation portion. Since the first charge accumulation portion is formed from a capacitor of the embedded type, it is less likely to be influenced by the interference level, a defect or the like and is good in property at dark in comparison with the second charge accumulation portion.

Meanwhile, photocharge in a high illuminance state is accumulated into both of the first and second charge accumulation portions. Here, the "photocharge in a high illuminance state" is photocharge which exceeds the saturation charge amount of the first charge accumulation portion. In a high illuminance state in which the handled charge amount is great, a high S/N ratio can be assured, and therefore, the first and second charge accumulation portions are less likely to be influenced by properties in dark such as dark current or white spots. Accordingly, even if photocharge in a high illuminance state is accumulated into the second charge accumulation portion which exhibits a comparatively great amount of leak current, the influence on the picture quality is very little.

As apparent from the foregoing description, by using an embedded MOS capacitor as the first charge accumulation portion and using a capacitor having a capacitance value per unit area higher than that of the first charge accumulation portion as the second charge accumulation portion, a greater saturation amount can be assured. Where the saturation charge amount may be equal, reduction of the pixel size can be achieved by an amount by which the space of the pixels can be reduced.

Besides, by accumulating, upon all pixel simultaneous readout, photocharge in a low illuminance state into the first charge accumulation portion, which has good properties at dark such as dark current or white spots, but accumulating photocharge in a high illuminance state into the second charge accumulation portion which is not good in property at dark, the picture quality of a picked up image at dark and in a low illuminance state is not deteriorated from that of the related art which implements the global exposure.

An example of the capacitor having a higher capacitance value per unit area than the first charge accumulation portion, that is, an example of the capacitor having a higher capacitance value per unit area than an embedded MOS capacitor, is a MOS capacitor of the surface type.

2-2. Capacitor Having a High Capacitance Value per Unit Area

Here, a difference between an embedded MOS capacitor which configures the first charge accumulation portion and a surface type MOS capacitor which configures the second charge accumulation portion is described.

Figure 4A:
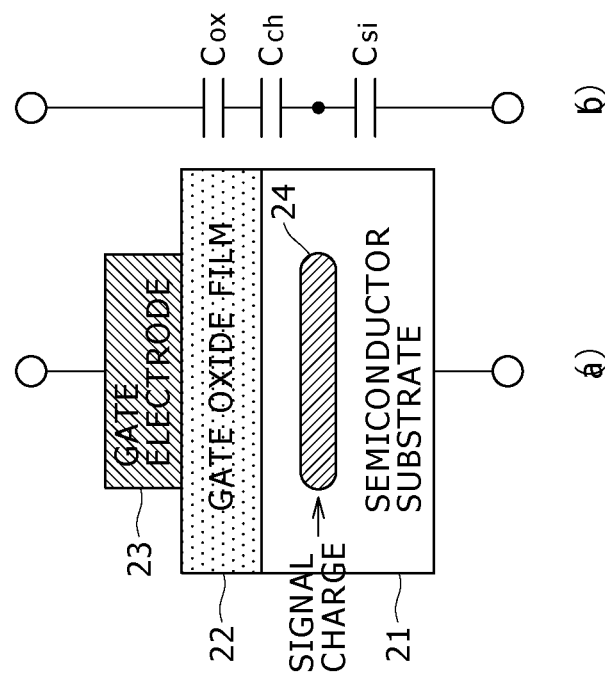

FIG. 4A shows an embedded MOS capacitor and FIG. 4B shows a surface type MOS capacitor. In FIGS. 4A and 4B, reference character (a) denotes a sectional structure of the MOS capacitor and (b) an equivalent circuit.

As seen in FIGS. 4A and 4B, both MOS capacitors include a semiconductor substrate 21 on which a gate electrode 23 is disposed with a gate oxide film 22 interposed therebetween. In the embedded MOS capacitor of FIG. 4A, a charge accumulation region 24 for accumulating signal charge is formed at a deep portion of the semiconductor substrate 21 while, in the surface type MOS capacitor of FIG. 4B, a charge accumulation region 25 is formed on a surface of the semiconductor substrate 21.

In the figure (b) of FIGS. 4A and 4B, reference character $C_{ox}$ denotes a capacitance value of the gate oxide film 22; $C_{ch}$ a capacitance value between the substrate surface and the charge accumulation region; and $C_{si}$ a capacitance value between the charge accumulation region and the substrate.

Embedded Type Capacitor

Where the capacitance value per unit area of the charge accumulation region 24 is represented by $C_b$, the capacitance value $C_b$ is represented by the following expression (1):

$$C_b = C_{ox} \cdot C_{ch} / (C_{ox} + C_{ch}) + C_{si}$$
$$= C_{ox} \cdot \{1 / (1 + C_{ox} / C_{ch})\} + C_{si} \quad (1)$$

Here, if it is assumed that the capacitance value $C_{si}$ between the charge accumulation region and the substrate is sufficiently low, then the expression (1) can be approximated by the following expression (2):

$$C_b \approx C_{ox} \cdot \{1/(1+C_{ox}/C_{ch})\} \quad (2)$$

Surface Type Capacitor

Where the capacitance value per unit area of the charge accumulation region 25 is represented by $C_s$, the capacitance value $C_s$ is represented by the following expression (3):

$$C_s = C_{ox} + C_{si} \quad (3)$$

Here, if it is assumed that the capacitance value $C_{si}$ between the charge accumulation region and the substrate is suffi-ciently low, then the capacitance value $C_s$ can be approximated by the capacitance value $C_{ox}$ of the gate oxide film 22 as represented by the following expression (4):

$$C_s \approx C_{ox} \quad (4)$$

In particular, the magnitude relationship between the capacitance value $C_b$ per unit area of the charge accumulation region 24 and the capacitance value $C_s$ per unit area of the charge accumulation region 25 is $C_b<C_s$, and by embedding the charge accumulation region into the substrate from the substrate surface, the capacitance value decreases. Conversely speaking, the capacitance value increases by bringing the charge accumulation region from the inside of the substrate toward the surface of the substrate.

Method of Increasing the Capacitance Value Per Unit Area from a Viewpoint of the Material The capacitance value $C_{ox}$ of the gate oxide film 22 per unit area is represented by the following expression (5):

$$C_{ox} = \varepsilon_{ox}/t_{ox}$$

where $\varepsilon_{ox}$ is the dielectric constant of the gate oxide film 22, and $t_{ox}$ is the film thickness of the gate oxide film 22.

Although the film thickness $t_{ox}$ of the gate oxide film 22 is important also from the viewpoint of the withstanding pressure or the leak amount, even where the film thickness is equal, if a material having a higher dielectric constant is used, then a higher capacitance value $C_{ox}$ per unit area can be obtained. The following materials can be listed as a material having a high dielectric constant:

$SiO_2$: relative dielectric constant 3.9
$Si_3N_4$: relative dielectric constant 7
$Ta_2O_5$: relative dielectric constant 26
$HfO_2$: relative dielectric constant 25
$ZrO_2$: relative dielectric constant 25

Since the product of the dielectric constant of the vacuum and the relative dielectric constant becomes the dielectric constant of each material, if the ratio in relative dielectric constant to $SiO_2$ is considered, then an increasing amount of the capacitance value per unit length can be estimated. If a surface type MOS capacitor is assumed and $Si_3N_4$ having an equal film thickness is used in place of $SiO_2$, then the capacitance value per unit area increases to 1.8 times, and if $Ta_2O_5$ is used, then the capacitance value per unit area increases to 6.7 times.

Figure 5A:
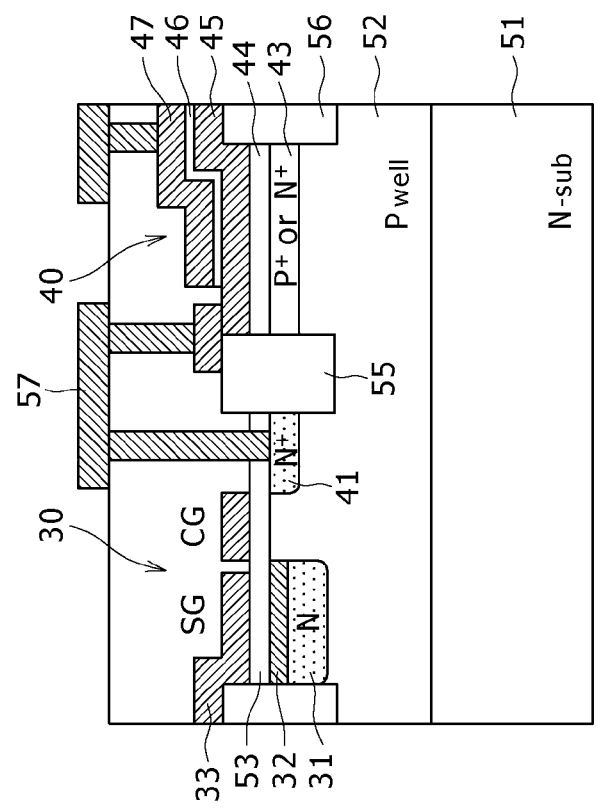
FIGS. 5A and 5B depict schematic sectional views of different combinations of a plurality of capacitor structures that are consistent with the present invention.
Figure 5B:
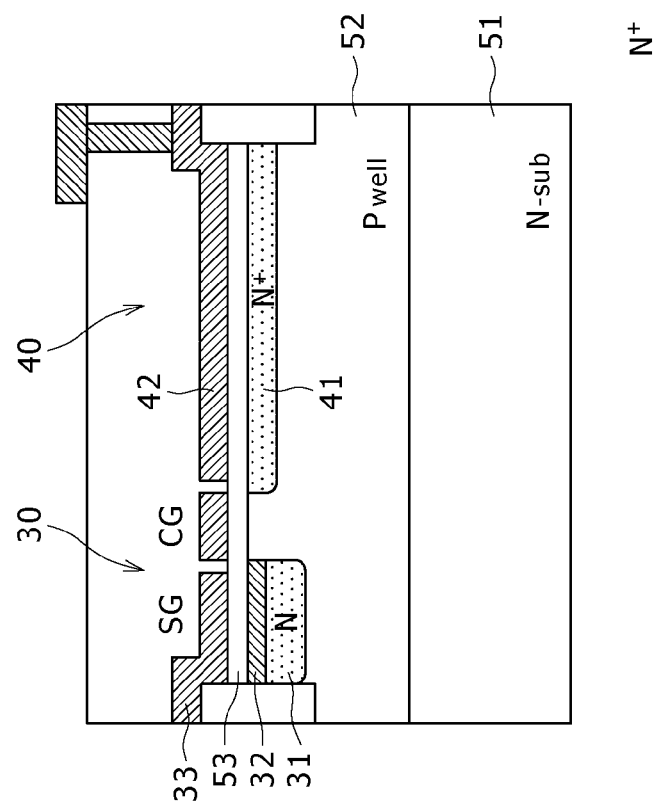

Method of Increasing the Capacitance Value Per Unit Area from a Viewpoint of the Structure Further, from a viewpoint of the structure, the capacitance value per unit area can be increased by combining a plurality of capacitor structures. Examples of the combination structure are shown in FIGS. 5A and 5B. In particular, FIG. 5A shows a structure of a combination of a planar type MOS capacitor and a junction type capacitor, and FIG. 5B shows a structure of a combination of a planar type MOS capacitor and a stack type capacitor.

First, the combination structure of FIG. 5A is described. Referring to FIG. 5A, a P-type well 52 is formed on an N-type semiconductor substrate 51. An N+ semiconductor region 41 which serves as an intermediate electrode is formed on a surface layer portion of the P-type well 52 such that a junction type MOS capacitor is formed between the N+ semiconductor region 41 and the P-type well 52 which serves as a lower electrode. Further, an upper electrode 42 is disposed on the substrate surface with an insulating film 53 interposed therebetween thereby to form a planar type MOS capacitor in parallel to the junction type MOS capacitor described above.

In short, a second charge accumulation portion 40 is formed from a parallel connection of a planar type MOS capacitor and a junction type capacitor.

Now, the combination structure of FIG. 5B is described. Referring to FIG. 5B, a first charge accumulation portion 30 is a planar type MOS capacitor same as that of the combination structure of FIG. 5A. The second charge accumulation portion 40 includes a planar type MOS capacitor in a region partitioned by element isolating insulating films 55 and 56, and a stack type capacitor is formed by a parallel connection in an upper layer.

In particular, a P+ (or N+) type semiconductor region 43 which serves as a lower electrode is formed at a surface layer portion of the P-type well 52, and an intermediate electrode 45 is formed on the P+ type semiconductor region 43 with a capacitor insulating film 44 interposed therebetween. This structure is a structure of a planar type MOS capacitor. Further, an upper electrode 47 is formed on the intermediate electrode 45 with a capacitor insulating film 46 interposed therebetween. This structure is a structure of a stack type capacitor. The intermediate electrode 45 is electrically connected to the N+ semiconductor region 41 by a wiring line 57.

With this combination structure of FIG. 5B, that is, with the combination structure of a planar type MOS capacitor and a stack type capacitor, a capacitor having a higher capacitance value per unit area can be formed.

Different Examples of the Structure of the Second Charge Accumulation Portion

FIGS. 6A, 6B, 7A and 7B show different examples of the structure of the second charge accumulation portion 40.

FIG. 6A shows a sectional structure of a planar type MOS capacitor. Referring to FIG. 6A, the planar type MOS capacitor which configures the second charge accumulation portion 40 is structured such that a $P^+$ (or $N^+$) type semiconductor region 43 serving as a lower electrode is formed on a surface layer portion of a P-type well 52 and an upper electrode 45 is formed on the $P^+$ type semiconductor region 43 with a capacitor insulating film 44 interposed therebetween.

FIG. 6B shows a sectional structure of a stack type capacitor 1. Referring to FIG. 6B, the stack type capacitor 1 which configures the second charge accumulation portion 40 is structured such that a lower electrode 45 is formed on an element isolating insulating film 55 and an upper electrode 47 is formed on the intermediate electrode 45 with a capacitor insulating film 46 interposed therebetween.

FIG. 7A shows a cross sectional structure of a stack type capacitor 2. Referring to FIG. 7A, the stack type capacitor 2 which configures the second charge accumulation portion 40 is structured such that a lower electrode 45 having a U-shaped cross section is electrically connected to an N+ semiconductor region 41 and an upper electrode 47 is inserted on the inner side of the intermediate electrode 45 with a capacitor insulating film 46 interposed therebetween.

In the structure of the stack type capacitor 2, a power supply voltage is applied to the upper electrode 47, or the upper electrode 47 is grounded. The stack type capacitor 2 including the lower electrode 45 of a U-shaped cross section and the upper electrode 47 embedded on the inner side of the intermediate electrode 45 is advantageous in that it can assure a larger opposing area which contributes to the capacitance more than that of an ordinary stack type capacitor the stack type capacitor 1.

FIG. 7B shows a cross section of a trench type capacitor. Referring to FIG. 7B, the trench type capacitor which configures the second charge accumulation portion 40 is configured such that a trench 48 is formed such that it extends to a substrate 51 through a P-type well 52 and a capacitor is formed in the trench 48.

In particular, the trench type capacitor is structured such that an N+ (or P+) type semiconductor region 43 which serves as a lower electrode is formed on an inner wall of the trench 48 and a capacitor insulating film 44 is coated on an inner wall of the semiconductor region 43 while an upper electrode 45 is embedded through the capacitor insulating film 44.

Further, the second charge accumulation portion 40 is configured from a planar type MOS capacitor, a junction type capacitor, a stack type capacitor, a trench type capacitor or a suitable combination of them, in which the capacitor insulating film is partly or entirely formed from a material having a dielectric constant higher than that of a silicon oxide film. As such a material having a dielectric constant higher than that of a silicon oxide film ($SiO_2$) as just mentioned, $Si_3N_4$, $Ta_2O_5$, $HfO_2$, $ZrO_2$ and so forth are available.

While several examples of the structure of the second charge accumulation portion 40 are described above with reference to FIGS. 6A to 7B, the structure of the second charge accumulation portion 40 is not limited to those structure examples, but various methods developed in the past can be adopted in order to increase the capacitance of a memory capacitor of a DRAM or the like.

3. Working Examples

In the following, particular working examples of a unit pixel having the first charge accumulation portion 30 and the second charge accumulation portion 40 therein are described.

3-1. Working Example 1

Circuit Configuration of the Unit Pixel

Figure 8:
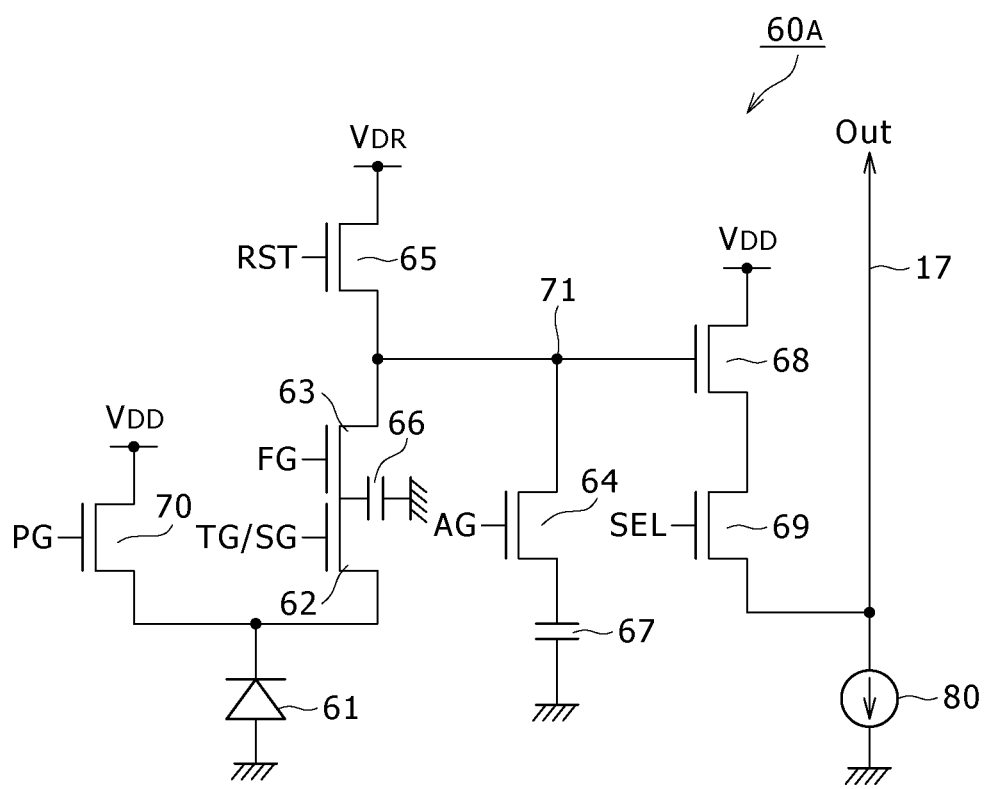
FIG. 8 depicts a circuit diagram showing a circuit configuration of a unit pixel that is consistent with the present invention.

FIG. 8 shows a circuit configuration of a unit pixel $60_A$ according to a working example 1. Referring to FIG. 8, the unit pixel $60_A$ according to the working example 1 has a photodiode having a PN junction as a photoelectric conversion portion for receiving light to generate and accumulate photocharge. The photodiode 61 generates and accumulates photocharge corresponding to a light amount received thereby.

In one embodiment, the unit pixel $60_A$ further has a first transfer gate portion 62, a second transfer gate portion 63, a third transfer gate portion 64, a reset gate portion 65, a first charge accumulation portion 66, a second charge accumulation portion 67, an amplification transistor 68, a selection transistor 69 and a charge discharging gate portion 70.

In the unit pixel $60_A$ having the configuration just described, the first and second charge accumulation portions 66 and 67 correspond to the first and second charge accumulation portions described hereinabove, respectively. In particular, the first charge accumulation portion 66 is formed from an embedded MOS capacitor. The second charge accumulation portion 67 is formed from a capacitor having a capacitance value per unit area higher than that of the first charge accumulation portion 66. Details of the layout and the sectional structure of the first and second charge accumulation portions 66 and 67 are hereinafter described.

As the pixel driving line 16 of FIG. 1, a plurality of drive lines are wired to the unit pixel $60_A$ for each pixel row. Various driving signals TG, FG, AG, RST, SEL and PG are supplied from the vertical driving section 12 of FIG. 1 through the driving lines of the pixel driving line 16 to the unit pixel $60_A$. Since, in the configuration described above, the transistors involved are NMOS transistors, each of the driving signals TG, FG, AG, RST, SEL and PG is a pulse signal which is active when it has a high level, which is provided by a power supply voltage $V_{DD}$, but is inactive when it has a low level, which is a negative potential. However, the driving signal TG can suitably assume three values including not only potentials of the high level and the low level but also a potential of an intermediate level between the high and low levels.

The driving signal TG is applied as a transfer signal to the gate electrode of the first transfer gate portion 62. The first transfer gate portion 62 is connected at one of the source and drain regions thereof to the photodiode 61. Thus, if the driving signal TG is placed into an active state, then the first transfer gate portion 62 is placed into a conducting state in response to the active state of the driving signal TG thereby to transfer photocharge accumulated in the photodiode 61 to the first charge accumulation portion 66. The photocharge transferred by the first transfer gate portion 62 is temporarily accumulated into the first charge accumulation portion 66.

The driving signal FG is applied as a transfer signal to the gate electrode of the second transfer gate portion 63. The second transfer gate portion 63 is connected at one of the source and drain regions thereof to a floating diffusion (FD) portion 71 to which the gate electrode of the amplification transistor 68 is connected. The floating diffusion portion 71 converts photocharge into an electric signal into a voltage signal and outputs the voltage signal. When the driving signal FG is placed into an active state, the second transfer gate portion 63 is placed into a conducting state in response to the active state of the driving signal FG thereby to transfer the photocharge accumulated in the first charge accumulation portion 66 to the floating diffusion portion 71.

The driving signal AG is applied as a transfer signal to the gate electrode of the third transfer gate portion 64. The third transfer gate portion 64 is connected at one of the source and drain regions thereof to the floating diffusion portion 71. Thus, when the driving signal AG is placed into an active state, the third transfer gate portion 64 is placed into a conducting state in response to the active state of the driving signal AG thereby to couple the potentials of the floating diffusion portion 71 and the second charge accumulation portion 67 to each other. Further, when the driving signal AG is placed into an inactive state, the third transfer gate portion 64 is placed into a non-conducting state in response to the inactive state of the driving signal AG to decouple the potentials of the floating diffusion portion 71 and the second charge accumulation portion 67 from each other.

The driving signal RST is applied as a reset signal to the gate electrode of the reset gate portion 65. The reset gate portion 65 is connected at one of the source and drain regions thereof to a reset voltage $V_{DR}$ and at the other of the source and drain regions thereof to the floating diffusion portion 71. When the driving signal RST is placed into an active state, the reset gate portion 65 is placed into a conducting state in response to the active state of the driving signal RST to reset the potential of the floating diffusion portion 71 to the level of the reset voltage $V_{DR}$.

The amplification transistor 68 is connected at the gate electrode thereof to the floating diffusion portion 71 and at the drain electrode thereof to the power supply voltage $V_{DD}$ and servers as an inputting portion of a readout circuit, that is, a source follower circuit, for reading out photocharge obtained by photoelectric conversion by the photodiode 61. In particular, the amplification transistor 68 is connected at the source electrode thereof to the vertical signal line 17 through the selection transistor 69 to configure a source follower circuit together with a constant current source 80 connected to one end of the vertical signal line 17.

The driving signal SEL is applied as a selection signal to the gate electrode of the selection transistor 69. The selection transistor 69 is connected between the source electrode of the amplification transistor 68 and the vertical signal line 17. When the driving signal SEL is placed into an active state, the selection transistor 69 is placed into a conducting state in response to the active state of the driving signal SEL to place the unit pixel $60_A$ into a selected state so that a pixel signal outputted from the amplification transistor 68 is connected to the vertical signal line 17.

The driving signal PG is applied as a charge discharging controlling signal to the gate electrode of the charge discharging gate portion 70. The charge discharging gate portion 70 is connected between the photodiode 61 and a charge discharging portion such as, but not limited to, the power supply voltage $V_{DD}$. When the driving signal PG is placed into an active state, the charge discharging gate portion 70 is placed into a conducting state in response to the active state of the driving signal PG so that a predetermined amount of the photocharge or all photocharge accumulated in the photodiode 61 is selectively discharged from the photodiode 61 to the charge discharging portion.

The charge discharging gate portion 70 is provided for the following object. In particular, within a period within which accumulation of photocharge is not carried out, the charge discharging gate portion 70 is placed into a conducting state to prevent such a situation that the photodiode 61 is saturated with photocharge and charge exceeding the saturation charge amount flows out to the first and second charge accumulation portions 66 and 67 or a peripheral pixel or pixels.

Pixel Structure of the Unit Pixel

Figure 9:
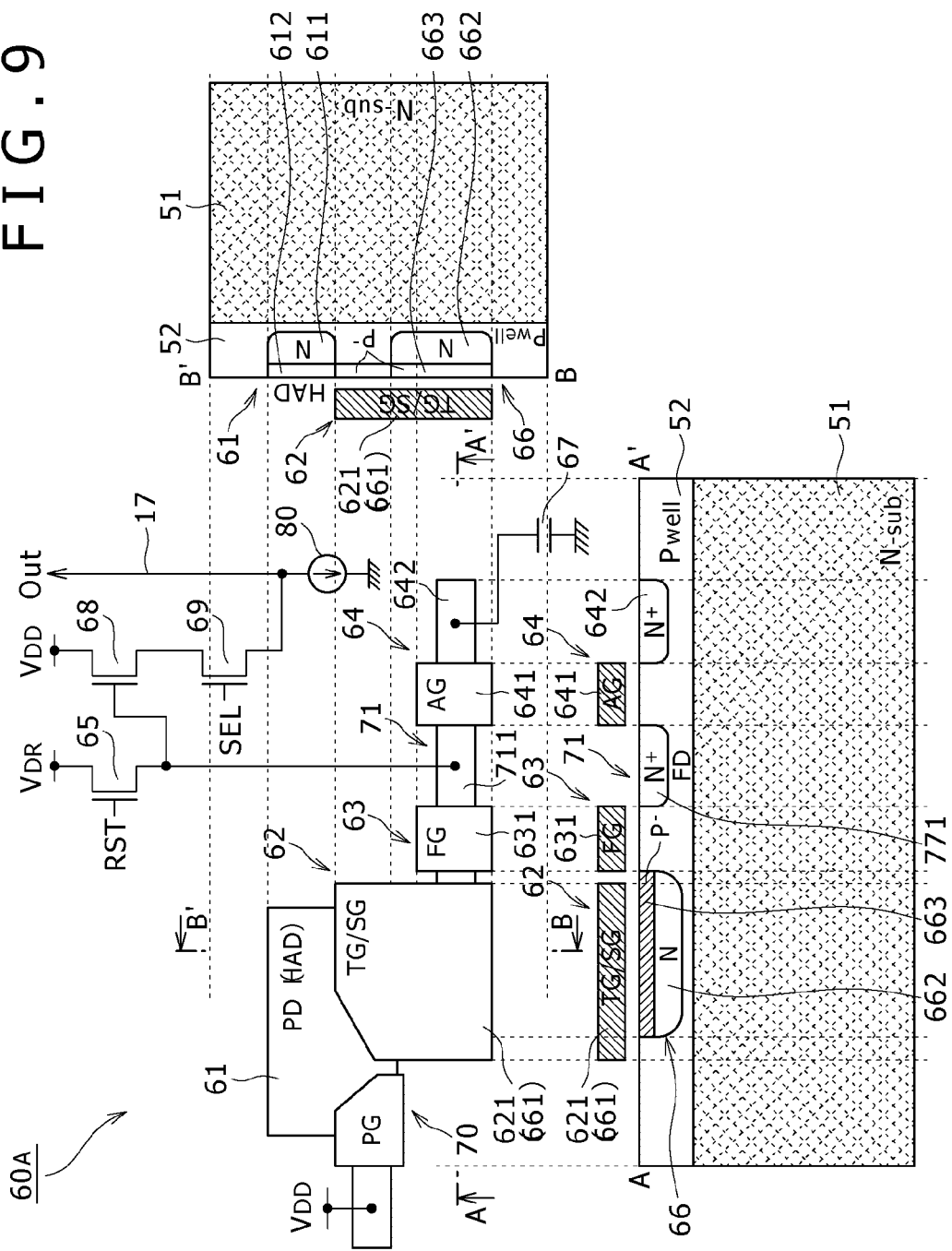
FIG. 9 depicts a schematic view showing a pixel structure of the unit pixel that is consistent with the present invention.

FIG. 9 shows a pixel structure of the unit pixel $60_A$ of the working example 1. It is to be noted that FIG. 9 particularly shows a plane pattern representative of a pixel layout and sectional views of the plane pattern taken along line A-A' and line B-B'.

Referring to FIG. 9, as can be recognized from the sectional view taken along line B-B', the photodiode (PD) 61 has a diode configuration of a PN junction wherein an N-type semiconductor region 611 is formed in a P-type well 52 on a semiconductor substrate 51. The photodiode 61 has a P-type semiconductor region 612 formed on a surface layer portion thereof such that it forms an embedded photodiode of a HAD (Hole Accumulation Diode) sensor structure in which a depletion end thereof is spaced away from an interface.

The first transfer gate portion 62 is configured such that it has a gate electrode 621 disposed on the substrate surface with a gate insulating film (not shown) interposed therebetween and a P⁻-type semiconductor region 622 formed on a substrate surface layer portion thereof. The P⁻-type semiconductor region 622 makes the potential under the gate electrode 621 a little deeper than that where it is not formed. Consequently, the P⁻-type semiconductor region 622 forms an overflow path for transferring photocharge exceeding the saturation charge amount of the photodiode 61 to the first charge accumulation portion 66 therealong.

The gate electrode 621 of the first transfer gate portion 62 serves also as a gate electrode 661 of the first charge accumulation portion 66. In other words, the gate electrode 621 of the first transfer gate portion 62 and the gate electrode 661 of the first charge accumulation portion 66 are formed integrally with each other.

The first charge accumulation portion 66 has the gate electrode 661 which serves also as the gate electrode 621 of the first transfer gate portion 62 and is formed as an embedded MOS capacitor under the gate electrode 661. In particular, the first charge accumulation portion 66 is formed from an embedded MOS capacitor including an N-type semiconductor region 662 formed in the P⁻-type well 52 under the gate electrode 661 and a P⁻-type semiconductor region 663 formed on a surface layer portion of the N-type semiconductor region 662.

The second transfer gate portion 63 has a gate electrode 631 disposed on the substrate surface with a gate insulating film (not shown) interposed therebetween. In the second transfer gate portion 63, the N-type semiconductor region 662 of the first charge accumulation portion 66 is one of the source and drain regions, and an N⁺-type semiconductor region 711 serving as the floating diffusion portion 71 is the other of the source and drain regions.

The third transfer gate portion 64 has a gate electrode 641 disposed on the substrate surface with a gate insulating film (not shown) interposed therebetween. In the third transfer gate portion 64, the N⁺-type semiconductor region 711 serving as the floating diffusion portion 71 is one of the source and drain regions, and an N⁺-type semiconductor region 642 formed on the substrate surface layer portion is the other of the source and drain regions.

To the N⁺-type semiconductor region 642 of the third transfer gate portion 64, the second charge accumulation portion 67 is electrically connected at one end thereof. The second charge accumulation portion 67 is connected at the other end thereof to a negative side power supply to the ground. The third transfer gate portion 64 couples and decouples the potentials of the floating diffusion portion 71 and the second charge accumulation portion 67.

As apparent from the foregoing description, the unit pixel $60_A$ according to the working example 1 has a pixel structure wherein the first charge accumulation portion 66 is formed as an embedded MOS capacitor under the gate electrode 661 formed adjacent the first and second gate portions 62 and 63.

Circuit Operation of the Unit Pixel

Figure 10:
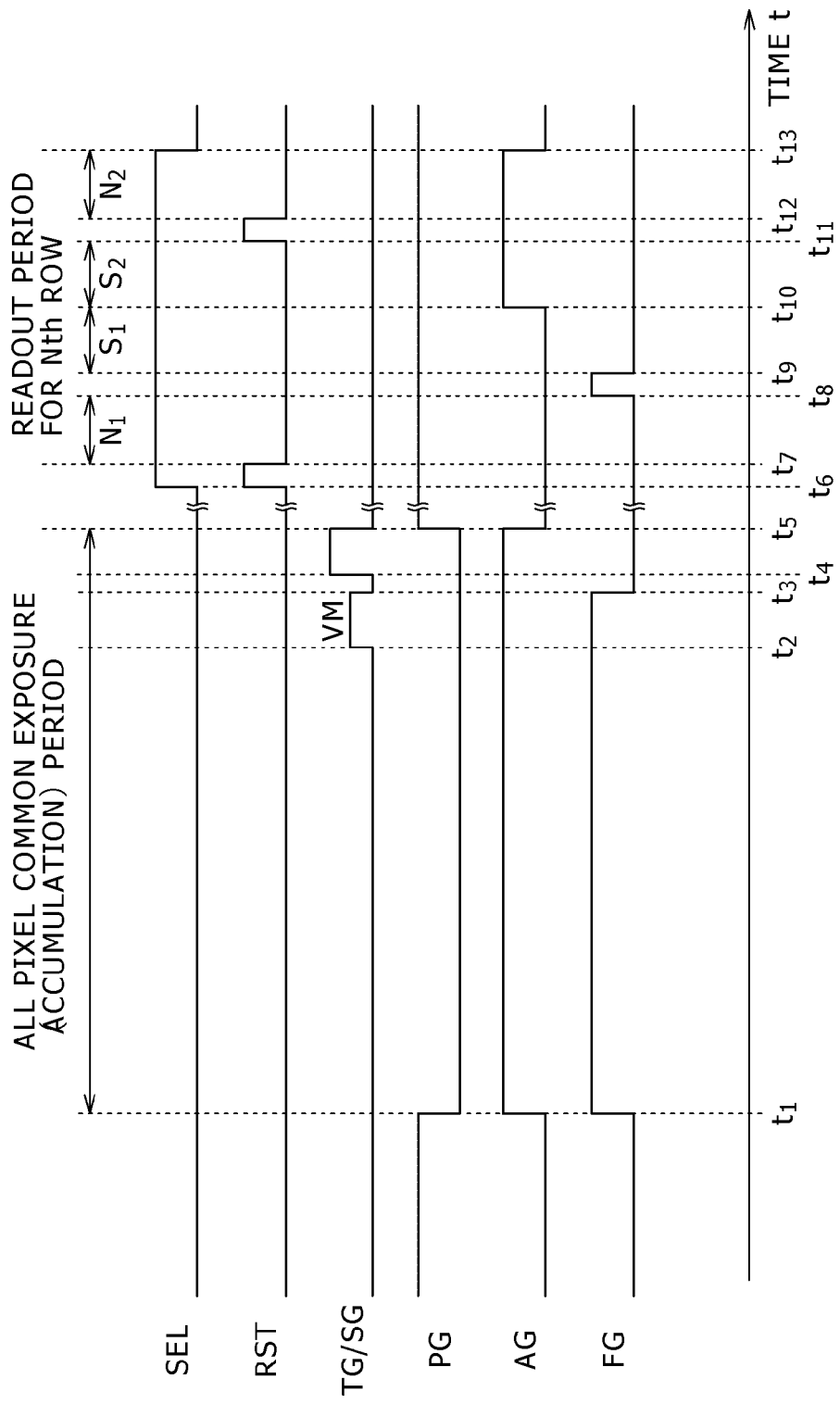
FIG. 10 depicts a timing chart illustrating circuit operation of the unit pixel that is consistent with the present invention.

FIG. 10 illustrates circuit operation of the unit pixel $60_A$ according to the working example 1. More particularly, FIG. 10 illustrates a timing relationship among the selection signal SEL, reset signal RST, transfer signals TG/SG, charge discharging controlling signal PG, transfer signal AG and transfer signal FG.

Referring to FIG. 10, first at time $t_1$, the charge discharging controlling signal PG is placed into an inactive state simultaneously with regard to all pixels to place the charge discharging gate portion 70 into a non-conducting state so that all pixels enter a common exposure period.

At time $t_1$, since both of the transfer signals FG and AG are in an active state, both of the second and third transfer gate portions 63 and 64 are in a conducting state. Accordingly, in a high illuminance state, photocharge exceeding the saturation charge amount of the photodiode 61, that is, photocharge overflowing from the photodiode 61, is transferred to the first charge accumulation portion 66 through the overflow path under the gate electrode 621 of the first transfer gate portion 62.

Further, the photocharge transferred to the first charge accumulation portion 66 is transferred to the second charge accumulation portion 67 through the second and third transfer gate portions 63 and 64 which are in a conducting state. In short, the photocharge overflowing from the photodiode 61 is accumulated into both of the first charge accumulation portion 66 and the second charge accumulation portion 67.

Then, at time $t_2$, the driving signal TG is driven with an intermediate potential VM so that photocharge exceeding a predetermined charge amount which depends upon the intermediate potential VM is accumulated from the photodiode 61 into both of the first charge accumulation portion 66 and the second charge accumulation portion 67 through the first transfer gate portion 62. The predetermined charge amount here signifies the saturation charge amount of the first charge accumulation portion 66. Consequently, upon next operation, that is, when the second transfer gate portion 63 is placed into a non-conducting state to transfer the photocharge accumulated in the photodiode 61 to the first charge accumulation portion 66, the photocharge is prevented from leaking from the first charge accumulation portion 66.

Then at time $t_3$, the transfer signal TG is placed into an inactive state to place the second transfer gate portion 63 into a non-conducting state, and then at time $t_4$, the driving signal TG is placed into an active state to place the first transfer gate portion 62 into a conducting state. Consequently, the photocharge accumulated in the photodiode 61 is transferred to and accumulated into the first charge accumulation portion 66.

Here, in a low illuminance state in which the photocharge amount is smaller than the saturation charge amount of the photodiode 61, photocharge does not overflow from the photodiode 61. Accordingly, photocharge in a low illuminance state is transferred to the first charge accumulation portion 66 by the first transfer gate portion 62 at the timing of time $t_4$ and accumulated into the first charge accumulation portion 66.

Then at time $t_5$, the charge discharging controlling signal PG is placed into an active state to place the charge discharging gate portion 70 into a conducting state thereby to end the exposure period common to all pixels. Then, after time $t_5$, that is, within a readout period, even if intense light enters and excessive photocharge is generated in the photodiode 61, since the photocharge is discharged to the charge discharging portion through the charge discharging gate portion 70, the excessive charge does not leak into the first and second charge accumulation portions 66 and 67.

At time $t_5$, the transfer signal AG is placed into an inactive state to place the third transfer gate portion 64 into a non-conducting state. Simultaneously, the transfer signal TG is placed into an inactive state to place also the first transfer gate portion 62 into a non-conducting state.

After the end of the exposure, the selection signal SEL for the Nth row is placed into an active state at time $t_6$ to place the selection transistors 69 in the Nth row into a conducting state. Consequently, the unit pixels $60_A$ in the Nth row are placed into a selected state. Simultaneously, the reset signal RST is placed into an active state to place the reset gate portions 65 into a conducting state, and consequently, the floating diffusion portions 71 are reset. Then, at time $t_7$ at which the reset signal RST is placed into an inactive state, the potential of each floating diffusion portion 71 is outputted as the first reset level $N_1$ to the vertical signal line 17 through the amplification transistor 68 and the selection transistor 69.

Then at time $t_8$, the transfer signal FG is placed into an active state to place the second transfer gate portion 63 into a conducting state, and consequently, the photocharge accumulated in the first charge accumulation portion 66 is transferred to the floating diffusion portion 71. The transfer of the photocharge continues till time $t_9$ at which the transfer signal FG is placed into an inactive state. Then at time $t_9$ at which the transfer of the photocharge ends, the potential of the floating diffusion portion 71 is outputted as a first signal level $S_1$ corresponding to the accumulated charge amount of the first charge accumulation portion 66 to the vertical signal line 17 through the amplification transistor 68 and the selection transistor 69.

Then at time $t_{10}$, the transfer signal AG is placed into an active state to place the third transfer gate portion 64 into a conducting state thereby to couple the potentials of the floating diffusion portion 71 and the second charge accumulation portion 67. Consequently, the capacitance of the floating diffusion portion 71 and the capacitance of the second charge accumulation portion 67 are coupled, and the photocharge accumulated in the second charge accumulation portion 67 is now accumulated into both of the floating diffusion portion 71 and the second charge accumulation portion 67, that is, into the coupling capacitor portion.

Then, the photocharge accumulated in the coupling capacitor portion is outputted as a second signal level $S_2$ to the vertical signal line 17 through the amplification transistor 68 and the selection transistor 69. Incidentally, the photocharge accumulated in the second charge accumulation portion 67 is the photocharge which is overflowed from the photodiode 61 in a high illuminance state.

Then at time $t_{11}$, the reset signal RST is placed into an active state to place the reset gate portion 65 into a conducting state. Consequently, the coupling capacitor portion of the floating diffusion portion 71 and the second charge accumulation portion 67 is reset. Then, at time $t_{12}$ at which the reset signal RST is placed into an active state, the potential at the coupling capacitor portion is outputted as a second reset level $N_2$ to the vertical signal line 17 through the amplification transistor 68 and the selection transistor 69.

In the series of circuit operations described above, the first reset level $N_1$, first signal level $S_1$, second signal level $S_2$ and second reset level $N_2$ are outputted successively from the unit pixel $60_A$ to the vertical signal line 17. The first reset level $N_1$, first signal level $S_1$, second signal level $S_2$ and second reset level $N_2$ successively outputted in this manner are subjected to predetermined signal processing by the signal processing section at the succeeding stage. This signal processing is common also to the modifications and the other working examples described below.

It is to be noted that, although it is described in the description of the circuit operation above that the first and second reset levels $N_1$ and $N_2$ are read out at times $t_7$ and $t_{12}$ at which the reset signal RST is placed into a non-conducting state, actually the levels immediately preceding to times $t_8$ and $t_{13}$ are used as the first and second reset levels $N_1$ and $N_2$, respectively. Similarly, although it is described that the first signal level $S_1$ is read out at time $t_9$ at which the transfer signal FG is placed into an inactive state and the second signal level $S_2$ is read out at time $t_{10}$ at which the transfer signal AG is placed into an active state, actually the levels immediately preceding to times $t_{10}$ and $t_{11}$ are used as the first and second signal levels $S_1$ and $S_2$, respectively. This is because time is required until the vertical signal line 17 rises due to the load capacitance thereof.

With the unit pixel $60_A$ according to the working example 1 described above, since an embedded MOS capacitor is used as the first charge accumulation portion 66 and a capacitor having a capacitance value per unit area higher than that of the first charge accumulation portion 66 is used as the second charge accumulation portion 67, a greater saturation charge amount can be assured. Where the saturation charge amount may be equal, reduction of the unit pixel size can be achieved by an amount by which the space can be reduced.

Besides, where, upon all pixel simultaneous readout, photocharge in a low illuminance state is accumulated into the first charge accumulation portion 66 having good properties at dark while photocharge in a high illuminance state is accumulated into the second charge accumulation portion 67 having inferior properties at dark, the picture quality of a picked up image at dark or in a low illuminance state does not deteriorate in comparison with the related art which achieves the global exposure.

Modification to the Working Example 1

Figure 11:
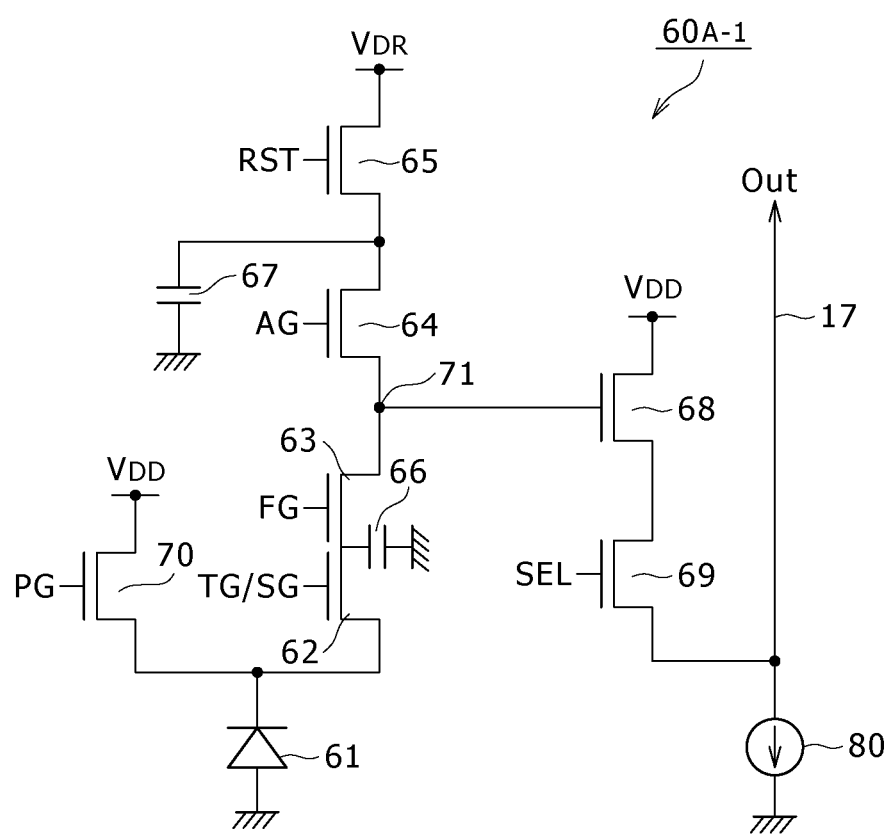
FIG. 11 depicts a circuit diagram showing a circuit configuration of a unit pixel that is consistent with the present invention.

FIG. 11 shows a circuit configuration of a unit pixel $60_{A-1}$ according to a modification to the working example 1.

Also the unit pixel $60_{A-1}$ according to the present modification includes similar circuit components to those of the unit pixel $60_A$ of the working example 1. Particularly, referring to FIG. 11, the unit pixel $60_{A-1}$ according to the present modification includes, in addition to the photodiode 61, first to third transfer gate portions 62 to 64, a reset gate portion 65, first and second charge accumulation portions 66 and 67, an amplification transistor 68, a selection transistor 69 and a charge discharging gate portion 70.

The unit pixel $60_{A-1}$ according to the present modification is different from the unit pixel $60_A$ according to the working example 1 resides in the connection position of the third transfer gate portion 64 and the second charge accumulation portion 67. In particular, the third transfer gate portion 64 is connected between the source electrode of the reset gate portion 65 and the floating diffusion portion 71. The second charge accumulation portion 67 is connected between the reset gate portion 65 and the third transfer gate portion 64.

Also in the case of the unit pixel $60_{A-1}$ according to the present modification, although the circuit operation is different a little, similar working-effects to those of the unit pixel $60_A$ according to the working example 1 can be anticipated.

Figure 12:
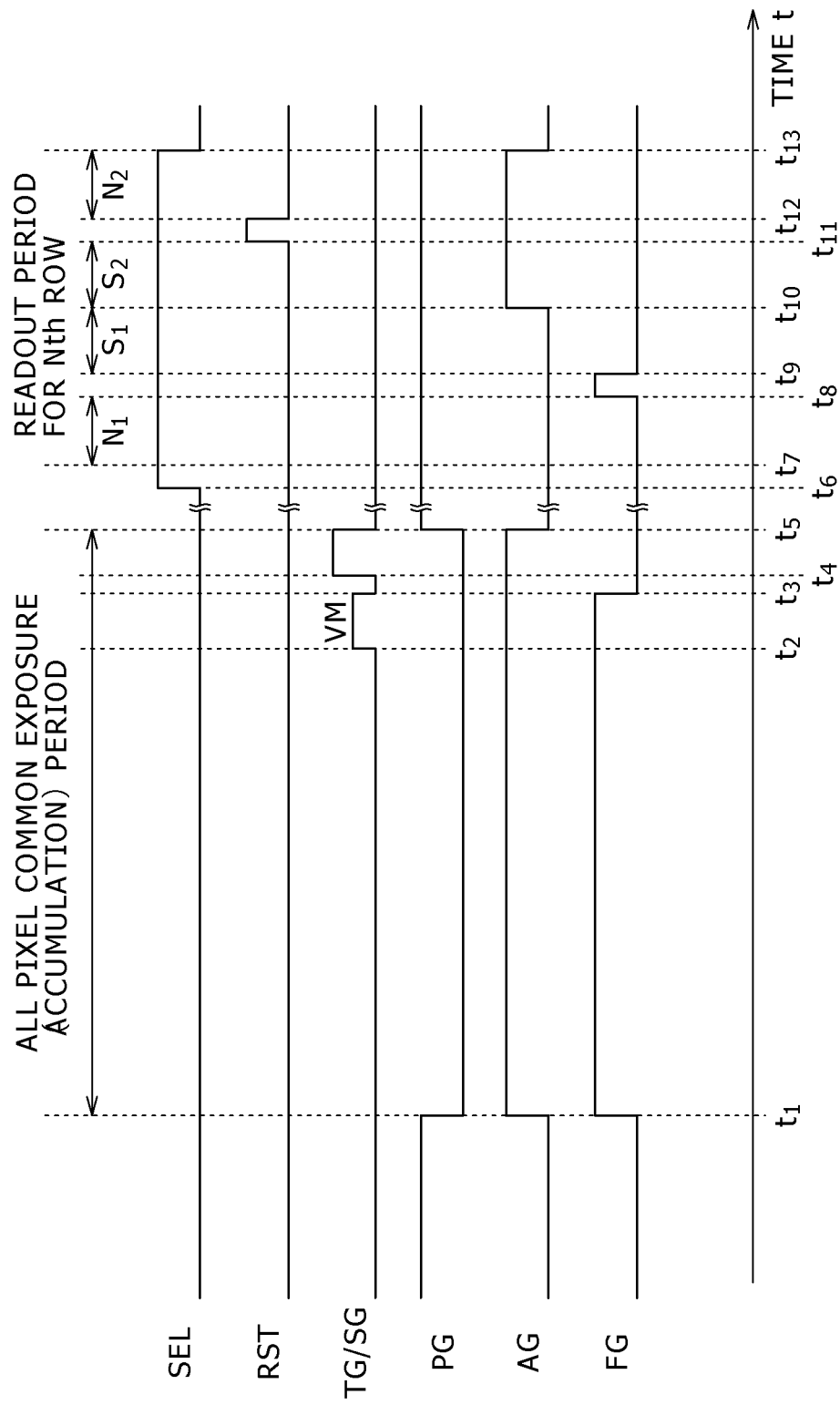
FIG. 12 depicts a timing chart illustrating circuit operation of the unit pixel that is consistent with the present invention.

FIG. 12 illustrates circuit operation of the unit pixel $60_{A-1}$ according to the modification to the working example 1. The circuit operation of the unit pixel $60_{A-1}$ is different from the unit pixel $60_A$ according to the working example in that, as apparent from the timing chart of FIG. 12, a reset operation for the floating diffusion portion 71 to read out the first reset level $N_1$ is not carried out.

However, even if a reset operation is not carried out for the current frame, a reset operation is carried out when the second reset level $N_2$ of the preceding frame is read out. Accordingly, even if a reset operation is not carried out intentionally in order to acquire the first reset level $N_1$ of the current frame, there is no problem in signal processing even though the potential of the floating diffusion portion 71 after pixel selection in the current frame is used as the first reset level $N_1$.

3-2. Working Example 2

Circuit Configuration of Unit Pixel

Figure 13:
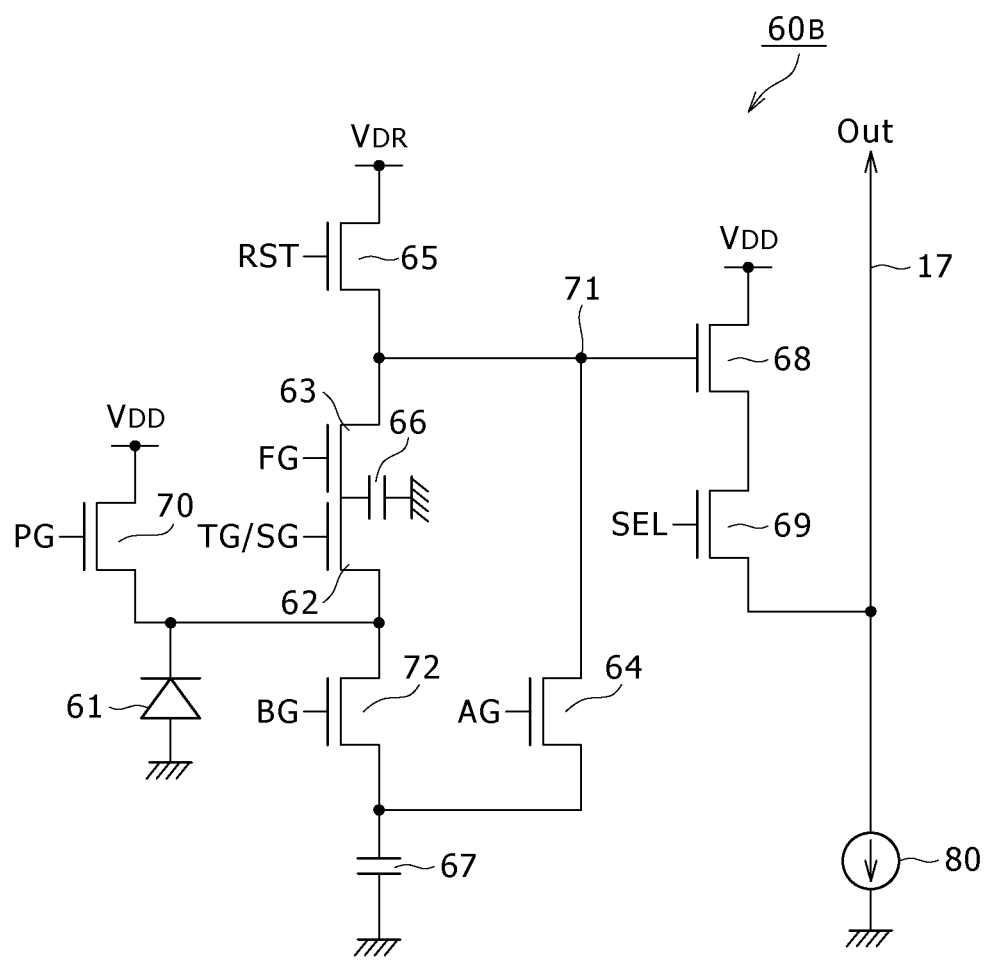
FIG. 13 depicts a circuit diagram showing a circuit configuration of a unit pixel that is consistent with the present invention.

FIG. 13 schematically shows a circuit configuration of a unit pixel $60_B$ according to a working example 2.

A fourth transfer gate 72 is connected at one of the source and drain regions thereof to the photodiode 61 and at the other of the source and drain regions thereof to the other of the source and drain regions of the third transfer gate portion 64 and the second charge accumulation portion 67. To the gate electrode of the fourth transfer gate portion 72, the driving signal BG is applied as a transfer signal. At this time, the driving signal BG can be driven suitably with three values of a potential of an active state, another potential of an inactive state and a further potential of an intermediate level between the two potentials. In the following description, the potential of the intermediate level is referred to as intermediate potential VM.

Pixel Structure of the Unit Pixel

Figure 14:
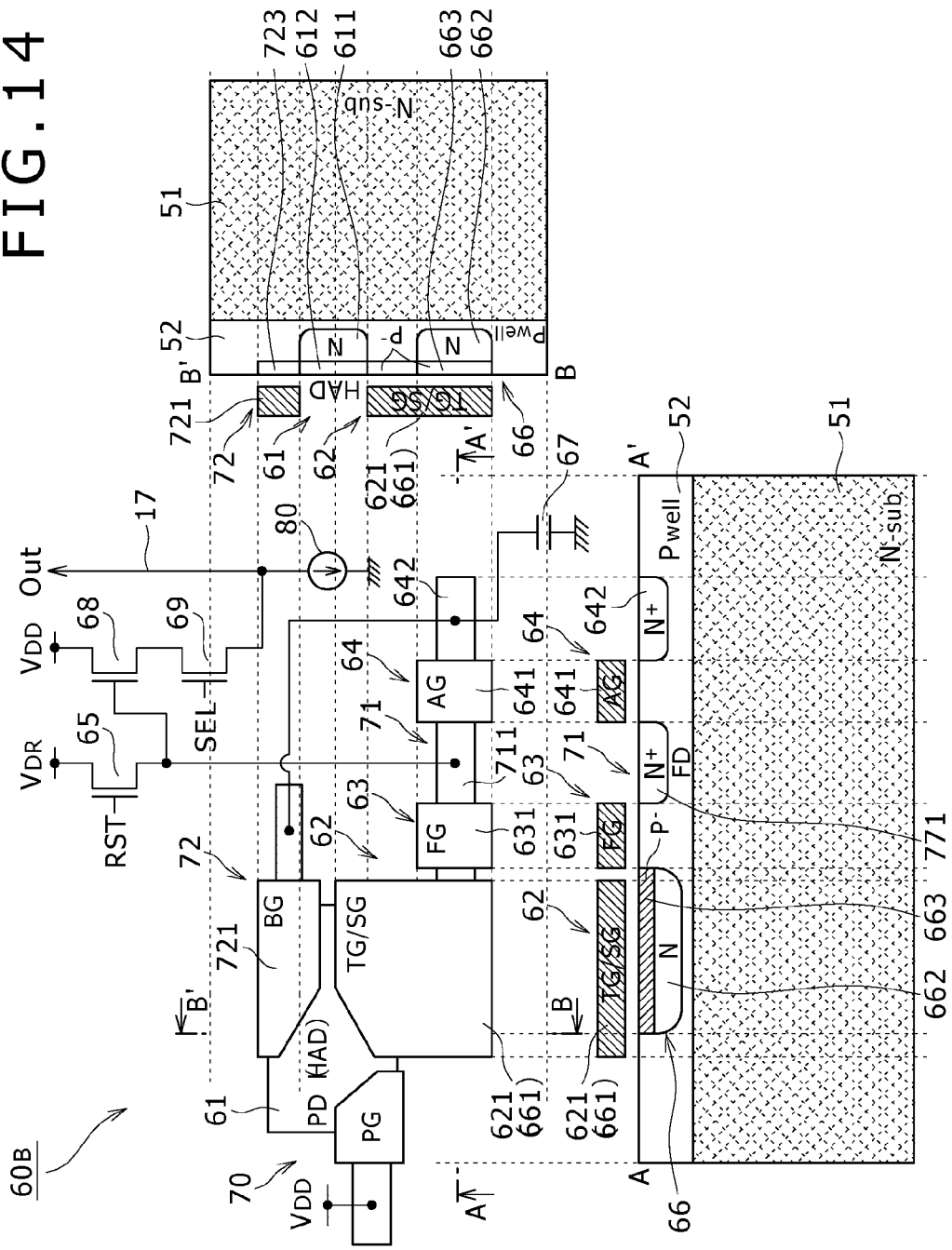
FIG. 14 depicts a schematic view showing a pixel structure of the unit pixel that is consistent with the present invention.

FIG. 14 schematically shows a pixel structure of the unit pixel $60_B$ of the working example 2. It is to be noted that FIG.

14 particularly shows a plane pattern representative of a pixel layout and sectional views of the plane pattern taken along line A-A' and line B-B'.

Referring to FIG. 14, the pixel structure of the unit pixel $60_B$ is basically same as that of the unit pixel $60_A$ according to the working example 1 except the structure of the fourth transfer gate portion 72. The fourth transfer gate portion 72 has a gate electrode 721 disposed on the substrate surface with a gate insulating film (not shown) interposed therebetween, and the N-type semiconductor region of the photodiode 61 serves as one of the source and drain regions. The other one of the source and drain regions of the fourth transfer gate portion 72 is connected to the second charge accumulation portion 67.

The fourth transfer gate portion 72 is configured such that it has a P-type or N-type semiconductor region 723 on the surface layer portion of the channel region. In a non-conducting state of the fourth transfer gate portion 72, the semiconductor region 723 forms an overflow path along which photocharge exceeding the saturation charge amount of the photodiode 61, that is, photocharge overflowing from the photodiode 61, can leak into the second charge accumulation portion 67.

Circuit Operation of the Unit Pixel

Figure 15:
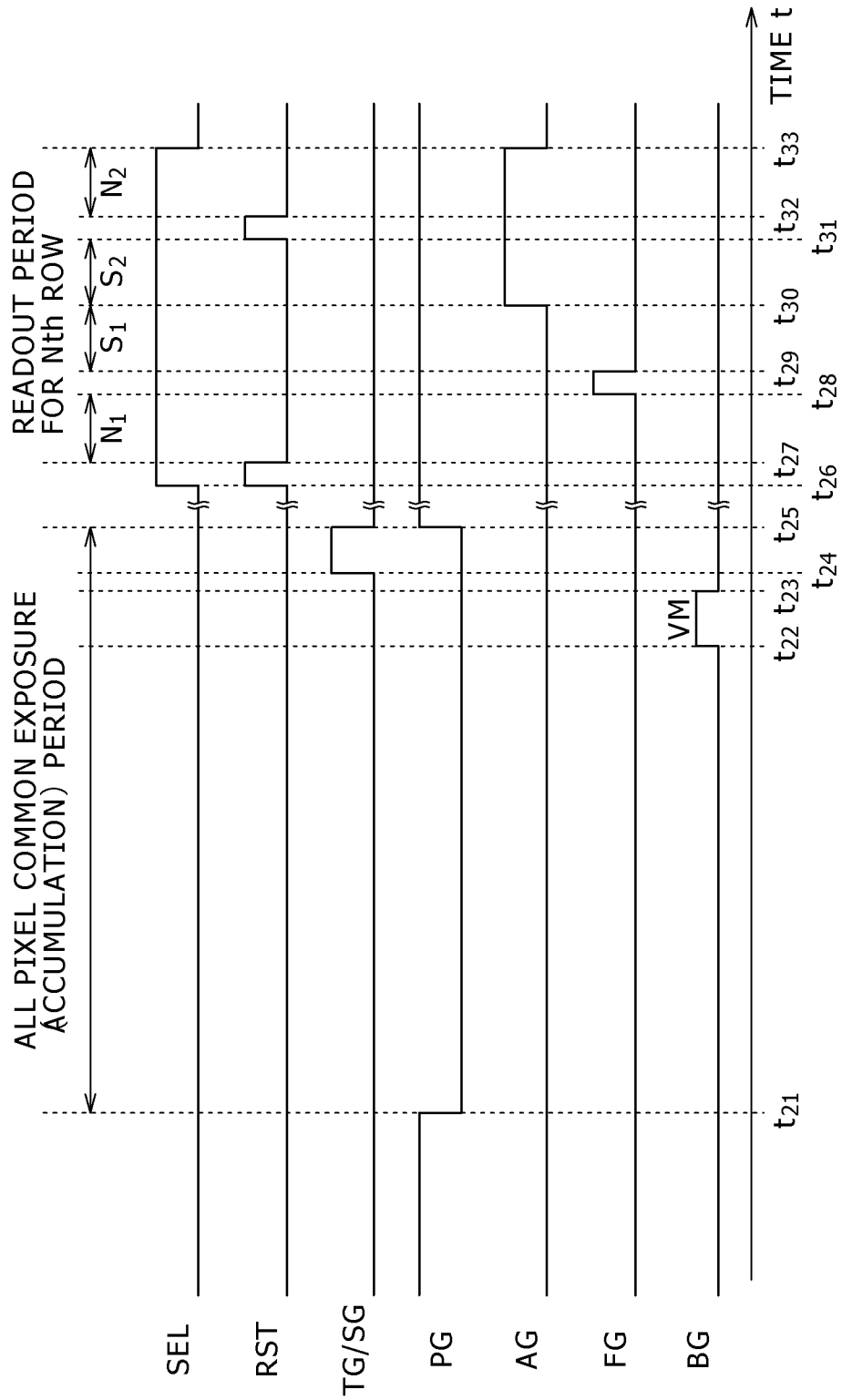
FIG. 15 depicts a timing chart illustrating circuit operation of the unit pixel that is consistent with the present invention.

FIG. 15 illustrates circuit operation of the unit pixel $60_B$ according to the working example 2. Particularly, FIG. 15 illustrates a timing relationship of the selection signal SEL, reset signal RST, transfer signals TG/SG, charge discharging controlling signal PG, transfer signal AG, transfer signal FG and transfer signal BG.

First at time $t_{21}$, the charge discharging controlling signal PG is placed into a non-active state to place the charge discharging gate portion 70 into a non-contacting state simultaneously with regard to all pixels thereby to enter an exposure period common to all pixels.

If, within the exposure period, photocharge in a high illuminance state exceeds the saturation charge amount of the photodiode 61, that is, photocharge overflows from the photodiode 61, then the overflowing photocharge is transferred to the second charge accumulation portion 67 through the overflow path under the gate of the fourth transfer gate portion 72. In other words, the photocharge overflowing from the photodiode 61 in a high illuminance state leaks and is stored into the second charge accumulation portion 67.

Then at time $t_{22}$, the transfer signal BG is driven by the intermediate potential VM so that photocharge exceeding a predetermined charge amount which depends upon the intermediate potential VM is transferred from the photodiode 61 to the second charge accumulation portion 67 through the fourth transfer gate portion 72. The predetermined charge amount here is the saturation charge amount of the first charge accumulation portion 66. Consequently, upon next operation, that is, when the photocharge accumulated in the photodiode 61 is to be transferred to the first charge accumulation portion 66, the photocharge is prevented from overflowing from the first charge accumulation portion 66.

When the transfer signal BG is placed into a non-active state at time $t_{23}$, the fourth transfer gate portion 72 is placed into a non-conducting state, and then when the driving signal TG is placed into an active state at time $t_{24}$, the first transfer gate portion 62 is placed into a conducting state. Consequently, the photocharge accumulated in the photodiode 61 is transferred to and accumulated into the first charge accumulation portion 66.

Here, in a low illuminance state in which the photocharge is placed into an active state at time $t_{23}$, no photocharge overflows from the photodiode 61. Accordingly, photocharge in a low illuminance state is transferred to the first charge accumulation portion 66 through the photodiode 61 and accumulated into the first charge accumulation portion 66 at the timing of time $t_{24}$.

Then at time $t_{25}$, the state of the charge discharging controlling signal PG changes from a non-active state to an active state to place the charge discharging gate portion 70 into a conducting state, thereby ending the exposure period common to all pixels. Then after time $t_{25}$, that is, within a readout period, even if intense light enters and excessive photocharge is generated by the photodiode 61, the photocharge is discharged to the charge discharging portion through the charge discharging gate portion 70. Consequently, no excessive charge leaks into the first and second charge accumulation portions 66 and 67.

At time $t_{26}$ after the end of the exposure, the selection signal SEL is placed into an active state to place the selection transistors 69 in the Nth row into a conducting state thereby to place the unit pixels $60_B$ in the Nth row into a selected state. Simultaneously, the reset signal RST is placed into an active state to place the reset gate portion 65 into a conducting state to reset the floating diffusion portion 71. Then, at time $t_{27}$ at which the reset signal RST is placed into an inactive state, the potential of the floating diffusion portion 71 is outputted as the first reset level $N_1$ to the vertical signal line 17 through the amplification transistor 68 and the selection transistor 69.

Then at step $t_{28}$, the transfer signal FG is placed into an active state to place the second transfer gate portion 63 into a conducting state, and consequently, the photocharge accumulated in the first charge accumulation portion 66 is transferred to the floating diffusion portion 71. This transfer of the photocharge continues till time $t_{29}$ at which the transfer signal FG is placed into an inactive state. Then, the potential of the floating diffusion portion 71 at time $t_{29}$ at which the transfer of the photocharge ends is outputted as the first signal level $S_1$ corresponding to the accumulated charge amount of the first charge accumulation portion 66 to the vertical signal line 17 through the amplification transistor 68 and the selection transistor 69.

Then, after the transfer signal AG is placed into an active state at time $t_{30}$, the third transfer gate portion 64 is placed into a conducting state to couple the potentials of the floating diffusion portion 71 and the second charge accumulation portion 67. Consequently, the capacitance of the floating diffusion portion 71 and the capacitance of the second charge accumulation portion 67 are coupled, and the photocharge accumulated in the second charge accumulation portion 67 is accumulated into both of the floating diffusion portion 71 and the second charge accumulation portion 67, that is, into the coupling capacitance portion.

Then, the photocharge accumulated in the coupling capacitance portion is outputted as the second signal level $S_2$ to the vertical signal line 17 through the amplification transistor 68 and the selection transistor 69. Incidentally, the photocharge accumulated in the second charge accumulation portion 67 is the photocharge which has overflowed from the photodiode 61 in a high illuminance state.

Then at time $t_{31}$, the reset signal RST is placed into an active state to place the reset gate portion 65 into a conducting state, and consequently, the coupling capacitance portion of the floating diffusion portion 71 and the second charge accumulation portion 67 is reset. Then, at time $t_{32}$ at which the reset signal RST is placed into an inactive state, the potential of the coupling capacitance portion is outputted as the second reset level $N_2$ to the vertical signal line 17 through the amplification transistor 68 and the selection transistor 69.

By the series of circuit operations described above, the first reset level $N_1$, first signal level $S_1$, second signal level $S_2$ and second reset level $N_2$ are successively outputted from the unit pixel $60_B$ to the vertical signal line 17.

Modification 1 to the Working Example 2

Figure 16:
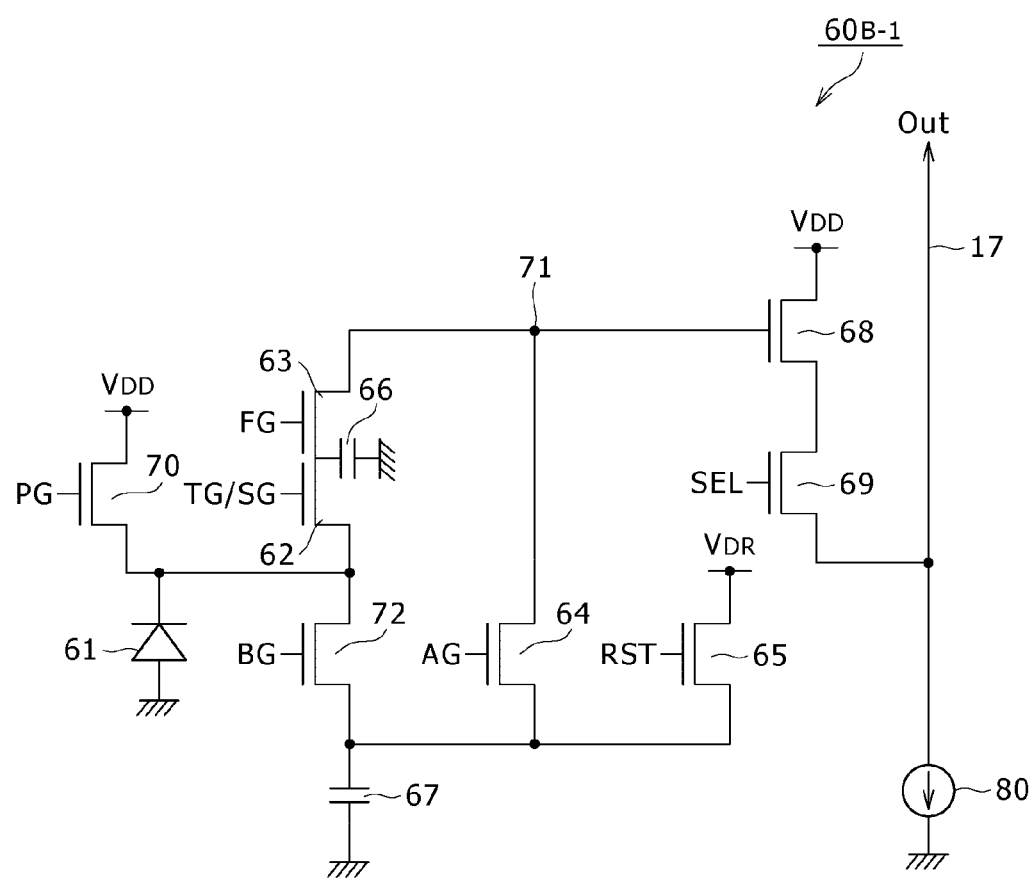
FIG. 16 depicts a circuit diagram showing a circuit configuration of a unit pixel that is consistent with the present invention.

FIG. 16 shows a circuit configuration of a unit pixel $60_{B-1}$ according to a modification 1 to the working example 2.

Also the unit pixel $60_{B-1}$ according to the present modification 1 includes circuit components similar to those of the unit pixel $60_B$ according to the working example 2. In particular, the unit pixel $60_{B-1}$ according to the present modification 1 includes a photodiode 61, a reset gate portion 65, first and second charge accumulation portions 66 and 67, an amplification transistor 68, a selection transistor 69 and charge discharging gate portion 70 and additionally includes four transfer gate portions 62 to 64 and 72.

The unit pixel $60_{B-1}$ according to the present modification 1 is different from the unit pixel $60_B$ according to the working example 2 in the connection position of the reset transistor 65. In particular, the reset transistor 65 is connected between the third and fourth transfer gate portions 64 and 72 and second charge accumulation portion 67 and the power reset voltage $V_{DR}$.

Also in the case of the unit pixel $60_{B-1}$ according to the present modification 1, although the circuit operation is different a little, basically similar working-effects to those of the unit pixel $60_B$ according to the working example 2 can be anticipated.

Figure 17:
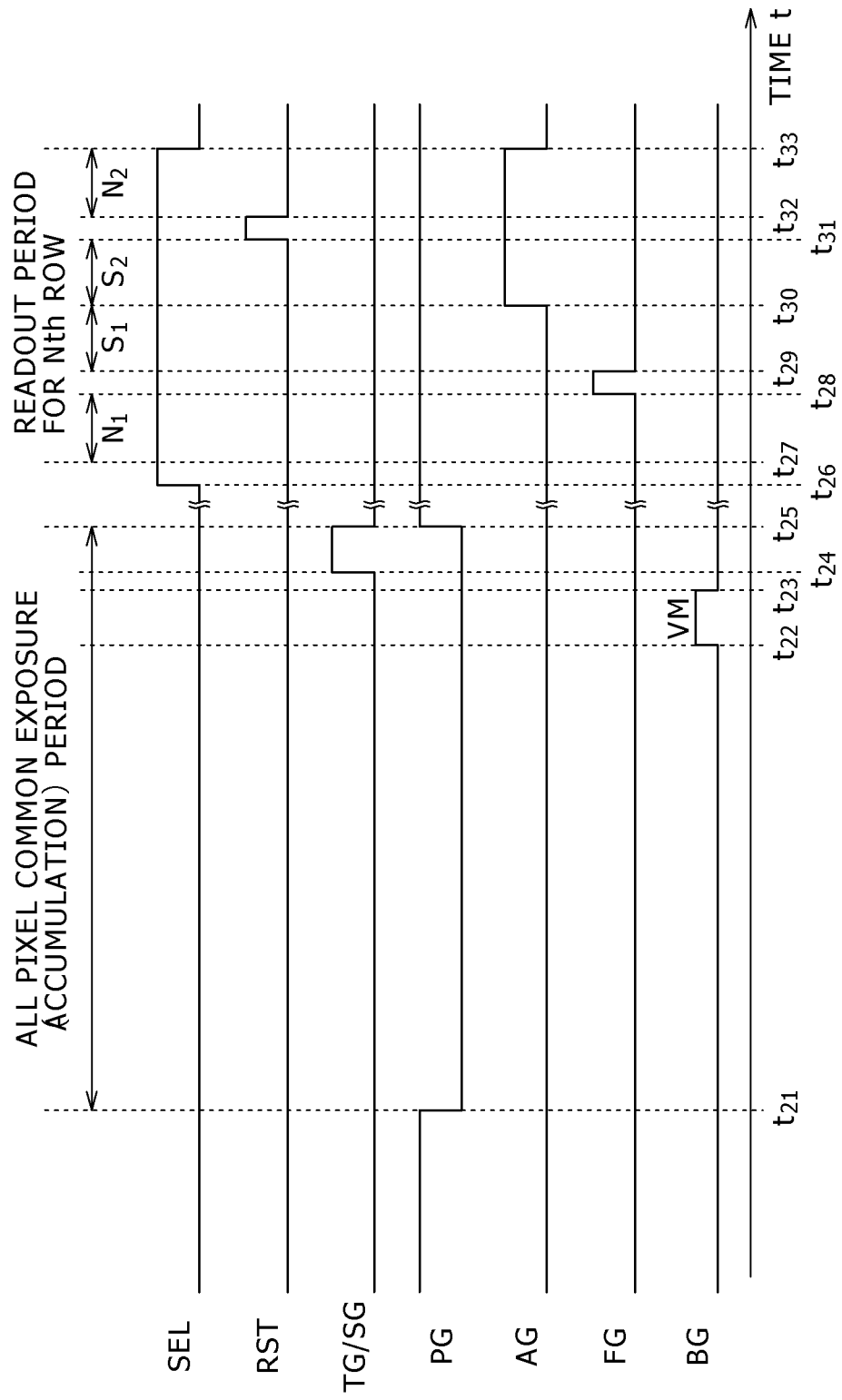
FIG. 17 depicts a timing chart illustrating circuit operation of the unit pixel that is consistent with the present invention.

FIG. 17 illustrates circuit operation of the unit pixel $60_{B-1}$ according to the modification 1 to the working example 2. The circuit operation of the unit pixel $60_{B-1}$ according to the modification 1 to the working example 2 is different from that of the unit pixel $60_B$ according to the working example 2 only in that, as apparent from the timing chart of FIG. 17, a resetting operation for acquisition of the floating diffusion portion 71 for reading out the first reset level $N_1$ is not carried out.

However, even if a resetting operation is not carried out in the current frame, a resetting operation was carried out when the second reset level $N_2$ of the preceding frame was read out. Accordingly, even if a resetting operation is not carried out intentionally for acquisition of the first reset level $N_1$, there is no problem in signal processing even though the potential of the floating diffusion portion 71 after the pixel selection in the current frame is used as the first reset level $N_1$.

Modification 2 to the Working Example 2

Figure 18:
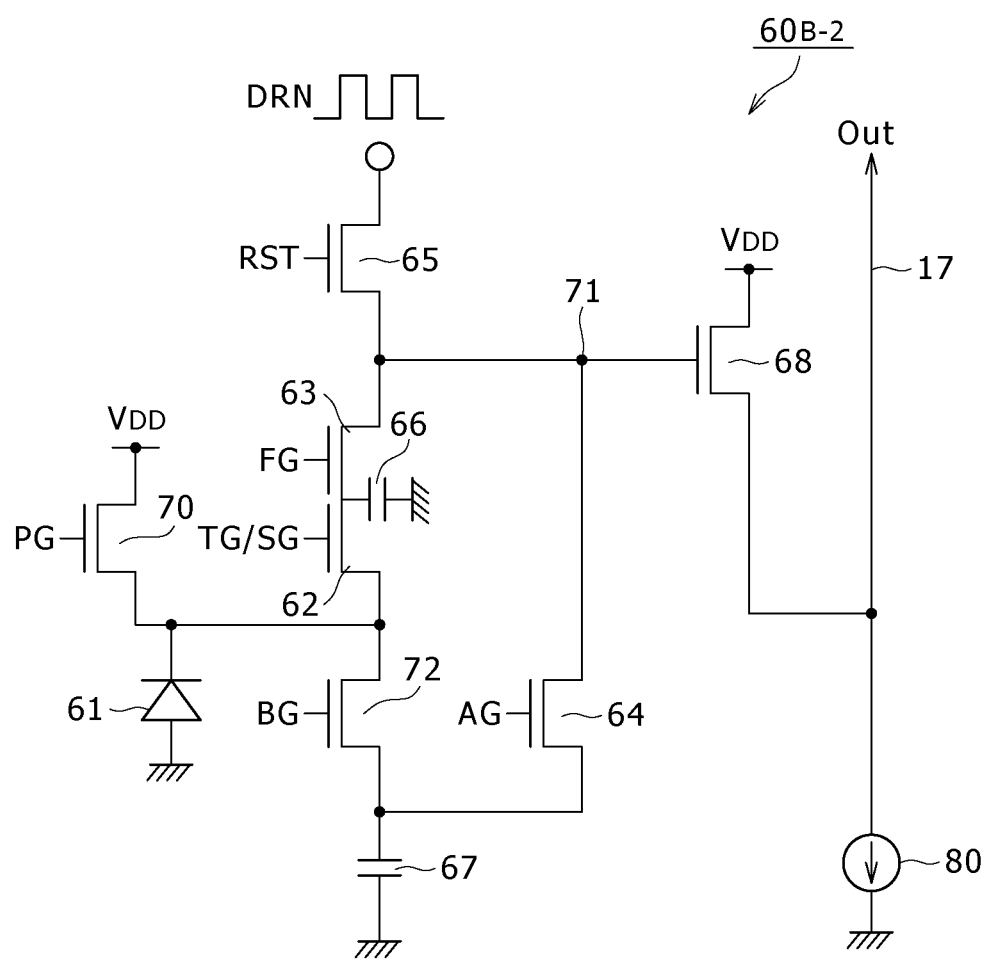
FIG. 18 depicts a circuit diagram showing a circuit configuration of a unit pixel that is consistent with the present invention.

FIG. 18 shows a circuit configuration of a unit pixel $60_{B-2}$ according to a modification 2 to the working example 2.

Although the unit pixel $60_{B-2}$ according to the present modification 2 is similar to the unit pixel $60_B$ according to the working example 2 in that it includes the fourth transfer gate portion 72, it is different in that the selection transistor 69 is omitted. In the unit pixel $60_{B-2}$ according to the present modification 2, the pixel selection function of the selection transistor 69 is implemented by variation of the drain voltage DRN to be applied to the drain electrode of the reset transistor 65.

In particular, a high voltage is applied as the drain voltage DRN to the drain electrode of the reset transistor 65 to place the amplification transistor 68 into an activated state in which the amplification transistor 68 carries out outputting operation of a signal. In particular, the amplification transistor 68 acts as a selection transistor along with the changeover operation of the drain voltage DRN. Since the selection transistor 69 is omitted, there is an advantage that one circuit component of the unit pixel 60 can be omitted per one pixel.

Figure 19:
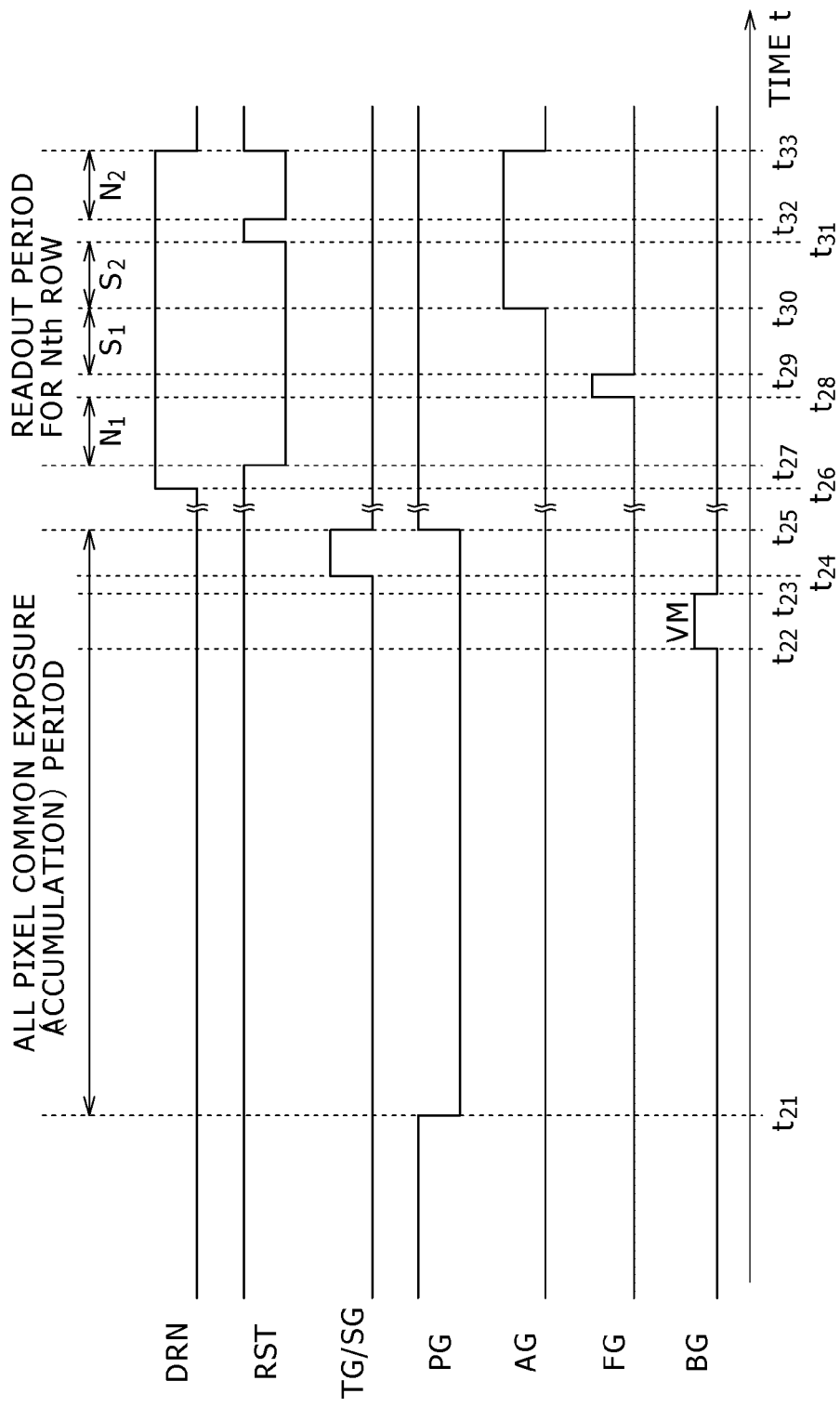
FIG. 19 depicts a timing chart illustrating circuit operation of the unit pixel that is consistent with the present invention.

FIG. 19 illustrates circuit operation of the unit pixel $60_{B-2}$ according to the modification 2 to the working example 2. The circuit operation is basically same but is different only in the timing of the reset signal RST from that of the unit pixel $60_{B-1}$ according to the modification 1 to the working example 2.

With the unit pixels $60_B$, $60_{B-1}$ and $60_{B-2}$ according to the working example 2 and the modifications 1 and 2 to the working example 2 described hereinabove, basically similar working-effects to those of the unit pixel $60_A$ according to the working example 1 can be achieved. In particular, by using an embedded MOS capacitor as the first charge accumulation portion 66 and using a capacitor having a capacitance value per unit area higher than that of the first charge accumulation portion 66 as the second charge accumulation portion 67, a greater saturation amount can be assured. Where the saturation charge amount may be equal, reduction of the pixel size can be achieved by an amount by which the space of the pixels can be reduced.

Besides, by accumulating, upon all pixel simultaneous readout, photocharge in a low illuminance state into the first charge accumulation portion 66, which has good properties at dark such as dark current or white spots, but accumulating photocharge in a high illuminance state into the second charge accumulation portion 67 which is not good in property at dark, the picture quality of a picked up image at dark and in a low illuminance state is not deteriorated from that of the existing art which implements the global exposure.

Pixel Sharing

In addition to the working-effects described above, with the unit pixels $60_B$, $60_{B-1}$ and $60_{B-2}$ according to the working example 2 and the modifications 1 and 2 to the working example 2 described hereinabove, there is an advantage that a circuit element which configures a pixel can be shared between or among a plurality of pixels. This pixel sharing arises from the fact that the fourth transfer gate portion 72 is added to the configuration of the working example 1 such that an overflow path is formed between the photodiode 61 and the second charge accumulation portion 67 by the fourth transfer gate portion 72. A particular example of the pixel sharing is described below.

Figure 20:
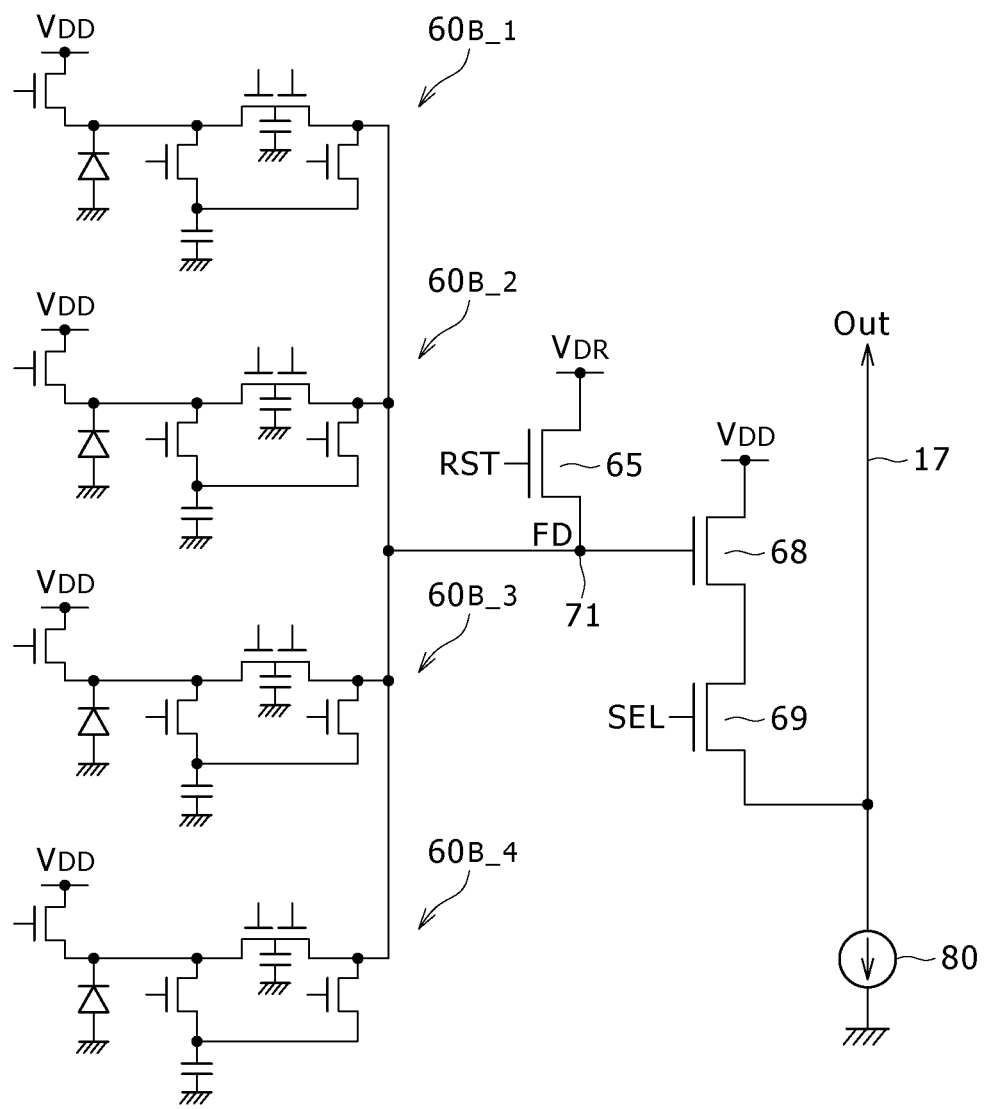
FIG. 20 depicts a circuit diagram showing a circuit configuration of a particular example 1 of pixel sharing that is consistent with the present invention.

FIG. 20 shows a circuit configuration of a particular example 1 of the pixel sharing. Here, a case in which part of pixel components are shared by four pixels $60_{B-1}$ to $60_{B-4}$ positioned adjacent each other is taken as an example. However, the number of sharing pixels is not limited to four. Further, as a relationship of the four adjacent pixels $60_{B-1}$ to $60_{B-4}$, a pixel component may be shared by four pixels including two pixels in the row direction and the column direction or by four pixels juxtaposed in the column direction.

In the particular example 1, pixel sharing in the pixel configuration of the unit pixel $60_B$ according to the working example 2 is taken as an example. With the unit pixel $60_B$ according to the working example 2, circuit elements following the floating diffusion portion 71 including the reset gate portion 65, that is, three circuit elements of the reset gate portion 65, amplification transistor 68 and selection transistor 69 can be shared among four pixels.

Figure 21:
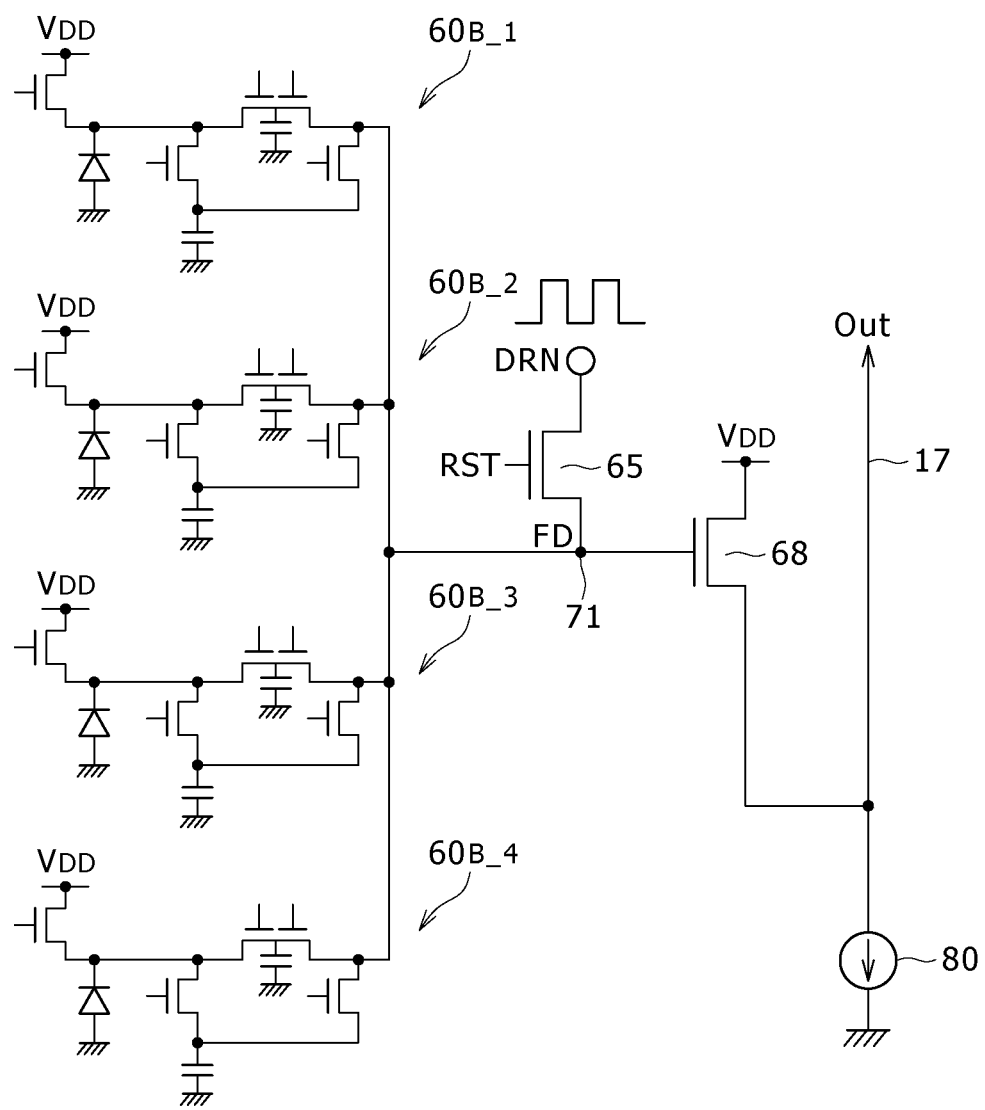
FIG. 21 depicts a circuit diagram showing a circuit configuration of a particular example 2 of pixel sharing that is consistent with the present invention.

FIG. 21 shows a circuit configuration of a particular example 2 of the pixel sharing. Here, a case in which part of pixel components are shared by four pixels $60_{B-1}$ to $60_{B-4}$ positioned adjacent each other is taken as an example. However, the number of sharing pixels is not limited to four. Further, as a relationship of the four adjacent pixels $60_{B-1}$ to $60_{B-4}$, a pixel component may be shared by four pixels, for example, including two pixels in the row direction and the column direction or by four pixels juxtaposed in the column direction.

In the particular example 2, pixel sharing in the pixel configuration of the unit pixel $60_B$ according to the modification 2 to the working example 2 is taken as an example. With the unit pixel $60_B$ according to the modification 2 to the working example 2, circuit elements following the floating diffusion portion 71, that is, two circuit elements of the reset gate portion 65 and amplification transistor 68 can be shared among four pixels.

By additionally using the sharing technique of a circuit element between or among a plurality of pixels in this manner, reduction of the space by reduction of the unit pixel size can be achieved in addition to working effects similar to those achieved by the unit pixel $60_A$ according to the working example 1. Then, by the reduction of the space, a greater saturation charge amount can be achieved. Where the saturation charge amount may be equal, reduction of the unit pixel size can be achieved by an amount corresponding to the reduced amount of the space.

3-3. Working Example 3

Circuit Configuration of Unit Pixel

Figure 22:
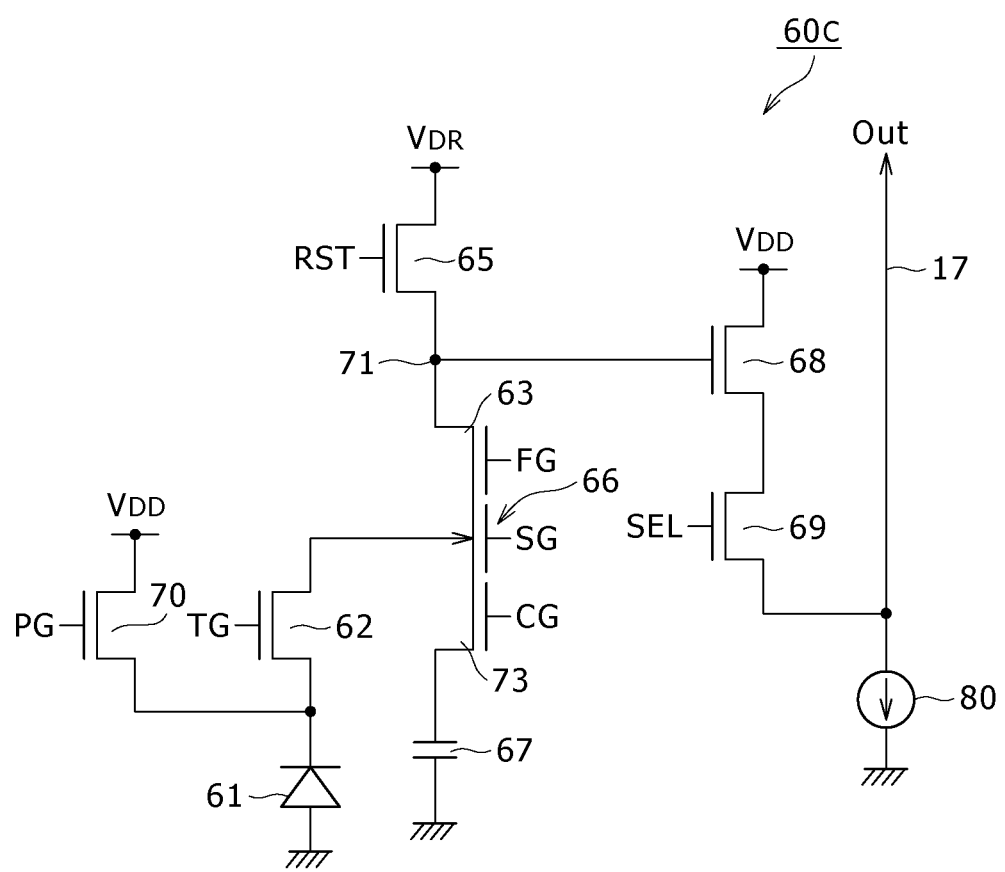
FIG. 22 depicts a circuit diagram showing a circuit configuration of a unit pixel that is consistent with the present invention.

FIG. 22 shows a circuit configuration of a unit pixel $60_C$ according to a working example 3.

Referring to FIG. 22, the unit pixel $60_C$ according to the working example 3 includes the following components in addition to a photodiode 61. In particular, the unit pixel $60_C$ according to the working example 3 includes first and second gate portions 62 and 63, a reset gate portion 65, first and second charge accumulation portions 66 and 67, an amplification transistor 68, a selection transistor 69, a charge discharging gate portion 70 and a fifth transfer gate portion 73.

In the unit pixel $60_C$ of the configuration described above, the first charge accumulation portion 66 is provided as an embedded MOS capacitor between the first transfer gate portion 62 and the second transfer gate portion 63. A driving signal SG is applied to the gate electrode of the first charge accumulation portion 66. The second charge accumulation portion 67 is configured from a capacitor having a capacitance value per unit area higher than that of the first charge accumulation portion 66 similarly to the working examples described above.

The first transfer gate portion 62 is connected between the photodiode 61 and the first charge accumulation portion 66. The second transfer gate portion 63 is connected between the first charge accumulation portion 66 and the floating diffusion portion 71. The fifth transfer gate portion 73 is connected between the first charge accumulation portion 66 and the second charge accumulation portion 67. A driving signal CG is applied as a transfer signal to the gate electrode of the fifth transfer gate portion 73.

A circuit connection relationship of circuit elements other than the first, second and fifth transfer gate portions 62, 63 and 73 and the first and second charge accumulation portions 66 and 67 is similar to that of the working examples described above.

Pixel Structure of Unit Pixel

Figure 23:
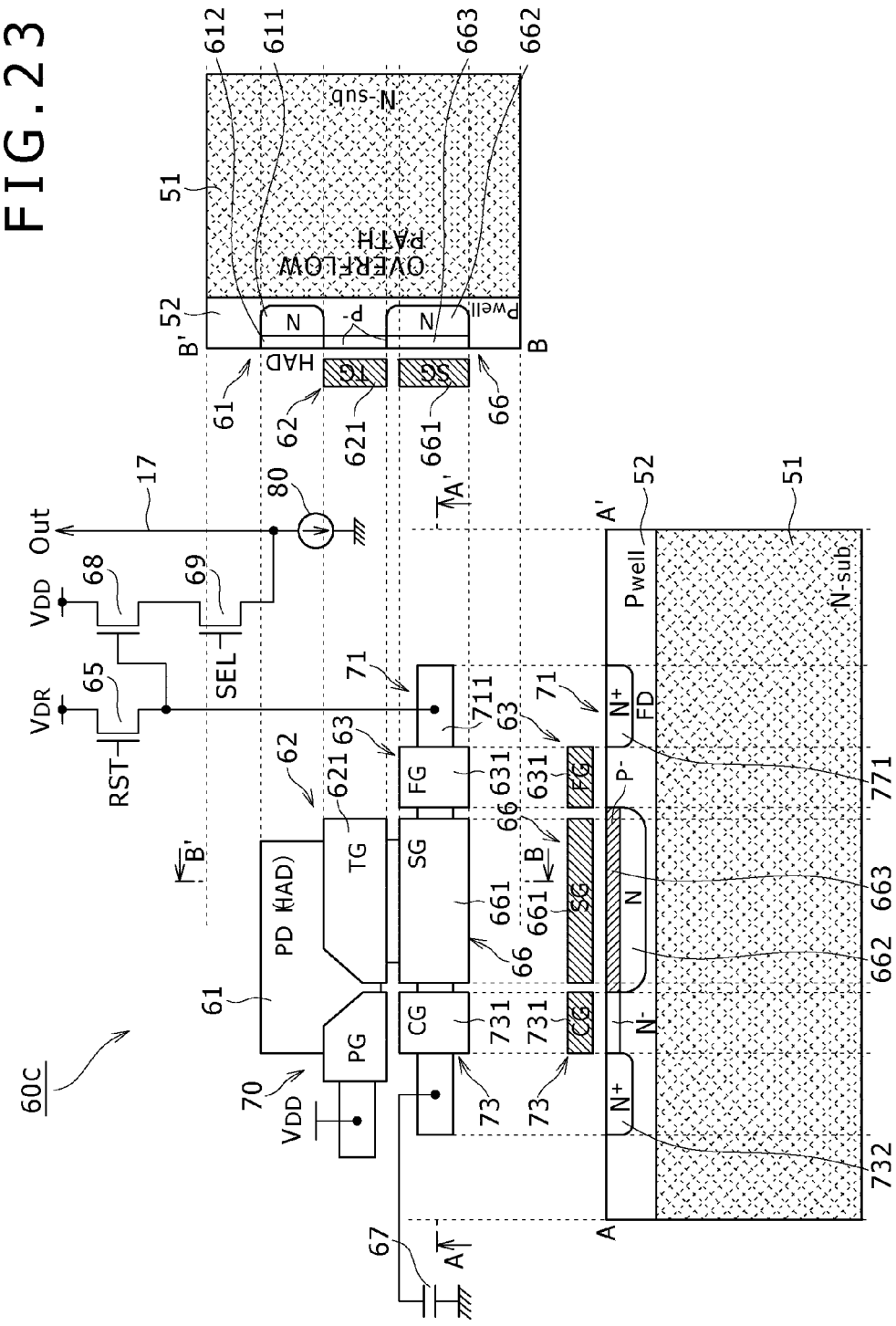
FIG. 23 depicts a schematic view showing a pixel structure of the unit pixel that is consistent with the present invention.

FIG. 23 shows a pixel structure of the unit pixel $60_C$ according to the working example 3. It is to be noted that FIG. 23 particularly shows a plane pattern representative of a pixel layout and sectional views of the plane pattern taken along line A-A' and line B-B'.

The first transfer gate portion 62 is configured such that it has a gate electrode 621 disposed on the substrate surface with a gate insulating film (not shown) interposed therebetween and a P-type semiconductor region 622 is formed on a substrate surface layer portion. The P-type semiconductor region 622 deepens the potential under the gate electrode 621 a little in comparison with an alternative case in which the P-type semiconductor region 622 is not formed.

Consequently, as apparent from a sectional view taken along line B-B' in FIG. 23, the P-type semiconductor region 622 forms an overflow path for transferring photocharge exceeding a predetermined amount overflowing from the photodiode 61 to the first charge accumulation portion 66. The photocharge exceeding the predetermined amount is photocharge which exceeds the saturation charge amount of the photodiode 61.

The first charge accumulation portion 66 has a gate electrode 661 disposed on the substrate surface with a gate insulating film (not shown) interposed therebetween and is formed as an embedded MOS capacitor under the gate electrode 661. In other words, the first charge accumulation portion 66 is configured from an embedded MOS capacitor formed from an N-type semiconductor region 662 formed in the P-type well 52 of the gate electrode 661 and a P-type semiconductor region 623 formed on a surface layer portion of the N-type semiconductor region 662.

The second transfer gate portion 63 has a gate electrode 631 disposed on the substrate surface with a gate insulating film (not shown) interposed therebetween. In the second transfer gate portion 63, the N-type semiconductor region 662 of the first charge accumulation portion 66 is used as one of the source and drain regions, and the $N^+$-type semiconductor region 711 serving as the floating diffusion portion 71 is used as the other of the source and drain regions.

As apparent from the foregoing description, the unit pixel $60_C$ according to the working example 3 has a pixel structure wherein the first charge accumulation portion 66 is formed as an embedded MOS capacitor under the gate electrode 661 of the first charge accumulation portion 66 formed adjacent the first and second gate portions 62 and 63.

The fifth transfer gate portion 73 has a gate electrode 731 disposed on the substrate surface with a gate insulating film (not shown) interposed therebetween, and the N-type semiconductor region 662 of the first charge accumulation portion 66 is used as one of the source and drain regions of the fifth transfer gate portion 73. The second charge accumulation portion 67 is connected at one end thereof to the other of the source and drain regions of the fifth transfer gate portion 73.

In the pixel structure described above, the second transfer gate portion 63, the gate electrode 661 of the first charge accumulation portion 66 and the fifth transfer gate portion 73 act to couple or decouple the potentials of the floating diffusion portion 71, first charge accumulation portion 66 and second charge accumulation portion 67.

Circuit Operation of Unit Pixel

FIG. 24 illustrates circuit operation of the unit pixel $60_C$ according to the working example 3. FIG. 24 particularly illustrates a timing relationship of the selection signal SEL, reset signal RST, transfer signal TG, charge discharging controlling signal PG, transfer signal CG, transfer signal SG and transfer signal FG.

In the following, circuit operation of the unit pixel $60_C$ according to the working example 3 is described with reference to FIGS. 24 to 29B.

Figure 25A:
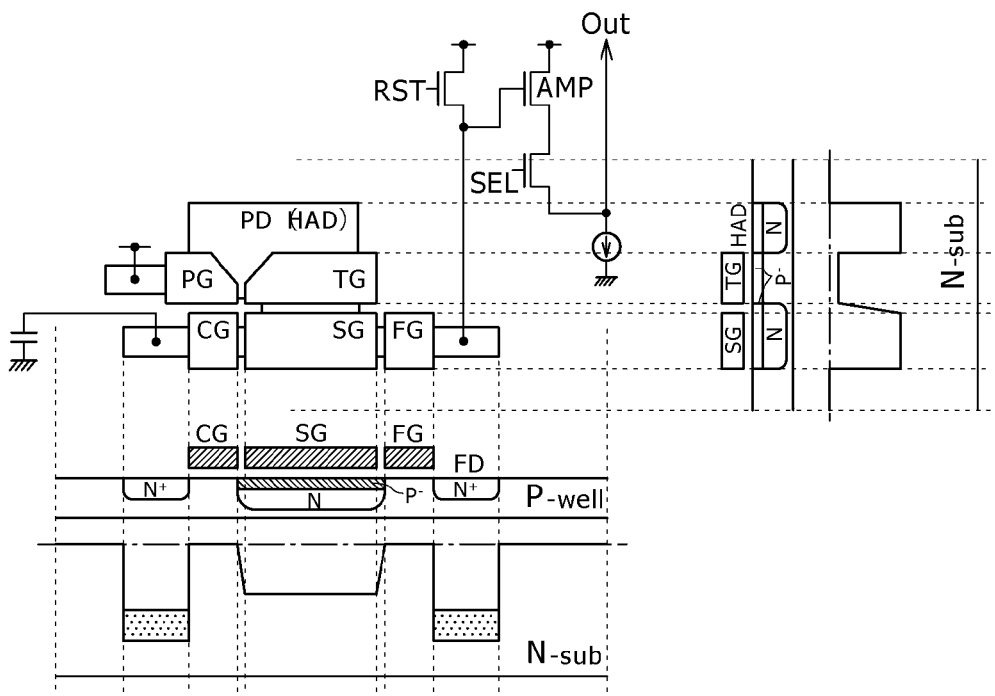
FIGS. 25A, 25B, 26A, 26B, 27A, 27B, 28A, 28B, 29A and 29B depict potential diagrams illustrating circuit operation of the unit pixel that are consistent with the present invention.
Figure 25B:
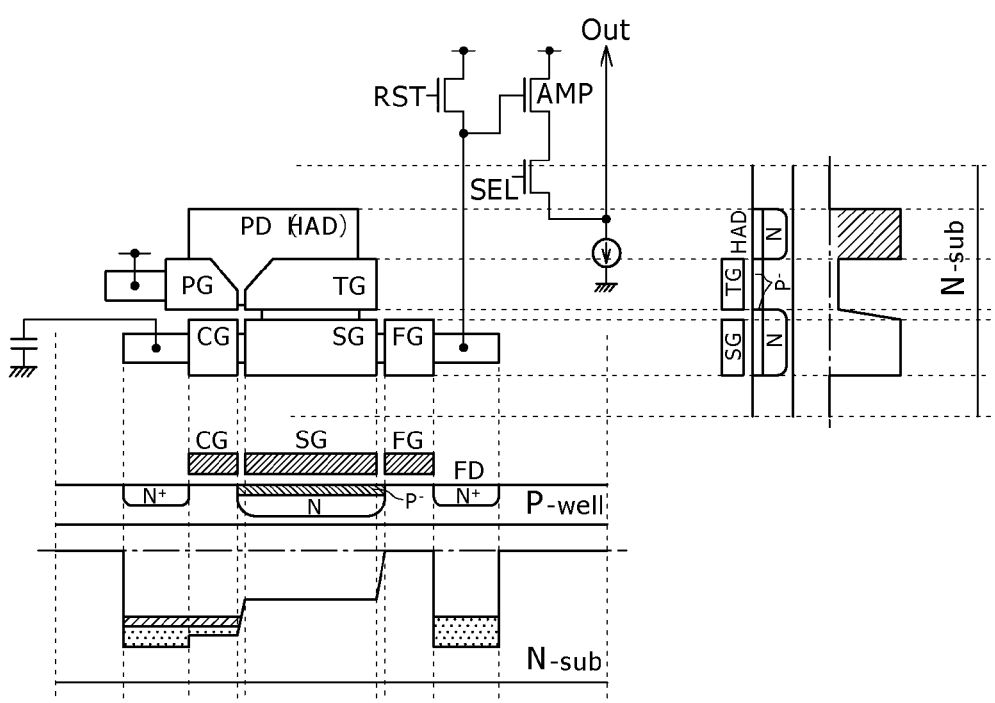

First at time $t_{41}$, the charge discharging controlling signal PG is placed into an inactive state simultaneously with regard to all pixels to place the charge discharging gate portion 70 into a non-conducting state thereby to enter an exposure period common to all pixels as seen from FIG. 25A. At time $t_{41}$, since the transfer signal CG is placed into an active stage simultaneously, the fifth transfer gate portion 73 is placed into a conducting state.

Within the exposure period, photocharge in a high illuminance state is accumulated into the photodiode 61, and in addition, photocharge overflowing from the photodiode 61 is accumulated into the first charge accumulation portion 66 through the overflow path of the first transfer gate portion 62. Further, since the fifth transfer gate portion 73 is in a conducting state, the photocharge overflowing from the first charge accumulation portion 66 is accumulated also into the second charge accumulation portion 67 through the fifth transfer gate portion 73. However, in a low illuminance state, accumulation of photocharge is carried out only into the photodiode 61.

Figure 26A:
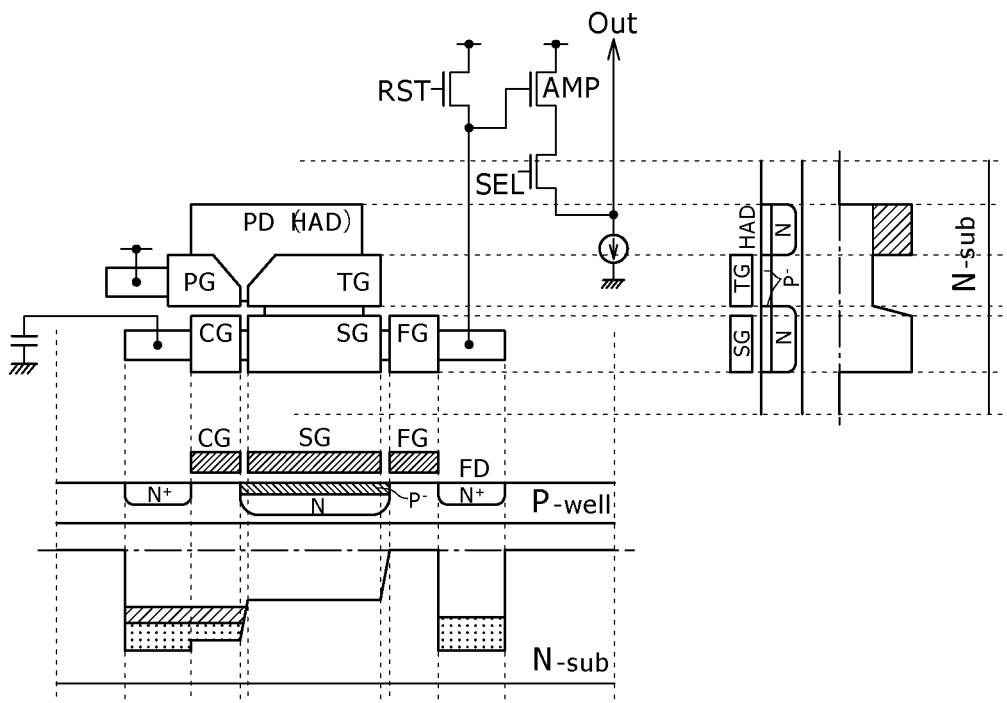

Then at time $t_{42}$, the transfer signal TG is driven with an intermediate potential VM so that photocharge exceeding a predetermined charge amount which depends upon the intermediate potential VM is accumulated from the photodiode 61 into both of the first charge accumulation portion 66 and the second charge accumulation portion 67 through the first transfer gate portion 62 as seen from FIG. 26A. The predetermined charge amount here is the saturation charge amount of the first charge accumulation portion 66. Consequently, in subsequent operation, that is, when the second transfer gate portion 63 is placed into a non-conducting state to transfer the photocharge accumulated in the photodiode 61 to the first charge accumulation portion 66, photocharge is prevented from overflowing from the first charge accumulation portion 66.

Figure 26B:
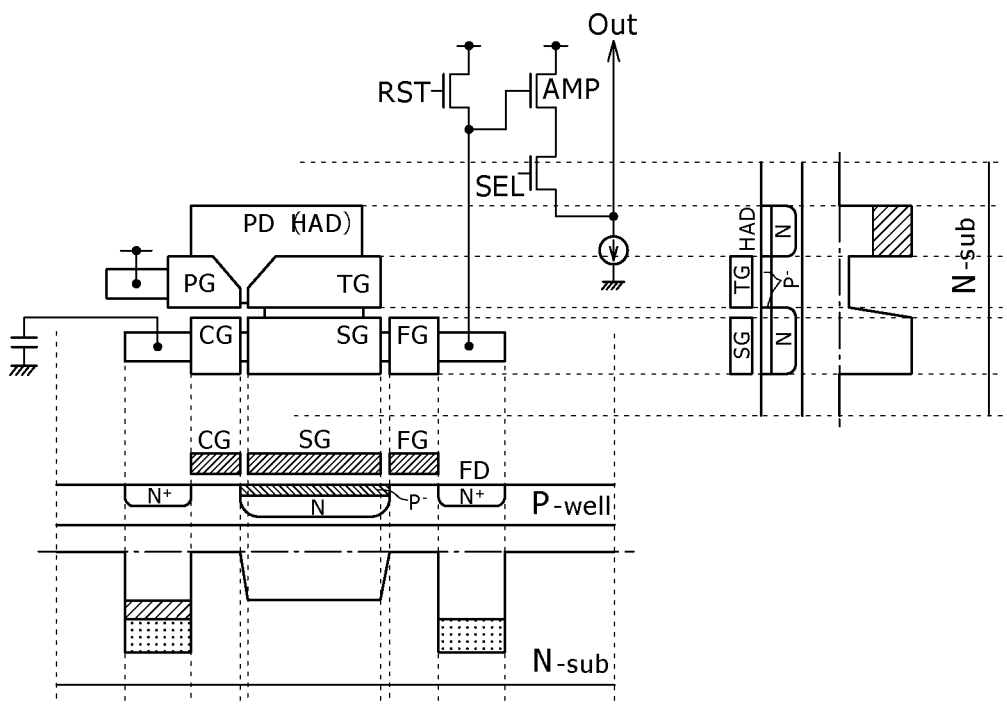

Then at time $t_{43}$, the transfer signal CG is placed into an inactive state to place the fifth transfer gate portion 73 into a non-conducting state. The potential state at this time is illustrated in FIG. 26B.

Figure 27A:
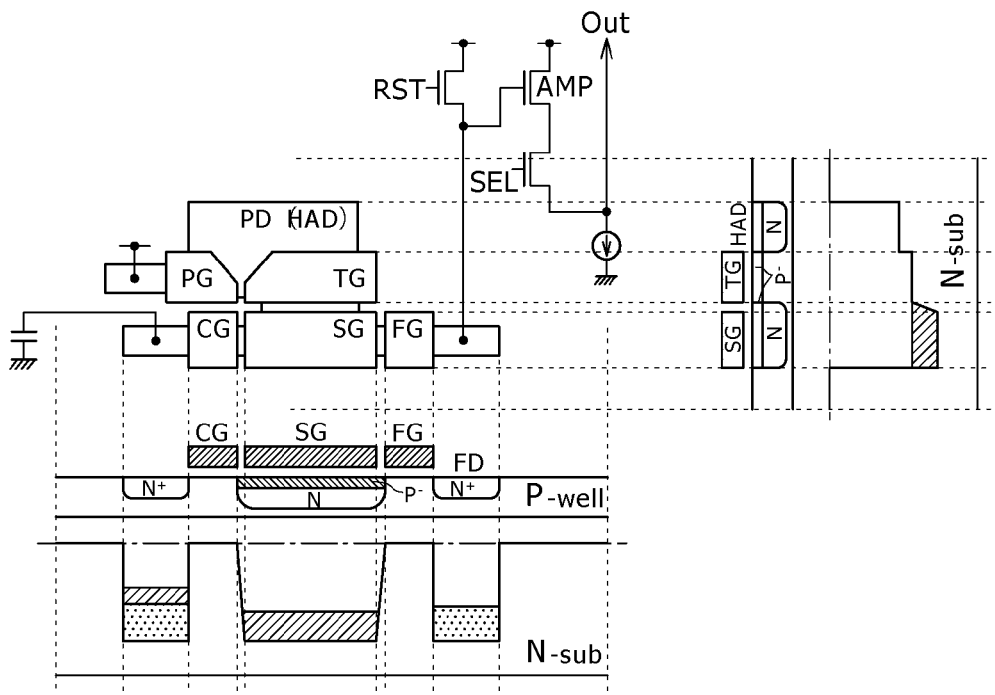

Then at time $t_{44}$, the transfer signals TG and SG are placed into an active state simultaneously with regard to all pixels to place the gate electrode of the first transfer gate portion 62 and the first charge accumulation portion 66 into a conducting state. Consequently, the photocharge accumulated in the photodiode 61 is transferred to and accumulated into the first charge accumulation portion 66 as seen in FIG. 27A.

Then at time $t_{45}$, the transfer signal TG is placed into an inactive state and simultaneously the charge discharging controlling signal PG is placed into an active state to place the first transfer gate portion 62 into a non-conducting state at the same time with regard to all pixels. Simultaneously, the charge discharging gate portion 70 is placed into a conducting state. Consequently, the exposure period common to all pixels ends. At this time, also the transfer signal SG is placed into an inactive state.

Figure 27B:
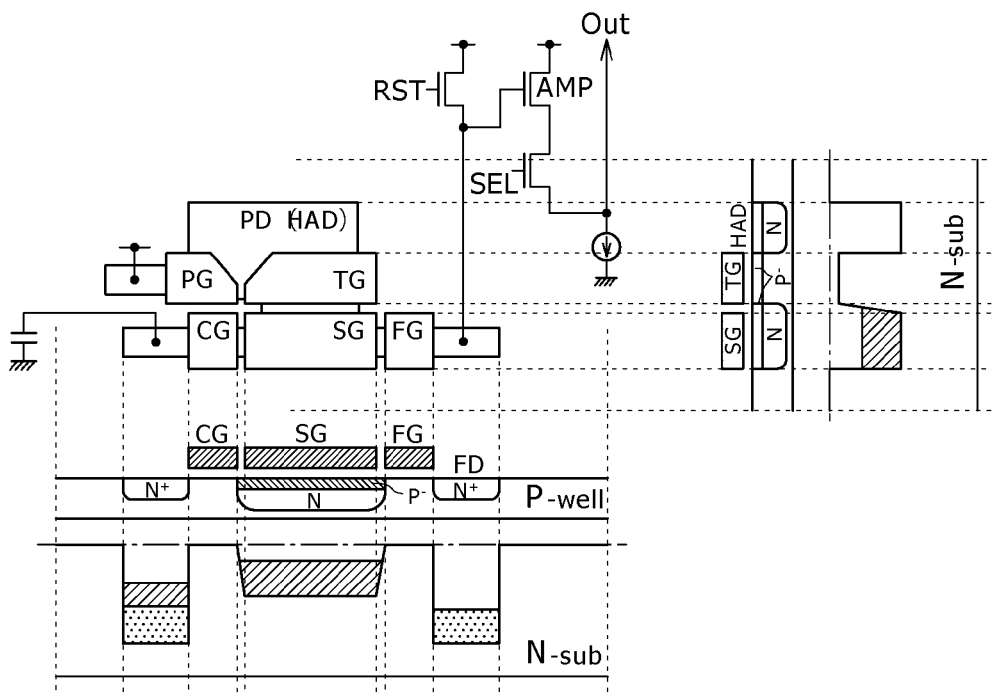

The potential state at the end of the exposure is illustrated in FIG. 27B. At this time, photocharge in a high illuminance state is accumulated into both of the first charge accumulation portion 66 and the second charge accumulation portion 67. Photocharge in a low illuminance state is accumulated only into the first charge accumulation portion 66.

Then at time $t_{46}$, the selection signal SEL for the Nth row is placed into an active state to place the selection transistors 69 in the Nth row into a conducting state to place the unit pixels $60_C$ in the Nth row into a selected state. Simultaneously, the reset signal RST is placed into an active state to place the reset gate portion 65 into a conducting state to reset the floating diffusion portion 71. Then at time $t_{47}$ at which the reset signal RST is placed into an inactive state, the potential at the floating diffusion portion 71 is outputted as the first reset level $N_1$ to the vertical signal line 17 through the amplification transistor 68 and the selection transistor 69.

Figure 28A:
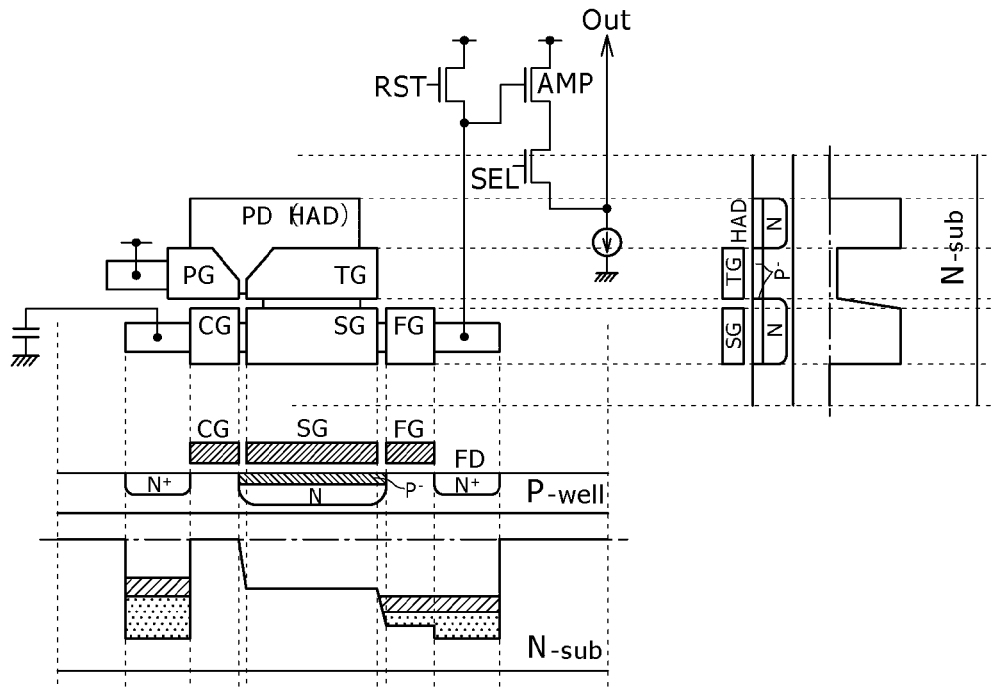

Then at time $t_{48}$, the transfer signal FG is placed into an active state to place the second transfer gate portion 63 into a conducting state to transfer the photocharge accumulated in the first charge accumulation portion 66 to the floating diffusion portion 71. The potential state at this time is illustrated in FIG. 28A. The transfer of the photocharge continues till time $t_{49}$ at which the transfer signal FG is placed into an inactive state.

Figure 28B:
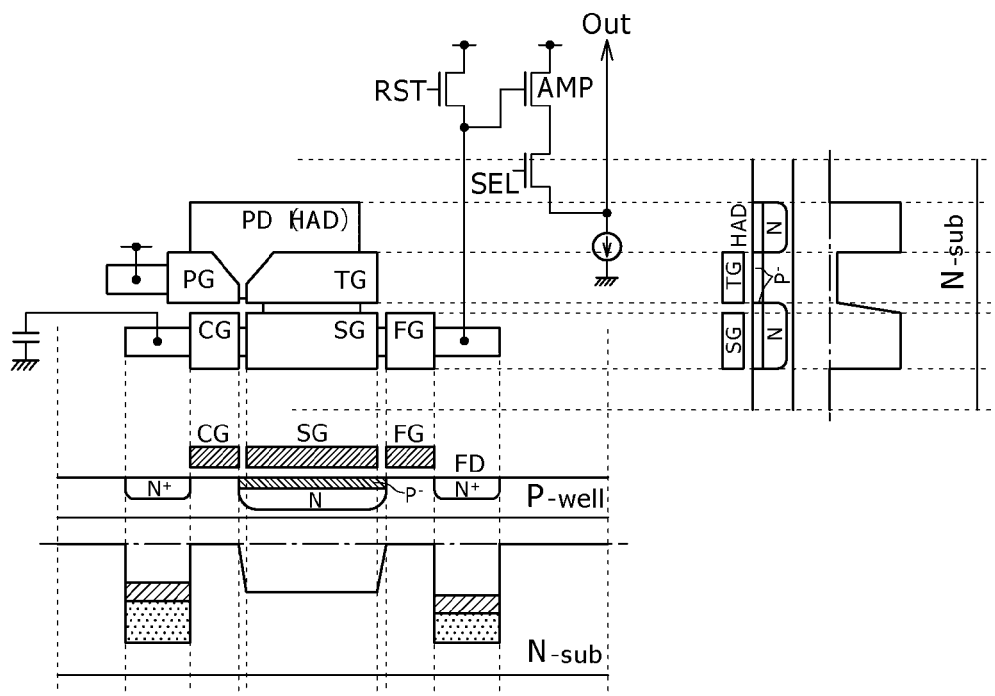

The potential state at this time is illustrated in FIG. 28B. Then, the potential of the floating diffusion portion 71 at time $t_{49}$ at which the transfer of the photocharge ends is outputted as the first signal level $S_1$ corresponding to the accumulated charge amount of the first charge accumulation portion 66 to the vertical signal line 17 through the amplification transistor 68 and the selection transistor 69.

Figure 29A:
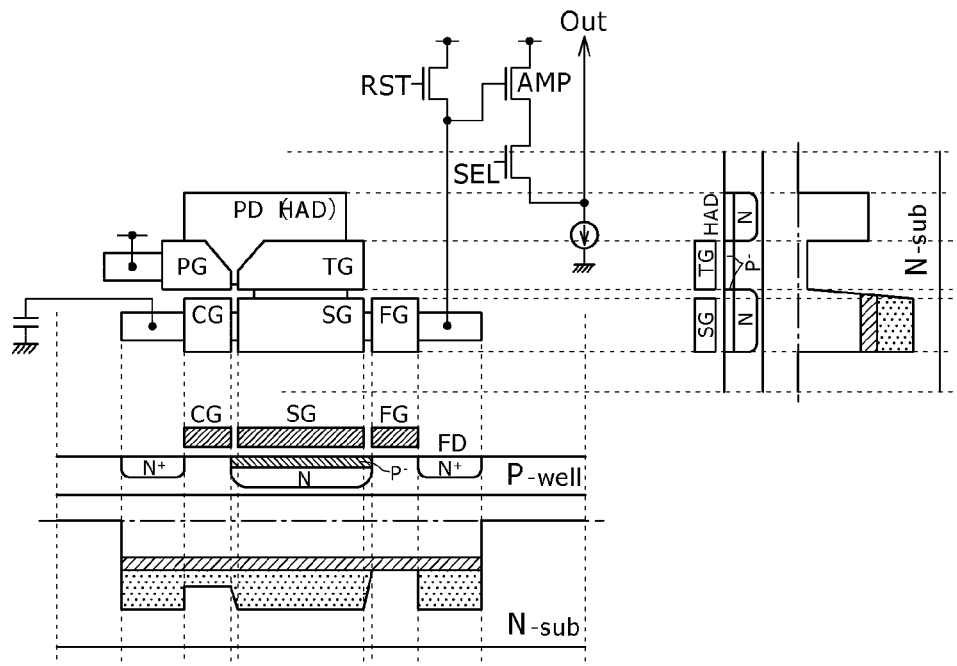

Then, when the transfer signals CG, SG and FG are placed into an active state at time $t_{50}$, the fifth transfer gate portion 73, the gate electrode 661 of the first charge accumulation portion 66 and the second transfer gate portion 63 are placed into a conducting state. Consequently, since the potentials of the floating diffusion portion 71, first charge accumulation portion 66 and second charge accumulation portion 67 are coupled, photocharge is accumulated over the overall coupled region as seen in FIG. 29A. Then, this photocharge is outputted as the second signal level $S_2$ to the vertical signal line 17 through the amplification transistor 68 and the selection transistor 69.

Figure 29B:
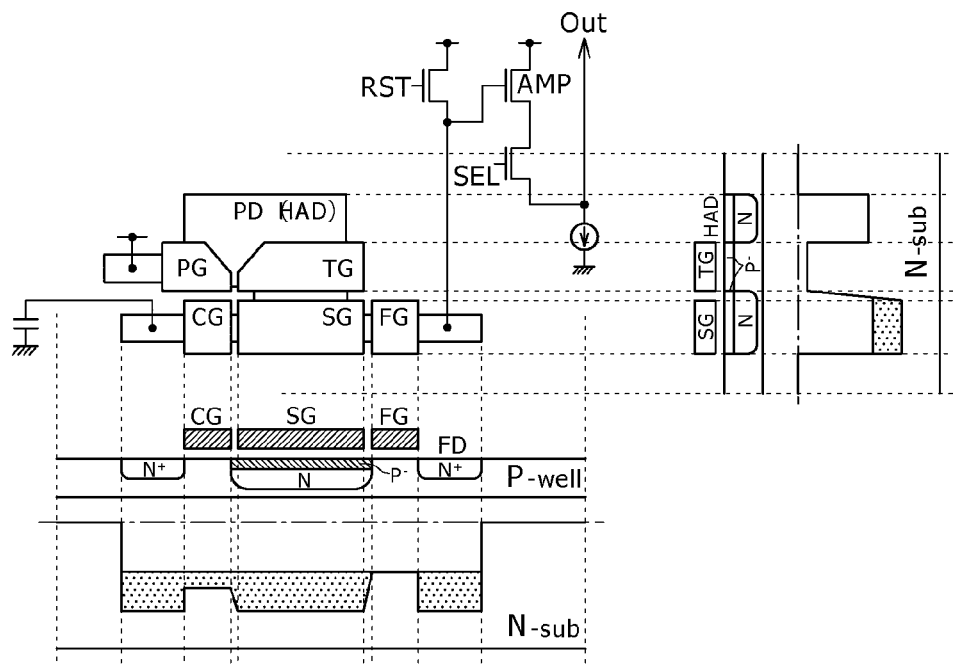

Then at time $t_{51}$, the reset signal RST is placed into an active state to reset the region in which the potentials are coupled. The potential state at this time is illustrated in FIG. 29B. Then at time $t_{52}$ at which the reset signal RST is placed into an inactive state, the potential in the region in which the potentials are coupled is outputted as the second reset level $N_2$ to the vertical signal line 17 through the amplification transistor 68 and the selection transistor 69.

Then, after time $t_{53}$, the transfer signal FG, transfer signal SG and transfer signal CG are successively placed into an inactive state in this order to place the second transfer gate portion 63, the gate electrode 661 of the first charge accumulation portion 66 and the fifth transfer gate portion 73 into a non-conducting state. Consequently, such an initial potential state at time $t=t_{41}$ as illustrated in FIG. 25A is restored. The reason why the transfer signal FG, transfer signal SG and transfer signal CG are placed into an inactive state successively in this order is that it is intended to accumulate channel charge accumulated on the substrate surface into the second charge accumulation portion 67 while the gate electrode 661 of the first charge accumulation portion 66 is in a conducting state. Since, different from the floating diffusion portion 71, resetting is not carried out only for the second charge accumulation portion 67, there is no possibility that resetting of the channel charge may give rise to an offset in a pixel signal.

By the series of circuit operations described above, the first reset level $N_1$, first signal level $S_1$, second signal level $S_2$ and second reset level $N_2$ are outputted successively in order from the unit pixel $60_C$ to the vertical signal line 17.

Modification 1 to Working Example 3

Figure 30:
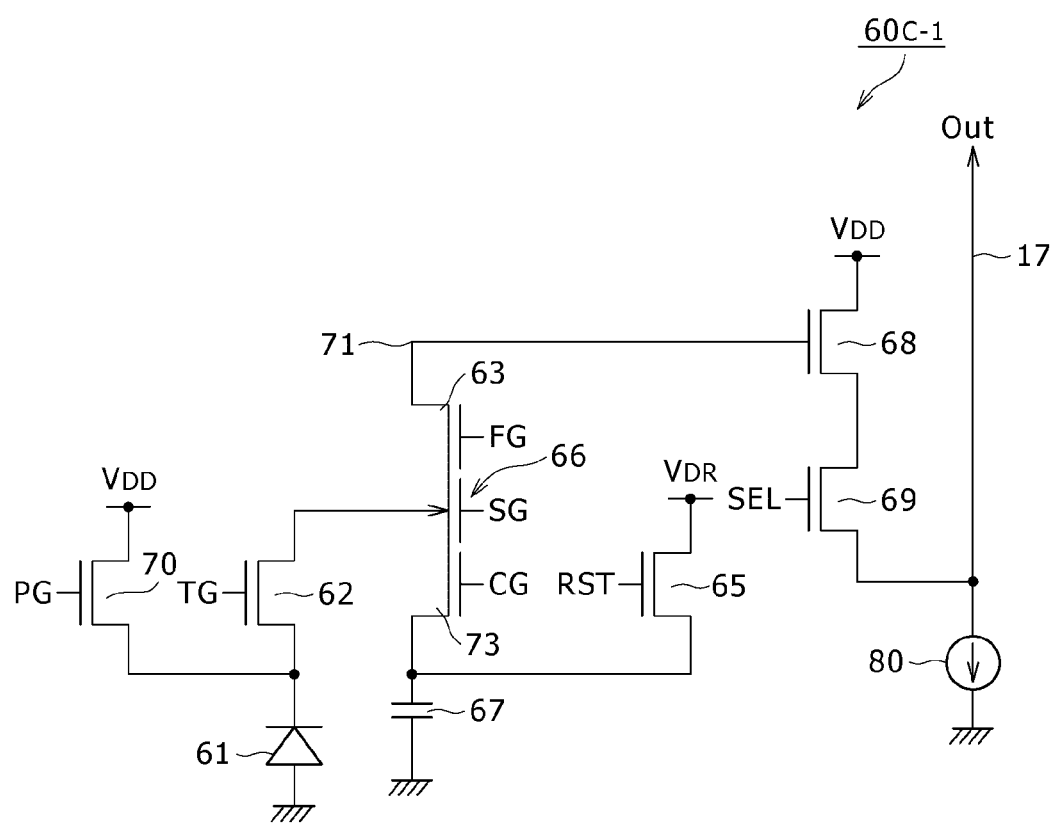
FIG. 30 depicts a circuit diagram showing a circuit configuration of a unit pixel that is consistent with the present invention.

FIG. 30 shows a circuit configuration of a unit pixel $60_{C-1}$ according to a modification 1 to the working example 3.

Also the unit pixel $60_{C-1}$ according to the present modification 1 includes circuit components similar to those of the unit pixel $60_C$ according to the working example 3. In particular, referring to FIG. 30, the unit pixel $60_{C-1}$ according to the present modification 1 includes a photodiode 61, a reset gate portion 65, first and second charge accumulation portions 66 and 67, an amplification transistor 68, a selection transistor 69 and a charge discharging gate portion 70 and additionally includes three transfer gates 62, 63 and 73.

The unit pixel $60_{C-1}$ according to the present modification 1 is different from the unit pixel $60_C$ according to the working example 3 in the connection position of the reset transistor 65 similarly as in the case of the unit pixel $60_{B-1}$ according to the modification 1 to the working example 2. In particular, the reset transistor 65 is connected between the fifth transfer gate portion 73 and second charge accumulation portion 67 and the reset voltage $V_{DR}$.

Also with the unit pixel $60_{C-1}$ according to the present modification 1, although circuit operation is different a little, working-effects similar to those of the unit pixel $60_C$ according to the working example 3 can be achieved.

Figure 31:
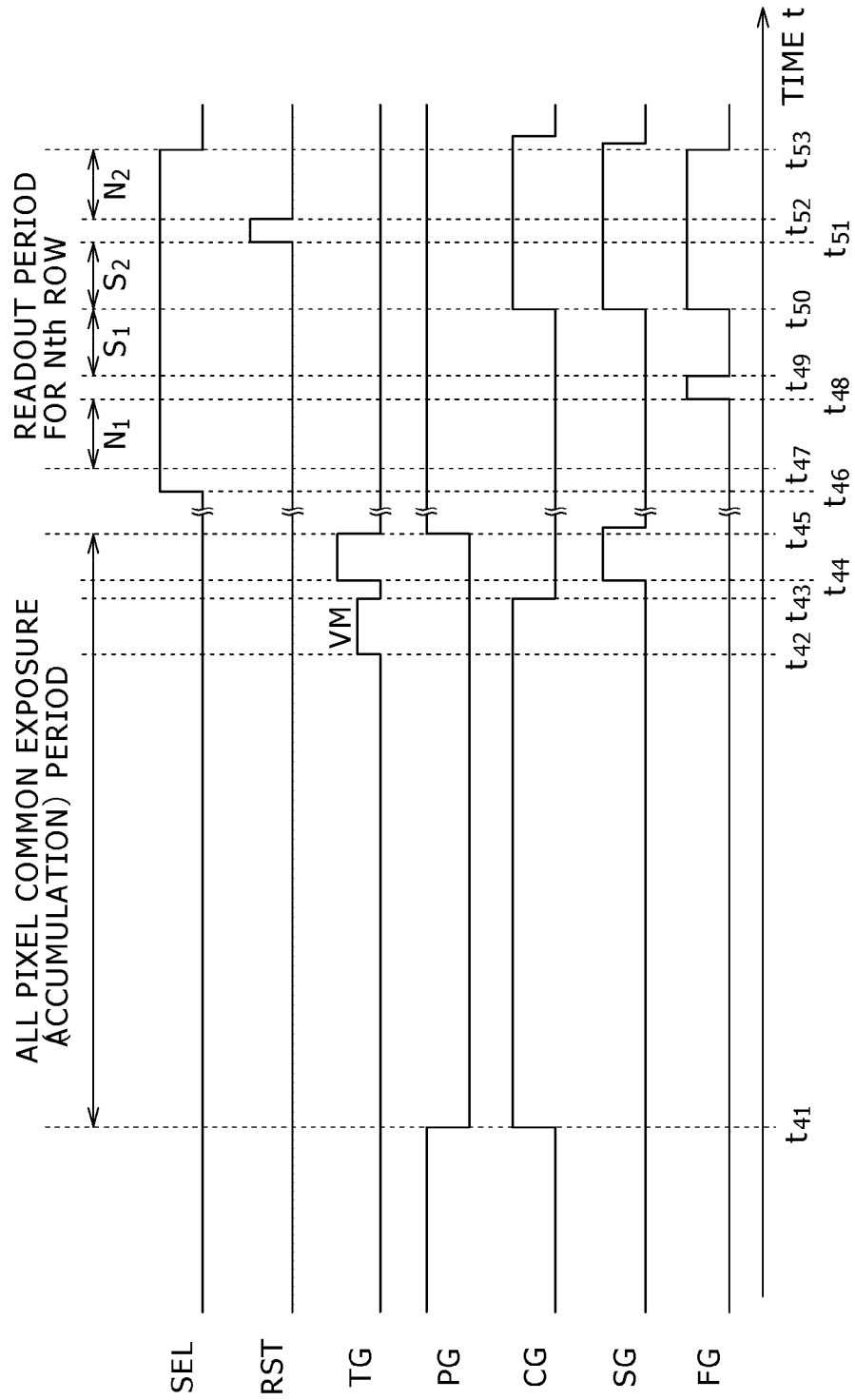
FIG. 31 depicts a timing chart illustrating circuit operation of the unit pixel that is consistent with the present invention.

FIG. 31 illustrates circuit operation of the unit pixel $60_{C-1}$ according to the modification 1 to the working example 3. The circuit operation of the unit pixel $60_{C-1}$ according to the modification 1 to the working example 3 is different from that of the unit pixel $60_C$ according to the working example 3 only in that, as apparent from the timing chart of FIG. 31, reset operation for the floating diffusion portion 71 for reading out the first reset level $N_1$ is not carried out.

However, even if a reset operation is not carried out for the current frame, a reset operation is carried out when the second reset level $N_2$ of the preceding frame is read out. Accordingly, even if a reset operation is not carried out intentionally in order to acquire the first reset level $N_1$ of the current frame, there is no problem in signal processing even though the potential of the floating diffusion portion 71 after pixel selection in the current frame is used as the first reset level $N_1$.

Modification 2 to Working Example 3

Figure 32:
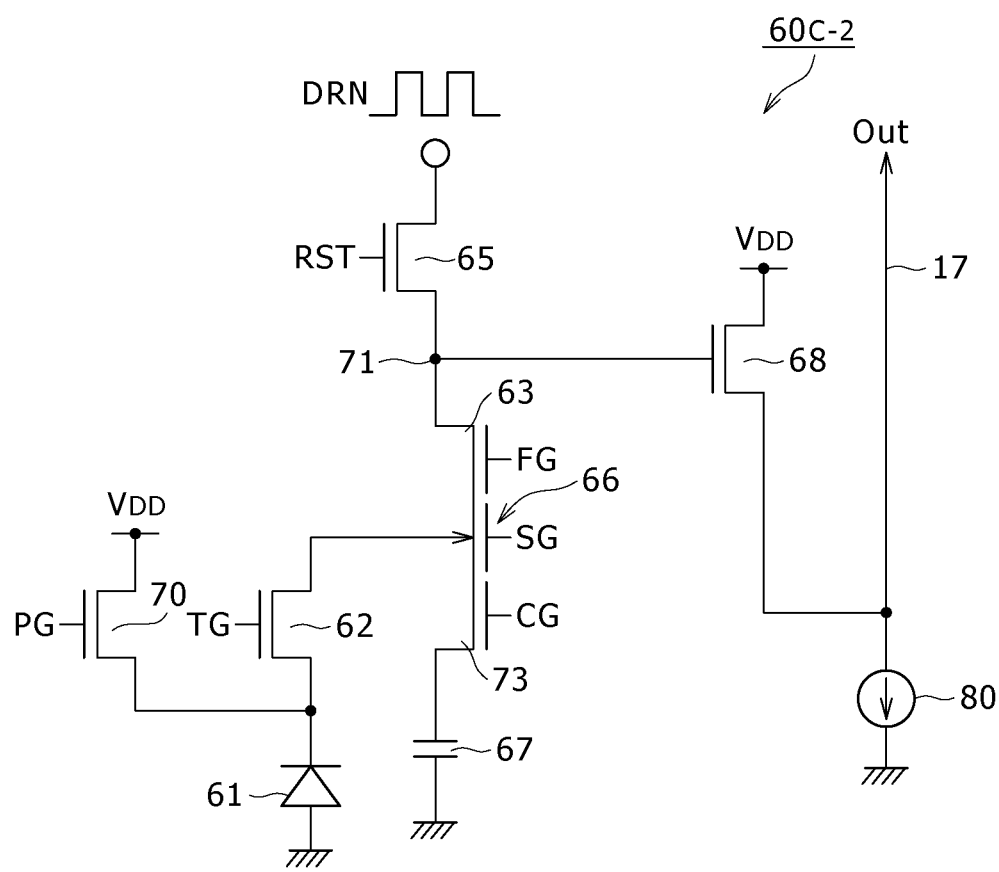
FIG. 32 depicts a circuit diagram showing a circuit configuration of a unit pixel that is consistent with the present invention.

FIG. 32 shows a circuit configuration of a unit pixel $60_{C-2}$ according to a modification 2 to the working example 3.

The unit pixel $60_{C-2}$ according to the present modification 2 is similar to the unit pixel $60_C$ according to the working example 3 in that it includes the fifth transfer gate portion 73, but is different in that the selection transistor 69 is omitted similarly as in the unit pixel $60_{B-2}$ according to the modification 2 to the working example 2. In the unit pixel $60_{C-2}$ according to the present modification 2, the pixel selection function of the selection transistor 69 is implemented by variation of the drain voltage DRN to be applied to the drain electrode of the reset transistor 65.

In particular, a high voltage is applied as the drain voltage DRN to the drain electrode of the reset transistor 65 to place the amplification transistor 68 into an activated state so that it carries out outputting operation of a signal. In particular, the amplification transistor 68 carries out an action as a selection transistor in addition to the changeover operation of the drain voltage DRN. Since the selection transistor 69 is omitted, there is an advantage that one circuit component of the unit pixel 60 can be omitted per one pixel.

Figure 33:
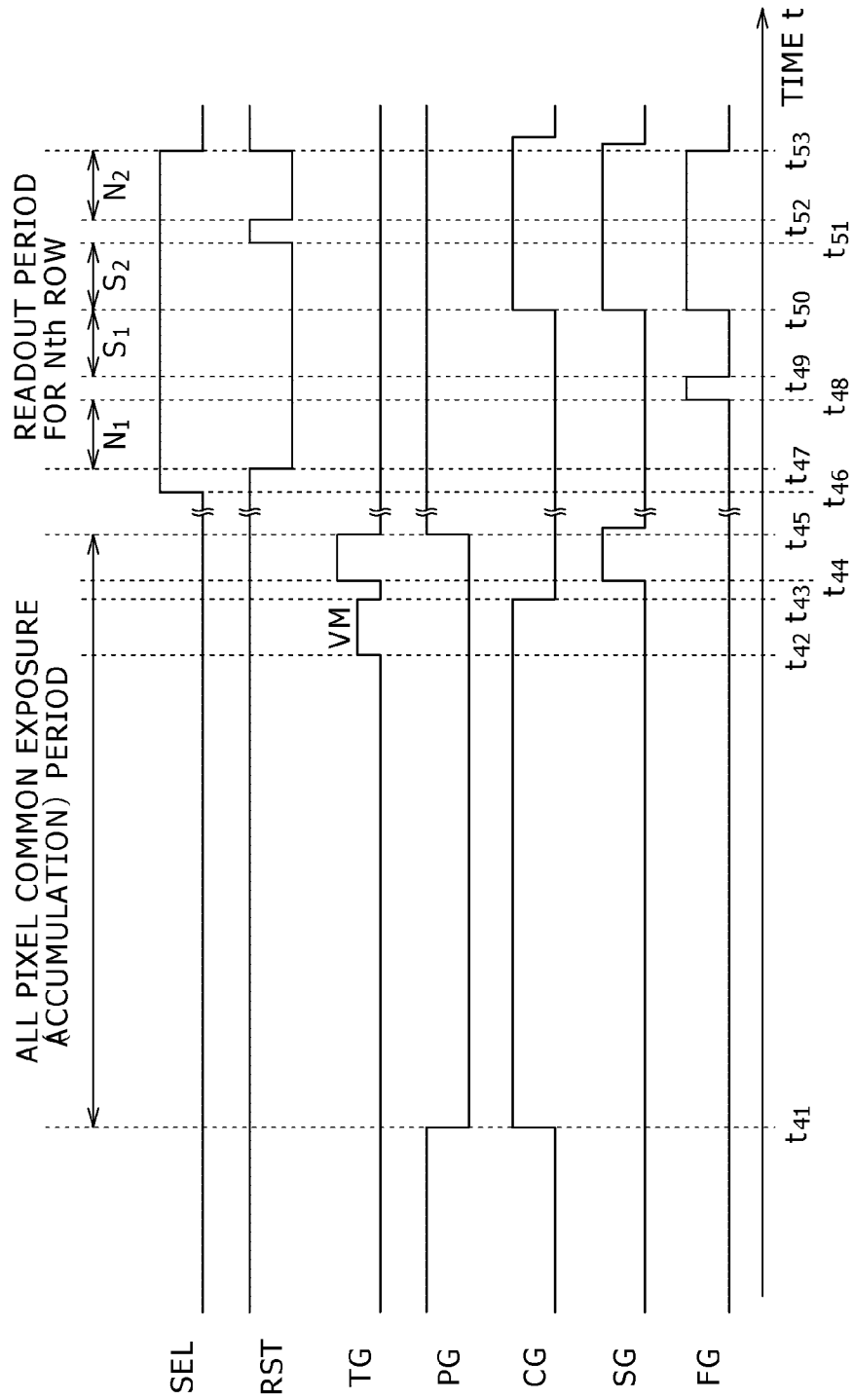
FIG. 33 depicts a timing chart illustrating circuit operation of the unit pixel that is consistent with the present invention.

FIG. 33 illustrates circuit operation of the unit pixel $60_{C-2}$ according to the modification 2 to the working example 3. The circuit operation of the unit pixel $60_{C-2}$ according to the modification 2 to the working example 3 is different only in the timing of the reset signal RST from the circuit operation of the unit pixel $60_{C-1}$ according to the modification 1 to the working example 3 but is basically similar.

With the unit pixels $60_C$, $60_{C-1}$ and $60_{C-2}$ according to the working example 3 and the modifications 1 and 2 to the working example 3 described above, basically similar working-effects to those of the unit pixel $60_A$ according to the working example 1 can be achieved. In particular, by using an embedded MOS capacitor as the first charge accumulation portion 66 and using a capacitor having a capacitance value per unit area higher than that of the first charge accumulation portion 66 as the second charge accumulation portion 67, a greater saturation amount can be assured. Where the saturation charge amount may be equal, reduction of the pixel size can be achieved by an amount by which the space of the pixels can be reduced.

Besides, by accumulating, upon all pixel simultaneous readout, photocharge in a low illuminance state into the first charge accumulation portion 66, which has good properties at dark such as dark current or white spots, but accumulating photocharge in a high illuminance state into the second charge accumulation portion 67 which is not good in property at dark, the picture quality of a picked up image at dark and in a low illuminance state is not deteriorated from that of the existing art which implements the global exposure.

Further, the fifth transfer gate portion 73 for transferring photocharge overflowing from the photodiode 61 to the second charge accumulation portion 67 is connected between the first charge accumulation portion 66 and the second charge accumulation portion 67. Consequently, the conversion efficiency when photocharge is converted into a voltage signal by the floating diffusion portion 71 can be raised in comparison with that in the working example 2.

In particular, in the case of the working example 2, the second transfer gate portion 63, third transfer gate portion 64 and one of the source and drain regions of the reset gate portion 65 are connected to the floating diffusion portion 71 to which the gate electrode of the amplification transistor 68 is connected. In contrast, in the case of the working example 3, the second transfer gate portion 63 and one of the source and drain regions of the reset gate portion 65 are connected to the floating diffusion portion 71.

Consequently, the overall capacitance value connecting to the floating diffusion portion 71 is lower in the working example 3 than in the working example 2. As well known in the art, the conversion efficiency upon conversion of photocharge into a voltage signal depends upon the capacitance value of the floating diffusion portion 71, particularly upon the overall capacitance value connecting to the floating diffusion portion 71. Thus, where the capacitance value is low, the conversion efficiency is high, and therefore, the working example 3 exhibits a conversion efficiency much higher than that of the working example 2. Accordingly, since a high S/N ratio can be assured with the unit pixels $60_C$, $60_{C-1}$ and $60_{C-2}$ according to the working example 3 and the modifications 1 and 2 to the working example 3, the unit pixels $60_C$, $60_{C-1}$ and $60_{C-2}$ are superior from the view point of improvement in picture quality.

Pixel Sharing

In addition to the working-effects described above, with the unit pixels $60_C$, $60_{C-1}$ and $60_{C-2}$ according to the working example 3 and the modifications 1 to the working example 3 described hereinabove, there is an advantage that a circuit element which configures a pixel can be shared between or among a plurality of pixels, similarly to the working example 2 and the modifications 1 and 2 to the working example 2. This pixel sharing arises from the fact that the fifth transfer gate portion 73 is added to the configuration of the working example 1 such that the photodiode 61 and the second charge accumulation portion 67 are connected by the fifth transfer gate portion 73 and so forth without connecting the floating diffusion portion 71. A particular example of the pixel sharing is described below.

Figure 34:
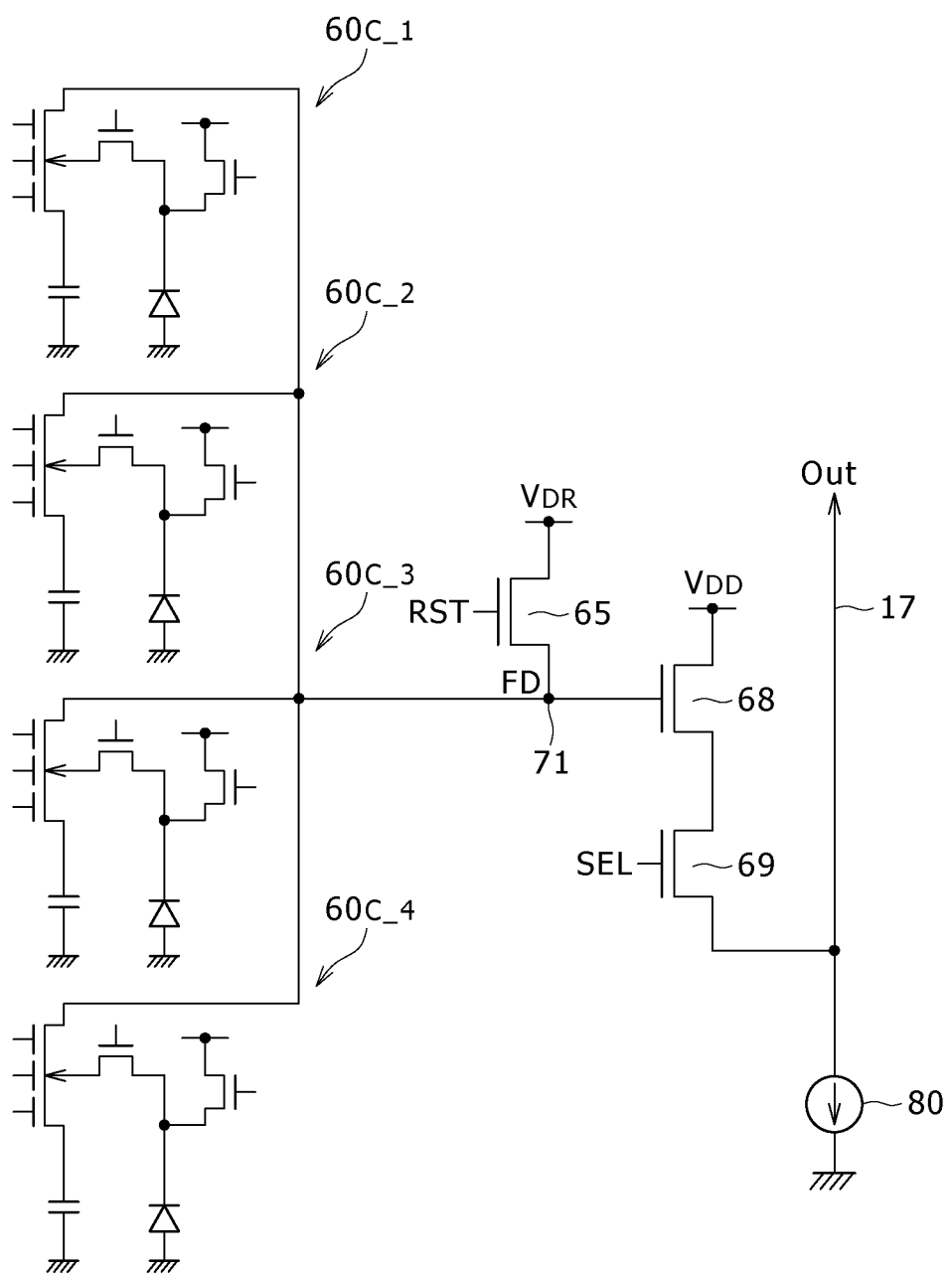
FIG. 34 depicts a circuit diagram showing a circuit configuration of a particular example 1 of pixel sharing that is consistent with the present invention.

FIG. 34 shows a circuit configuration of a particular example 1 of the pixel sharing. Here, a case in which part of pixel components are shared by four pixels $60_{C-1}$ to $60_{C-4}$ positioned adjacent each other is taken as an example. However, the number of sharing pixels is not limited to four. Further, as a relationship of the four adjacent pixels $60_{C-1}$ to $60_{C-4}$, a pixel component may be shared by four pixels, for example, including two pixels in the row direction and the column direction or by four pixels juxtaposed in the column direction.

In the particular example 1, pixel sharing in the pixel configuration of the unit pixel $60_B$ according to the working example 2 is taken as an example. With the unit pixel $60_B$ according to the working example 2, circuit elements following the floating diffusion portion 71 including the reset gate portion 65, that is, three circuit elements of the reset gate portion 65, amplification transistor 68 and selection transistor 69 can be shared among four pixels.

Figure 35:
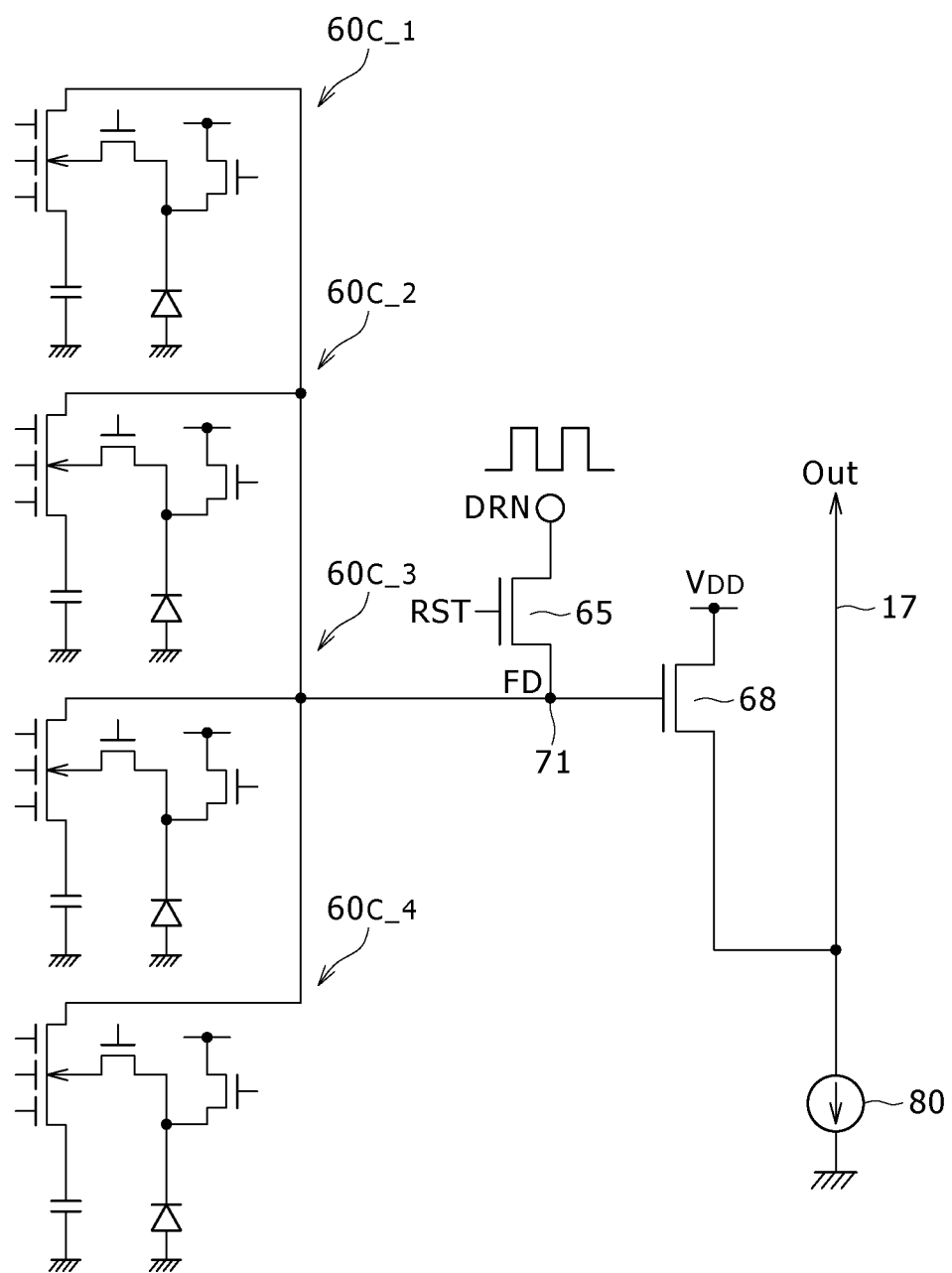
FIG. 35 depicts a circuit diagram showing a circuit configuration of a particular example 2 of pixel sharing that is consistent with the present invention.

FIG. 35 shows a circuit configuration of a particular example 2 of the pixel sharing. Also here, a case in which part of pixel components are shared by four pixels $60_{C-1}$ to $60_{C-4}$ positioned adjacent each other is taken as an example. However, the number of sharing pixels is not limited to four. Further, as a relationship of the four adjacent pixels $60_{C-1}$ to $60_{C-4}$, a pixel component may be shared by four pixels, for example, including two pixels in the row direction and the column direction or by four pixels juxtaposed in the column direction.

In the particular example 2, pixel sharing in the pixel configuration of the unit pixel $60_B$ according to the modification 2 to the working example 2 is taken as an example. With the unit pixel $60_B$ according to the modification 2 to the working example 2, circuit elements following the floating diffusion portion 71, that is, two circuit elements of the reset gate portion 65 and amplification transistor 68 can be shared among four pixels.

By additionally using the sharing technique of a circuit element between or among a plurality of pixels in this manner, reduction of the space by reduction of the unit pixel size can be achieved in addition to working-effects similar to those achieved by the unit pixel $60_A$ according to the working example 1. Then, by the reduction of the space, a greater saturation charge amount can be achieved. Where the saturation charge amount may be equal, reduction of the unit pixel size can be achieved by an amount corresponding to the reduced amount of the space.

3-4. Working Example 4

Now, a unit pixel $60_D$ according to a working example 4 is described.
Circuit Configuration of Unit Pixel The unit pixel 60D according to the working example 4 has a circuit configuration same as that of the unit pixel $60_C$ according to the working example 3 described hereinabove with reference to FIG. 22. In particular, the unit pixel $60_D$ according to the working example 4 includes, in addition to basic components 61, 65, 68 and 69, two first and second gate portions 62 and 63, two first and second charge accumulation portions 66 and 67, and a fifth transfer gate portion 73. Also the circuit connection scheme of the components is same as that of the unit pixel $60_C$ according to the working example 3.
Pixel Structure of Unit Pixel The unit pixel $60_D$ according to the working example 4 is different from the unit pixel $60_C$ according to the working example 3 in the structure of the fifth transfer gate portion 73. A particular structure of the fifth transfer gate portion 73 is described below.

Figure 37:
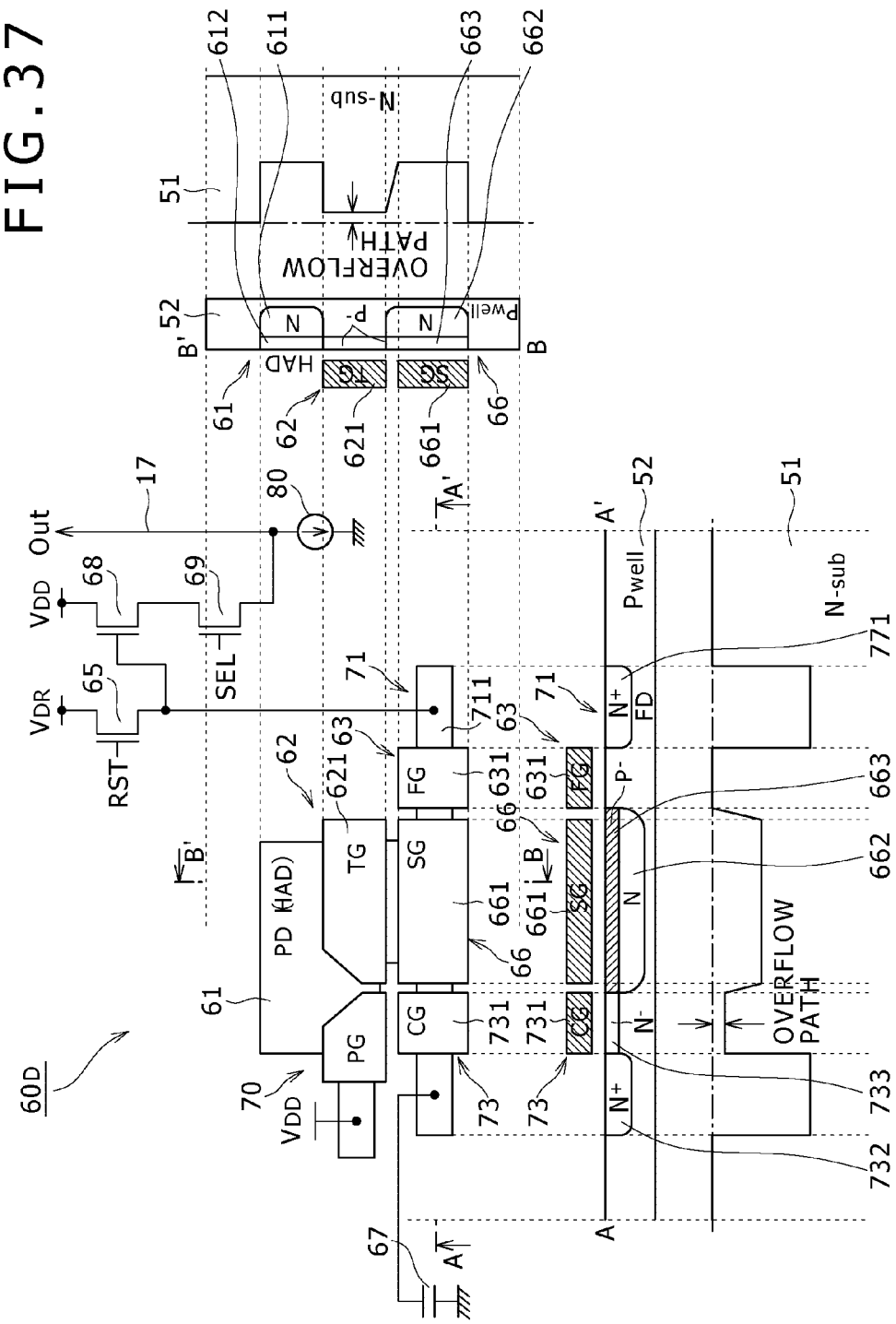
FIG. 37 depicts a schematic view showing a pixel structure of a unit pixel that is consistent with the present invention.

FIG. 37 shows a pixel structure of the unit pixel $60_D$ according to the working example 4. It is to be noted that FIG. 37 particularly shows a plane pattern representative of a pixel layout and sectional views of the plane pattern taken along line A-A' and line B-B'.

Here, in order to avoid overlapping description, only the structure of the fifth transfer gate portion 73 which is different from that of the unit pixel $60_C$ according to the working example 3 is described. Incidentally, in the unit pixel $60_C$ according to the working example 3, when the fifth transfer gate portion 73 is placed into a conducting state within an exposure period, it transfers, in a high illuminance state, photocharge overflowing from the first charge accumulation portion 66 to the second charge accumulation portion 67 so as to be accumulated into the second charge accumulation portion 67.

In contrast, in the unit pixel $60_D$ according to the working example 4, also where the fifth transfer gate portion 73 is in a non-conducting state, an overflow path along which photocharge exceeding a predetermined amount and overflowing from the first charge accumulation portion 66 is transferred to the second charge accumulation portion 67 is formed. The photocharge exceeding a predetermined amount here particularly is photocharge exceeding the saturation charge amount of the first charge accumulation portion 66.

As a pixel structure, the fifth transfer gate portion 73 includes a gate electrode 731 disposed on the substrate surface with a gate insulating film (not shown) interposed therebetween, and the N-type semiconductor region 662 of the first charge accumulation portion 66 is formed as one of the source and drain regions. The second charge accumulation portion 67 is connected at one end thereof to the other of the source and drain regions of the fifth transfer gate portion 73.

The fifth transfer gate portion 73 cooperates with the second transfer gate portion 63 and the gate electrode 661 of the first charge accumulation portion 66 to couple or decouple the potentials of the floating diffusion portion 71, the first charge accumulation portion 66, and the second charge accumulation portion 67.

Further, the fifth transfer gate portion 73 is structured such that an N-type semiconductor region 733 is formed on a surface layer portion of a channel portion. The N-type semiconductor region 733 a little deepens the potential below the gate electrode 731 in comparison with that where the N-type semiconductor region 733 is not formed. Consequently, as apparent from the sectional view taken along line A-A' of FIG. 37, the N-type semiconductor region 733 forms an overflow path for transferring photocharge exceeding the predetermined amount and overflowing from the first charge accumulation portion 66 to the second charge accumulation portion 67 therethrough.

Here, it is significant for the overflow path formed under the first and fifth transfer gate portions 62 and 73 to be formed such that photocharge accumulated in the first charge accumulation portion 66 is transferred to the second charge accumulation portion 67 without leaking to the photodiode 61. Incidentally, the sectional view taken along line B-B' of FIG. 37 illustrates also the potential distribution of the overflow path formed under the gate electrode 621 of the first transfer gate portion 62.

Since the unit pixel $60_D$ according to the working example 4 of the pixel structure described above has the overflow path under the gate electrode 731 of the fifth transfer gate portion 73, photocharge overflowing from the photodiode 61 in a high illuminance state can be accumulated also into the second charge accumulation portion 67. In particular, also when the fifth transfer gate portion 73 is in a non-conducting state, photocharge exceeding the predetermined amount and overflowing from the first charge accumulation portion 66 can be transferred to and accumulated into the second charge accumulation portion 67. Consequently, the saturation charge amount of the first charge accumulation portion can be set smaller than that of the photodiode 61 without using the intermediate potential VM for the driving signal TG as in the working example 3.

Circuit Operation of Unit Pixel

Figure 38:
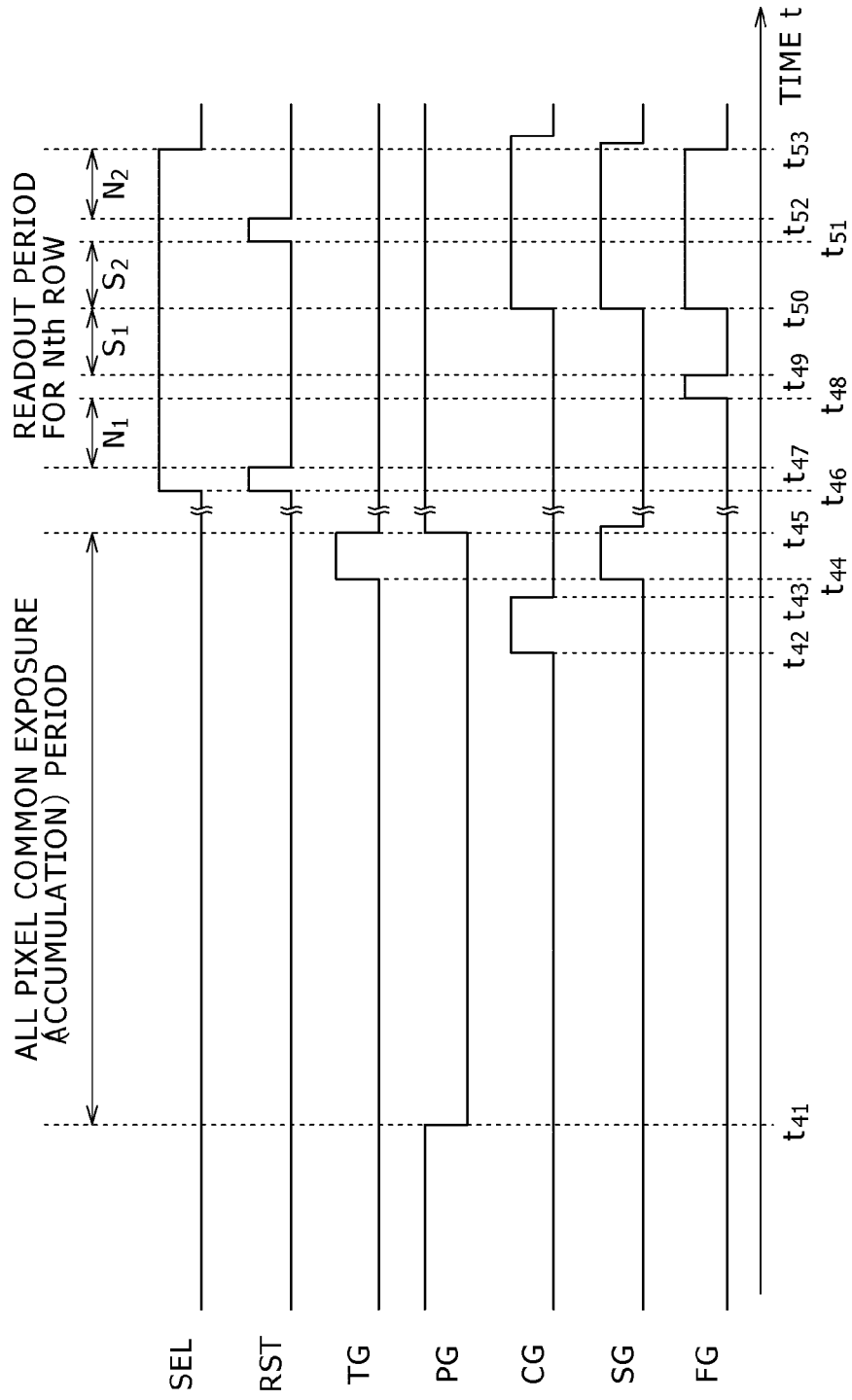
FIG. 38 depicts a timing chart illustrating circuit operation of the unit pixel that is consistent with the present invention.

FIG. 38 illustrates circuit operation of the unit pixel $60_D$ according to the working example 4. FIG. 38 particularly illustrates a timing relationship of the selection signal SEL, reset signal RST, transfer signal TG, charge discharging controlling signal PG, transfer signal CG, transfer signal SG and transfer signal FG.

Circuit operation of the unit pixel $60_D$ according to the working example 4 is different from that of the unit pixel $60_C$ according to the working example 3 only in the timing relationship of the transfer signal CG for driving the fifth transfer gate portion 73 while basic circuit operation is same. Incidentally, the fifth transfer gate portion 73 is placed into a conducting state at the timing of time $t_{42}$ within an exposure period.

3-5. Working Example 5

Circuit Configuration of Unit Pixel

Figure 39:
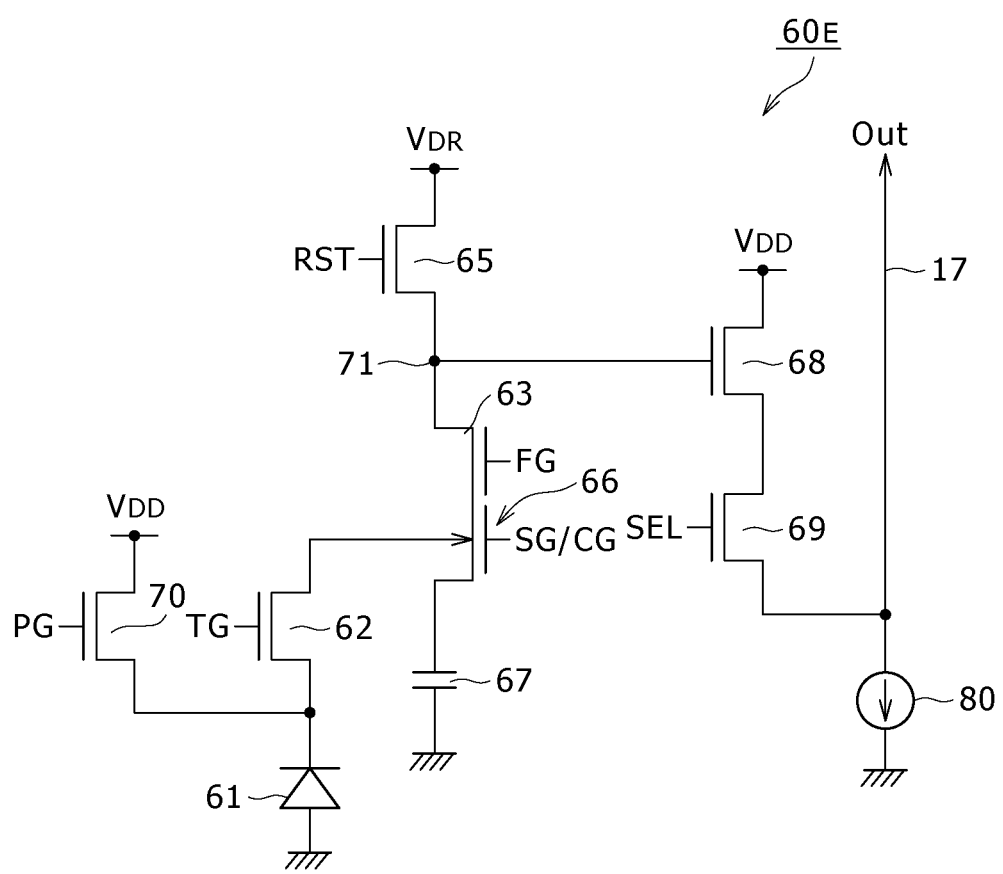
FIG. 39 depicts a circuit diagram showing a circuit configuration of a unit pixel that is consistent with the present invention.

FIG. 39 shows a circuit configuration of a unit pixel $60_E$ according to a working example 5.

The unit pixel $60_E$ according to the working example 5 includes, in addition to a photodiode 61, first and second transfer gate portions 62 and 63, a reset gate portion 65, first and second charge accumulation portions 66 and 67, an amplification transistor 68, a selection transistor 69 and a charge discharging gate portion 70. It is to be noted that the unit pixel $60_E$ according to the working example 5 has a configuration wherein the fifth transfer gate portion 73 of the unit pixel $60_C$ according to the working example 3 is omitted.

The unit pixel $60_E$ according to the working example 5 is configured such that, in place of the fifth transfer gate portion 73, a potential barrier covered with the gate electrode 661 of the first charge accumulation portion 66 is formed between the first charge accumulation portion 66 and the second charge accumulation portion 67. This potential barrier is formed such that it can transfer photocharge overflowing from the first charge accumulation portion 66 to the second charge accumulation portion 67. In the following, a particular pixel structure is described.

Pixel Structure of Unit Pixel

The unit pixel $60_E$ according to the working example 5 is different from the unit pixel $60_C$ according to the working example 43 in the potential barrier provided in place of the fifth transfer gate portion 73. A particular structure of the potential barrier is described below.

Figure 40:
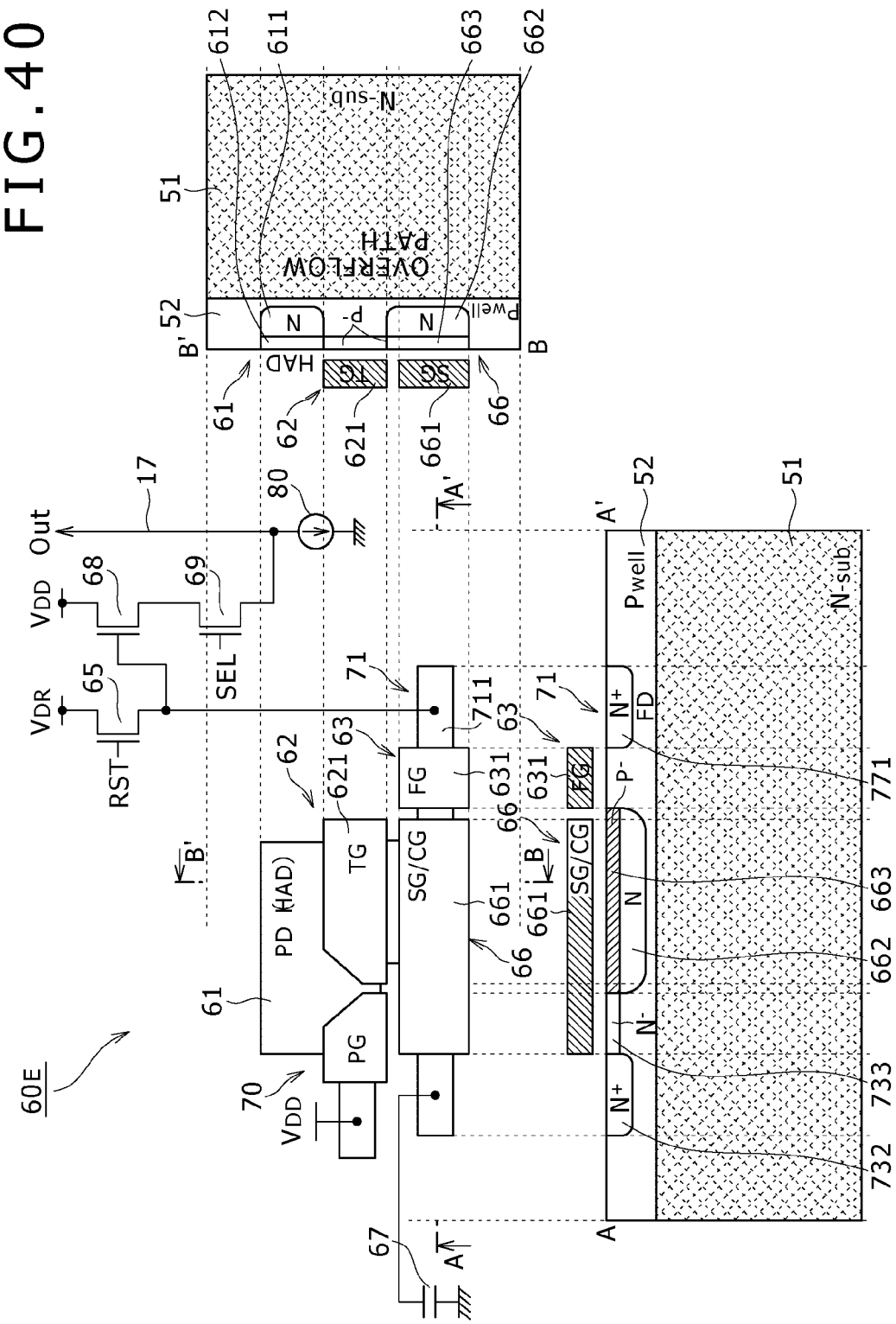
FIG. 40 depicts a schematic view showing a pixel structure of the unit pixel that is consistent with the present invention.

FIG. 40 shows a pixel structure of the unit pixel $60_E$ according to the working example 5. It is to be noted that FIG. 40 particularly shows a plane pattern representative of a pixel layout and sectional views of the plane pattern taken along line A-A' and line B-B'.

Here, in order to avoid overlapping description, only the structure of the potential barrier in which the unit pixel $60_E$ according to the working example 5 is different from the unit pixel $60_C$ according to the working example 3 is described. As apparent from the sectional view of FIG. 40 taken along line A-A', the gate electrode 661 of the first charge accumulation portion 66 is formed such that it extends to the location of the gate electrode 731 of the fifth transfer gate portion 73 in the unit pixel $60_C$ according to the working example 3. Further, an N-type semiconductor region 733 is formed on a surface layer portion of the P-type well 52 immediately below the extension of the gate electrode 661 of the first charge accumulation portion 66. Consequently, a potential barrier covered with the gate electrode 661 of the first charge accumulation portion 66 is formed between the first charge accumulation portion 66 and the second charge accumulation portion 67.

In the pixel structure of the unit pixel $60_E$ according to the working example 5 having the configuration described above, the potential barrier formed from the P-type well 52 and the N-type semiconductor region 733 immediately below the extension of the gate electrode 661 of the first charge accumulation portion 66 acts to transfer photocharge overflowing the first charge accumulation portion 66 to the second charge accumulation portion 67 in place of the fifth transfer gate portion 73. Further, with the unit pixel $60_E$ according to the working example 5, the number of elements per unit pixel can be reduced by one from that of the unit pixel $60_C$ according to the working example 3.

Further, in the pixel structure of the unit pixel $60_E$ according to the working example 5, the second transfer gate portion 63 and the gate electrode 661 of the first charge accumulation portion 66 act to couple or decouple the potentials of the floating diffusion portion 71, first charge accumulation portion 66 and second charge accumulation portion 67.

However, since the fifth transfer gate portion 73 does not exist, the unit pixel $60_E$ according to the working example 5 cannot fully transfer charge from the floating diffusion portion 71 and the first charge accumulation portion 66 to the second charge accumulation portion 67 in comparison with the unit pixel $60_C$ according to the working example 3. Therefore, different from the working example 3, when the gate electrode 661 of the first charge accumulation portion 66 is in a conducting state, channel charge accumulated in the substrate surface cannot be accumulated into the second charge accumulation portion 67 but is accumulated into the floating diffusion portion 71. Since the channel charge accumulated in the floating diffusion portion 71 disappears if a pixel sharing configuration is assumed, there is the possibility that an offset may appear with a pixel signal. Accordingly, although the unit pixel $60_E$ according to the working example 5 can reduce the number of elements per unit pixel, it is difficult for the unit pixel $60_E$ according to the working example 5 to adopt a pixel sharing configuration as in the case of the unit pixel $60_C$ according to the working example 3.

Circuit Operation of Unit Pixel

Figure 41:
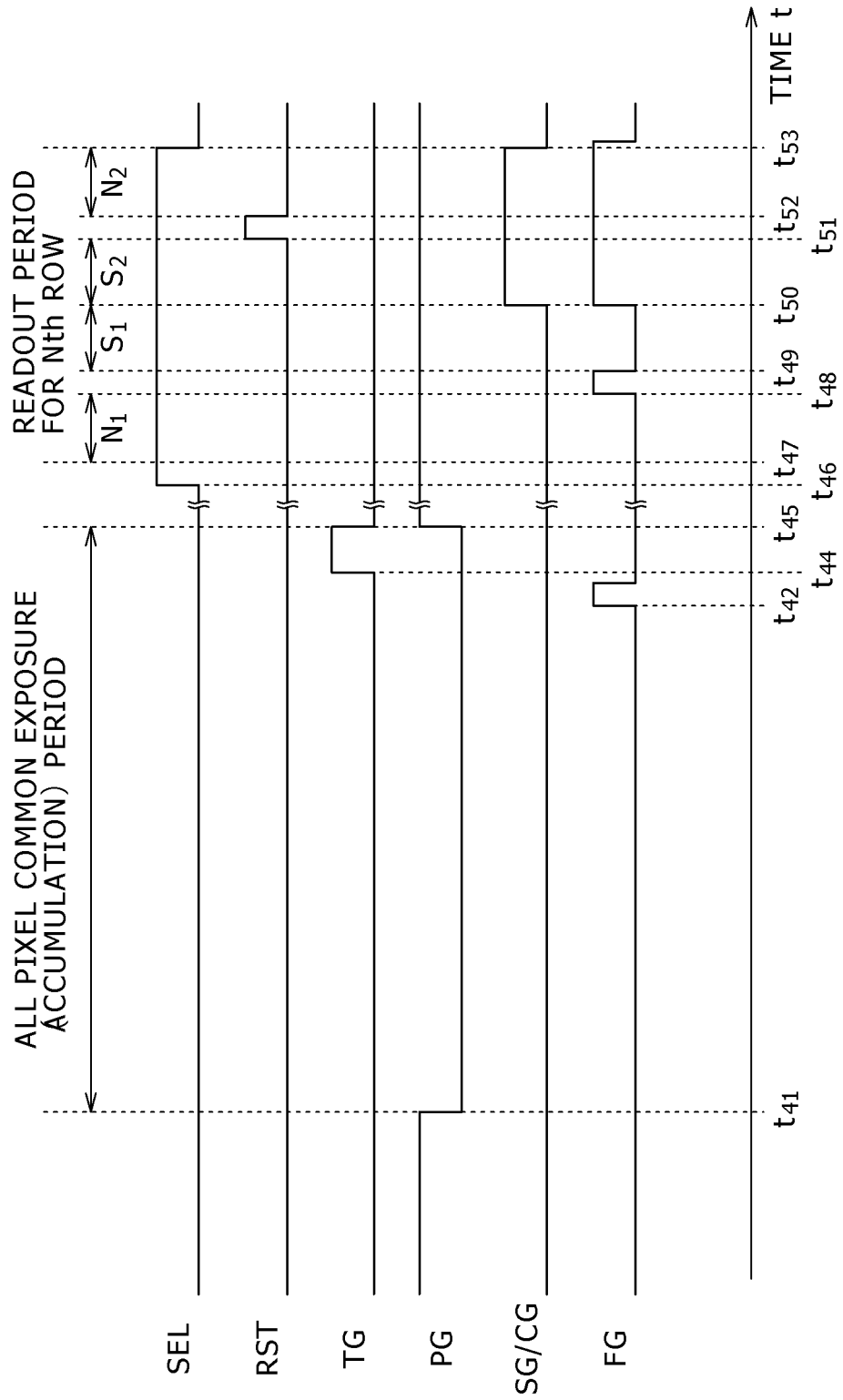
FIG. 41 depicts a timing chart illustrating circuit operation of the unit pixel that is consistent with the present invention.

FIG. 41 illustrates circuit operation of the unit pixel $60_E$ according to the working example 5. FIG. 41 particularly illustrates a timing relationship of the selection signal SEL, reset signal RST, transfer signal TG, charge discharging controlling signal PG, commonly used transfer signal SG/CG and transfer signal FG. Basic circuit operation of the unit pixel $60_E$ according to the working example 5 is similar to that of the unit pixel $60_C$ according to the working example 3 except that it does not include circuit operation regarding the fifth transfer gate portion 73.

Modification 1 to Working Example 5

Figure 42:
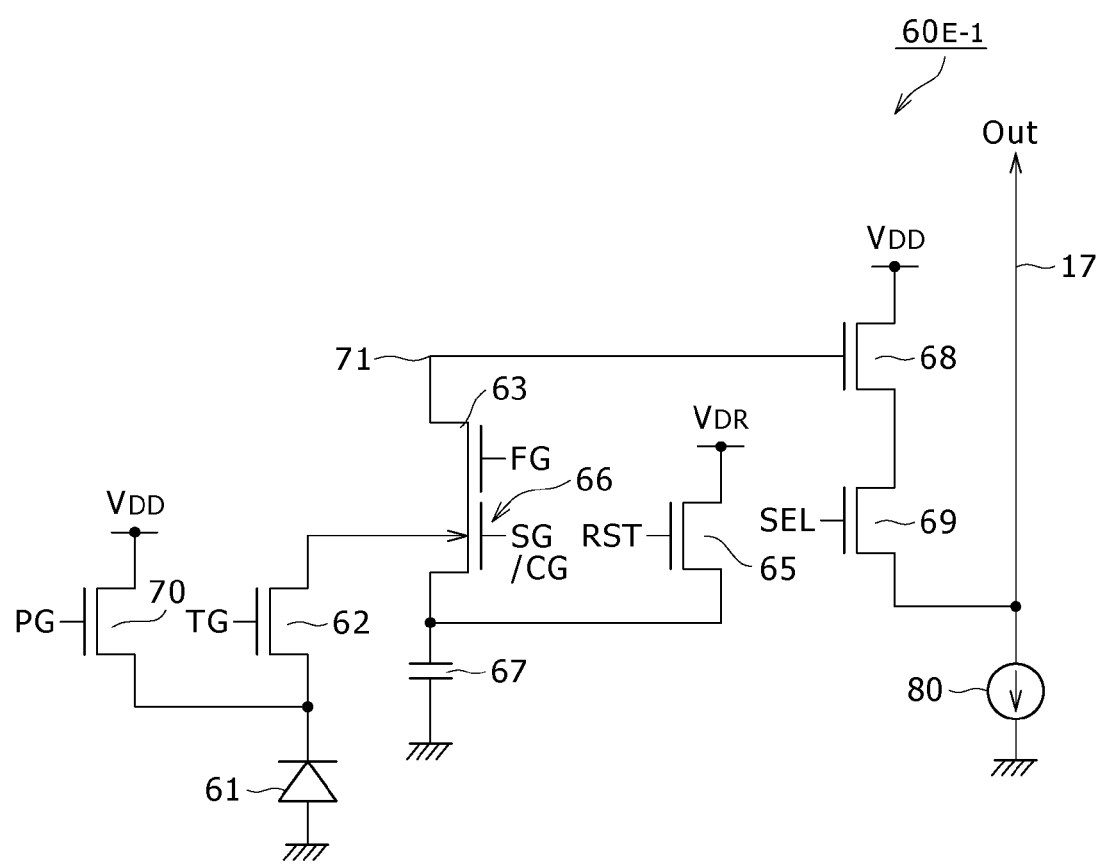
FIG. 42 depicts a circuit diagram showing a circuit configuration of a unit pixel that is consistent with the present invention.

FIG. 42 shows a circuit configuration of a unit pixel $60_{E-1}$ according to a modification 1 to the working example 5.

Also the unit pixel $60_{E-1}$ according to the present modification 1 includes circuit components similar to those of the unit pixel $60_E$ according to the working example 5. In particular, referring to FIG. 42, the unit pixel $60_{E-1}$ according to the present modification 1 includes a photodiode 61, a reset gate portion 65, first and second charge accumulation portions 66 and 67, an amplification transistor 68, a selection transistor 69 and a charge discharging gate portion 70 and additionally includes two transfer gates 62 and 63.

The unit pixel $60_{E-1}$ according to the present modification 1 is different from the unit pixel $60_E$ according to the working example 5 in the connection position of the reset transistor 65 similarly as in the case of the unit pixel $60_{C-1}$ according to the modification 1 to the working example 3. In particular, the reset transistor 65 is connected between the first charge accumulation portion 66 and second charge accumulation portion 67 and the reset voltage $V_{DR}$.

Also with the unit pixel $60_{E-1}$ according to the present modification 1, although circuit operation is different a little, working-effects similar to those of the unit pixel $60_E$ according to the working example 5 can be achieved.

Figure 36:
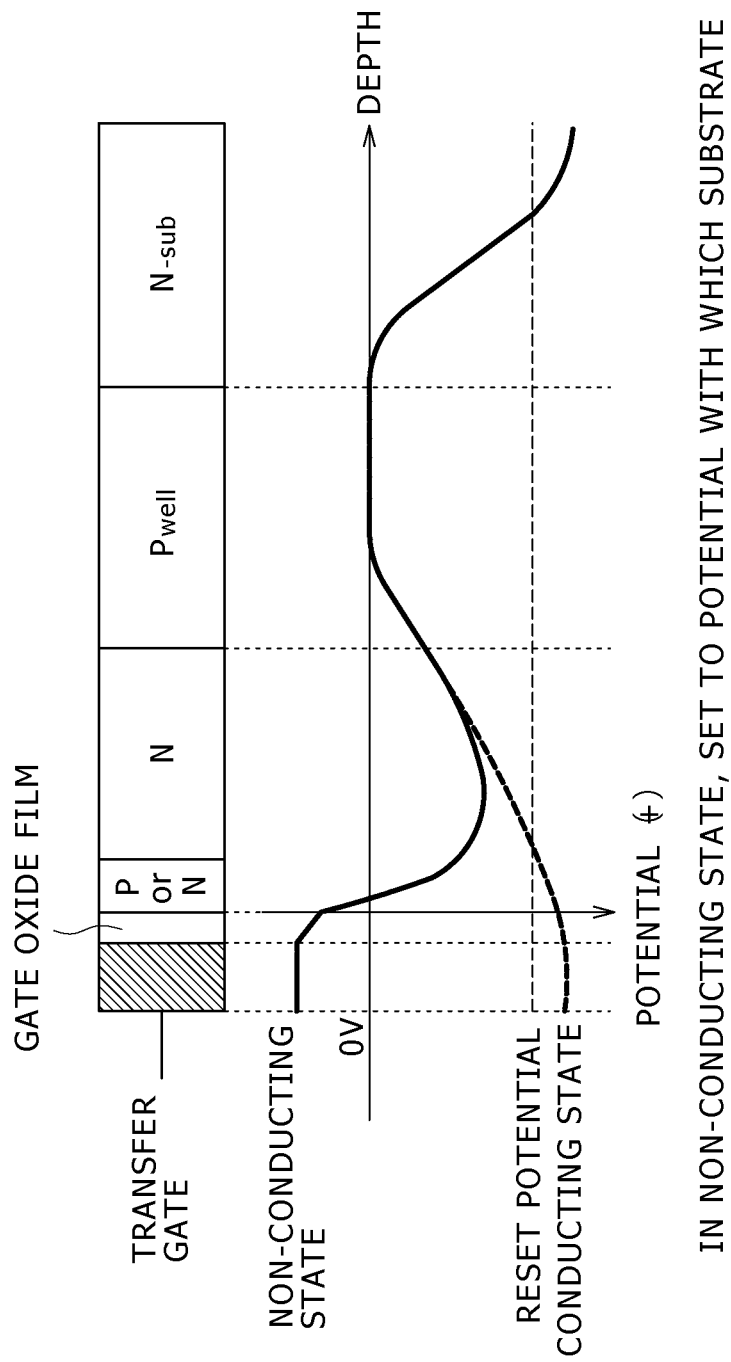
FIG. 36 depicts a potential diagram in a substrate depthwise direction illustrating a required condition for pinning a substrate surface and coupling potentials of a floating diffusion portion and a second charge accumulation portion that is consistent with the present invention.

Here, potentials of the first to third transfer gate portions 62 to 64, fourth transfer gate portion 72, fifth transfer gate portion 73 and gate electrode 661 of the first charge accumulation portion 66 are described. FIG. 36 illustrates potentials in the substrate depthwise direction necessary for pinning the substrate surface and coupling the potentials of the floating diffusion portion 71 and the second charge accumulation portion 67.

The potentials of the gate electrode in a non-conducting state of the first to fifth transfer gate portions 62 to 64, 72 and 73 and the gate electrode 661 of the first charge accumulation portion 66 are set to a potential for placing the substrate surface to a pinned state, for example, to a negative potential, irrespective of the conductive layer immediately under the gate oxide film. By this, it is possible to place the substrate surface into a pinned state to achieve effects in improvements of properties at dark such as dark current, white spots, and so forth.

The substrate surface potential in a conducting state of the second, third and fifth transfer gate portions 63, 64 and 73 and the gate electrode 661 of the first charge accumulation portion 66 in the working examples 3 to 5 is set so as to be higher than the reset voltage $V_{DR}$, that is, than a potential to be applied to the drain of the reset gate portion 65. By this, the potentials of the floating diffusion portion 71 and the second charge accumulation portion 67 or of the floating diffusion portion 71, the first charge accumulation portion 66, and the second charge accumulation portion 67 can be coupled.

3. Noise Removing Process and Calculation Process

From the unit pixel according to the working examples 1 to 5 and the modifications to them described hereinabove, the first reset level $N_1$, first signal level $S_1$, second signal level $S_2$ and second reset level $N_2$ are outputted in this order to the vertical signal line 17. Then, a predetermined noise removing process and signal process are carried out for the first reset level $N_1$, first signal level $S_1$, second signal level $S_2$ and second reset level $N_2$ by a signal processing section at a succeeding stage, for example, by the column processing section 13 or the signal processing section 18 shown in FIGS. 1 to 3. In the following, a noise removing process by the column processing section 13 and a calculation process by the signal processing section 18 at the succeeding stages are described.

First, processing, for example, of a CDS circuit built in the column processing section 13 and serving as a noise removing unit is described. For the CDS circuit, a CDS circuit of a known circuit configuration can be used although it may have any circuit configuration.

Figure 43:
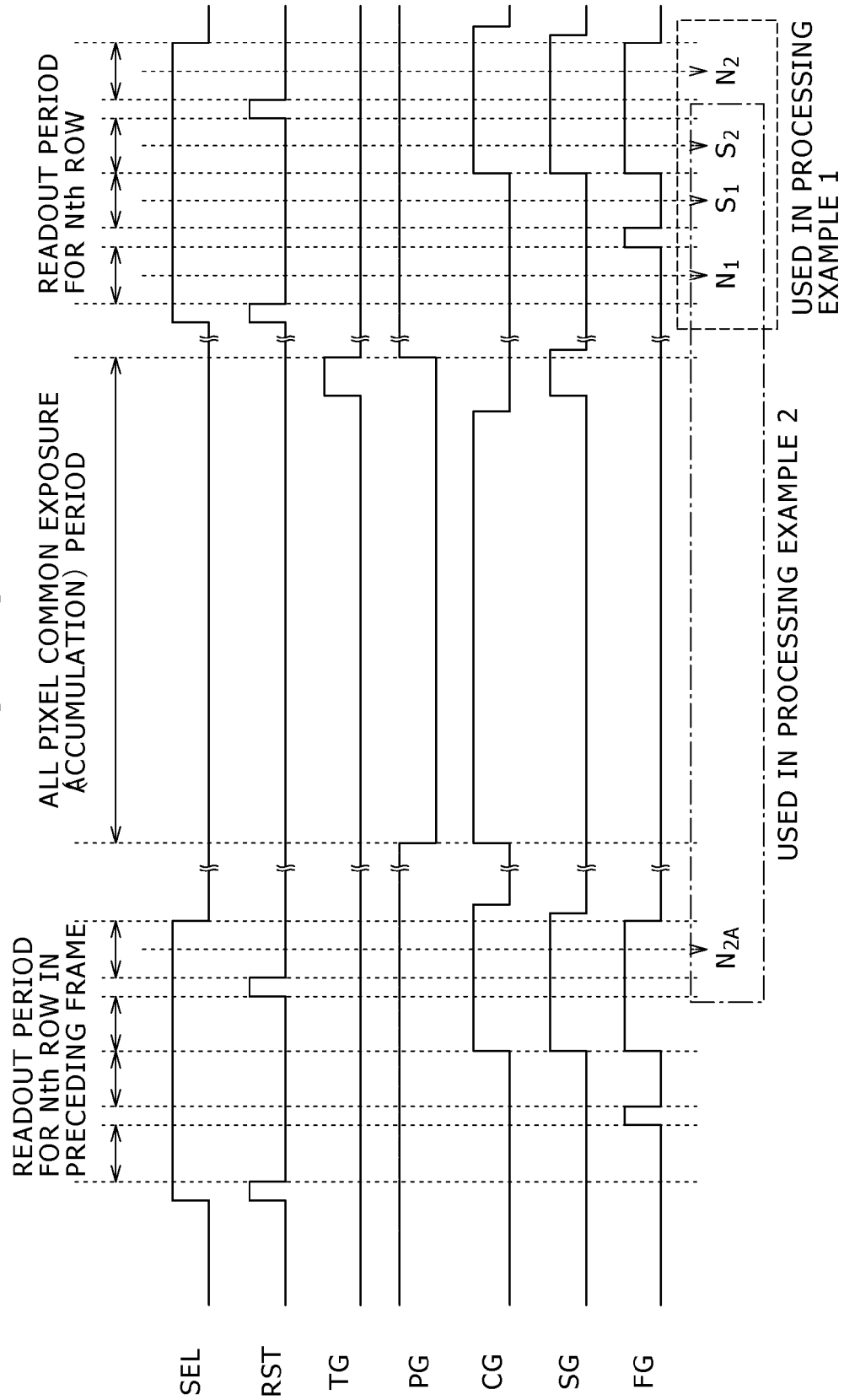
FIG. 43 depicts a timing chart illustrating signal processing that is consistent with the present invention.

FIG. 43 illustrates a noise removing process in the case of a process example 1 and the case of a process example 2 by a column processing section that is consistent with the present invention.

Process Example 1

First, the difference between the first signal level $S_1$ based on photocharge transferred to the floating diffusion portion 71 upon signal readout and the first reset level $N_1$ based on a reset level before photocharge is transferred to the floating diffusion portion 71 is calculated. Further, the second signal level $S_2$ based on photocharge accumulated in the floating diffusion portion 71, first charge accumulation portion 66 and second charge accumulation portion 67 and the second reset level $N_2$ based on a reset level after the floating diffusion portion 71, first charge accumulation portion 66 and second charge accumulation portion 67 are reset is calculated. Where the first difference is represented by $SN_1$ and the second difference is represented by $SN_2$, the first and second differences $SN_1$ and $SN_2$ are given by $SN_1=S_1-N_1$ and $SN_2=S_2-N_2$, respectively.

In this manner, in the process example 1, a CDS process for removing reset noise and fixed pattern noise unique to a pixel such as a threshold value dispersion and so forth of an amplification transistor in the pixel is carried out. For the signals $S_2$ and $N_2$ outputted later, a CDS process by which reset noise is not removed although fixed pattern noise unique to the pixel such as the threshold value dispersion of the amplification transistor in the pixel is removed is carried out. However, since the calculation process does not require use of a frame memory, there is an advantage that simplification in circuit configuration and reduction in cost can be anticipated.

Process Example 2

In the process example 2, information of a preceding frame is used, and therefore, a storage unit, for example, a frame memory is required. Accordingly, the calculation process of the process example 2 is carried out, for example, by the signal processing section 18 using the data storage section 19 as a storage unit or by an external DSP process using a frame memory.

In particular, the difference between the first signal level $S_1$ based on photocharge transferred to the floating diffusion portion 71 upon signal readout and the first reset level $N_1$ based on a reset level prior to the transfer of the photocharge to the floating diffusion portion 71 is calculated first. Then, the difference between the second signal level $S_2$ based on photocharge accumulated in the floating diffusion portion 71, first charge accumulation portion 66 and second charge accumulation portion 67 and a voltage signal $N_{2A}$ in the preceding frame is calculated. This voltage signal $N_{2A}$ is a signal based on the reset level after the photocharge accumulated in the floating diffusion portion 71, first charge accumulation portion 66 and second charge accumulation portion 67 in the preceding frame is reset. Where the first difference is represented by $SN_1$ and the second difference is represented by $SN_2$, then the first and second differences $SN_1$ and $SN_2$ are given by $SN_1=S_1-N_1$ and $SN_2=S_2-N_2$, respectively.

In this manner, in the process example 2, a CDS process for removing reset noise and fixed pattern noise unique to a pixel such as a threshold value dispersion and so forth of an amplification transistor in the pixel is carried out for the signals $S_2$ and $N_2$ outputted later. In the case of the present process example 2, although a storage unit such as a frame memory is required, there is an advantage that reset noise can be reduced significantly in comparison with the process example 1.

Process Example 3

Now, a calculation process by the signal processing section 18 is described. First, when the first difference described above falls within a predetermined range, the ratio between the first difference and the second difference is calculated as a gain for each pixel, for each plurality of pixels, for each color, for each particular pixel among shared pixel units or uniformly for all pixels to produce a gain table. Then, the product of the second difference and the gain table is calculated as the calculation value of the second difference.

Here, where the first difference is represented by $SN_1$, the second difference by $SN_2$, the gain by G and the calculation value of the second difference $SN_2$ by $SN_{2'}$, then the gain G and the calculation value $SN_{2'}$ of the second difference $SN_2$ can be determined based on the following expressions (5) and (6), respectively:

$$G = SN_1 / SN_2 \qquad (5)$$
$$= (C_{fd} + C_{gs} + C_{cap})/C_t$$
$$SN'_2 = G \times SN_2 \qquad (6)$$

where $C_{fd}$ is the capacitance value of the floating diffusion portion 71, $C_{gs}$ the capacitance value of the first charge accumulation portion 66, and $C_{cap}$ the capacitance value of the second charge accumulation portion 67. The gain G is equivalent to the capacitance ratio.

Figure 44:
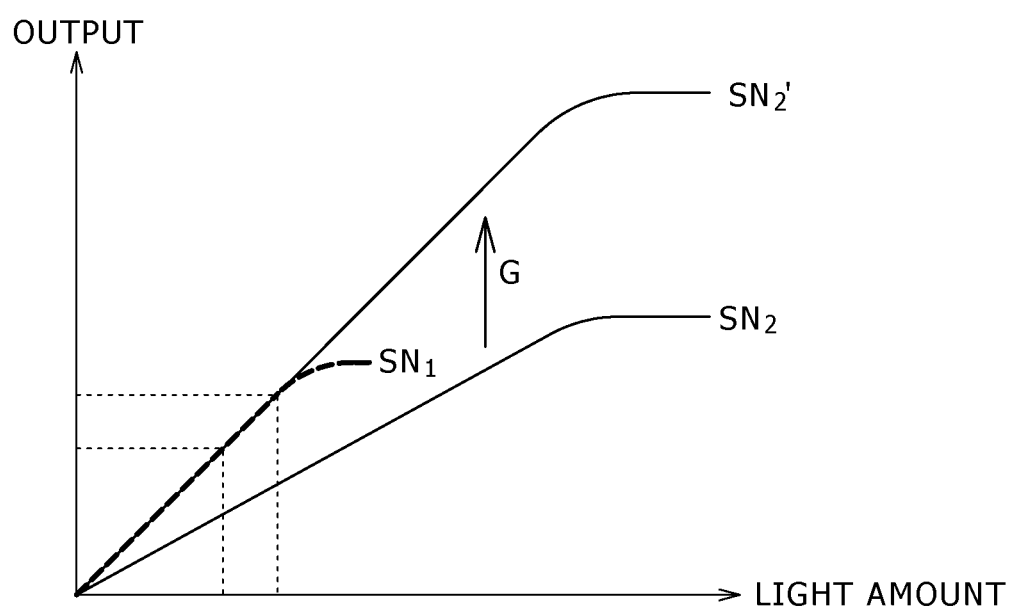
FIGS. 44, 45A and 45B depict diagrammatic views illustrating different incident light amount-output characteristics that are consistent with the present invention.

A relationship of the first difference $SN_1$, second difference $SN_2$ and calculation value $SN_{2'}$ of the second difference $SN_2$ to the incident light amount is illustrated in FIG. 44.

Figure 45A:
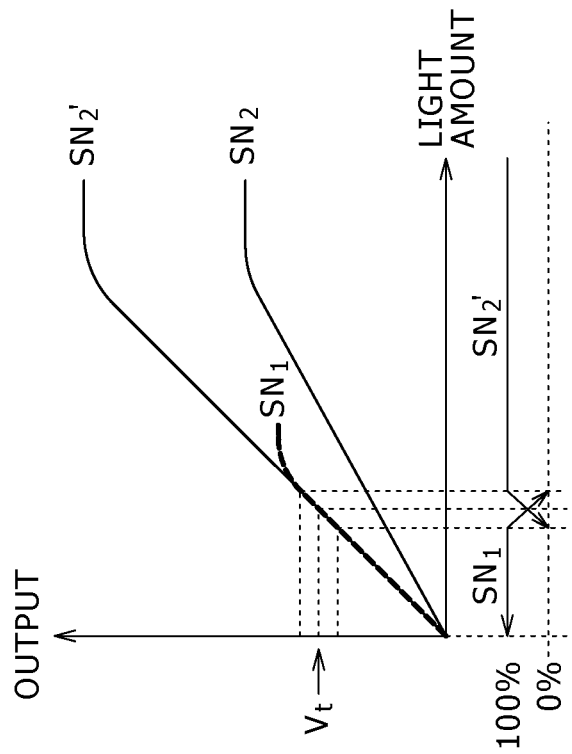

Then, a predetermined threshold value $V_t$ set in advance as seen in FIG. 45A is used. The predetermined threshold value $V_t$ is set in advance before the first difference $SN_1$ in the optical response characteristic becomes saturated and within a range within which the optical response characteristic exhibits a linear variation.

Then, if the first difference $SN_1$ does not exceed the predetermined threshold value $V_t$, then the first difference $SN_1$ is outputted as a pixel signal SN of the processing object pixel. In particular, where $SN_1 < V_t$, $SN=SN_1$ ($SN_1$ is substituted into SN). Where the first difference $SN_1$ exceeds the predetermined threshold value $V_t$, the calculation value $SN_{2'}$ of the second difference $SN_2$ is outputted as the pixel signal SN of the processing object pixel. In other words, where $V_t \le SN_1$, $SN=SN_{2'}$ ($SN_{2'}$ is substituted into SN).

Process Example 4

Figure 45B:
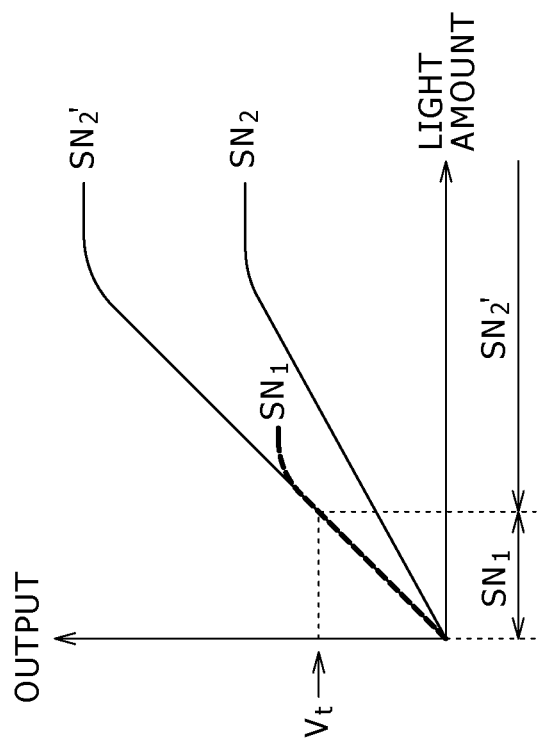

In the following calculation process, as seen in FIG. 45B, the value of the first difference $SN_1$ where it is within a predetermined range and the calculation value $SN_{2'}$ of the second difference $SN_2$ are composed and outputted as the pixel signal SN.

For example, within a range around the predetermined threshold value $V_t$ as a reference, the composition ratio between the first difference $SN_1$ and the second difference $SN_2$ is varied stepwise as given below. The predetermined threshold value $V_t$ is set in advance before the first difference $SN_1$ in the optical response characteristic becomes saturated and within a range within which the optical response characteristic exhibits a linear variation as described hereinabove.

Where $SN_1 < SN_1 \times 0.90, SN=SN_1$

Where $V_t \times 0.90 \le SN_1 < V_t \times 0.94,$ $SN=0.9 \times SN_1 + 0.1 \times SN_{2'}$ Where $V_t \times 0.94 \le SN_1 < V_t \times 0.98,$ $SN=0.7 \times SN_1 + 0.3 \times SN_{2'}$ Where $V_t \times 0.98 \le SN_1 < V_t \times 1.02,$ $SN=0.5 \times SN_1 + 0.5 \times SN_{2'}$ Where $V_t \times 1.02 \le SN_1 < V_t \times 1.06,$ $SN=0.3 \times SN_1 + 0.7 \times SN_{2'}$ Where $V_t \times 1.06 \le SN_1 < V_t \times 1.10,$ $SN=0.1 \times SN_1 + 0.9 \times SN_{2'}$ Where $V_t \times 1.10 \le SN_1, SN=SN_{2'}$ By carrying out such a calculation process as described above, changeover from a signal in a low illuminance state to a signal in a high illuminance state can be carried out smoothly.

4. Reference Example

In the embodiment described above, the CMOS image sensor is characterized principally in that it includes a unit pixel having two first and second charge accumulation portions 66 and 67 therein and the second charge accumulation portion 67 is formed from a capacitor having a capacitance value per unit area higher than that of the first charge accumulation portion 66. However, even where the capacitance values per unit area of the two first and second charge accumulation portions 66 and 67 are equal, the effect that the dynamic range can be expanded can be achieved. This is described as a reference example based on the working example 3.

Within a period set at a predetermined ratio to the exposure period of the photodiode 61 within the exposure period of the photodiode 61, the second transfer gate portion 63 is placed into a conducting state so that photocharge exceeding a predetermined amount and flowing out from the photodiode 61 is discharged.

Figure 46:
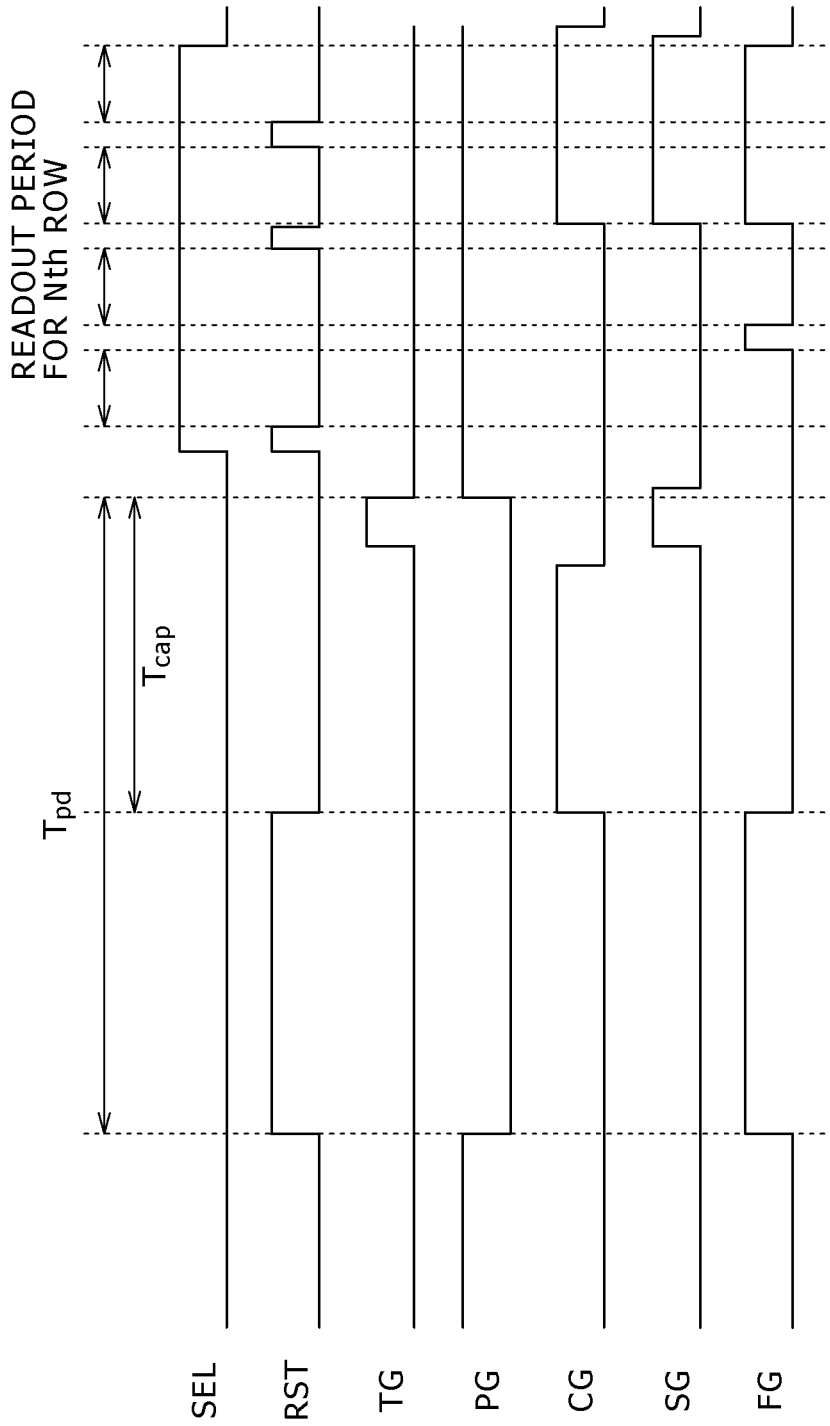
FIG. 46 depicts a timing chart illustrating circuit operation of a unit pixel that is consistent with the present invention.

Here, the exposure period of the photodiode 61 is represented by $T_{pd}$, and the period within which photocharge overflowing from the photodiode 61 is to be accumulated into the second charge accumulation portion 67 is represented by $T_{cap}$. A unit pixel is operated in accordance with the timing chart shown in FIG. 46 to apply restriction to the exposure period $T_{cap}$ in the second charge accumulation portion 67. By this operation, information on the high illuminance side can be compressed, and even if the capacitance value of the second charge accumulation portion 67 is lower and approximately equal to that of the first charge accumulation portion 66, the dynamic range can be expanded.

After noise components in a low illuminance state and a signal component are read out, the floating diffusion portion 71 is reset once, and photocharge accumulated in the second charge accumulation portion 67 and overflowing the photodiode 61 is read out as a signal on the high illuminance side. Different from the other working examples, since the floating diffusion portion 71 is reset once, the signal on the high illuminance side does not include the photocharge accumulated in the first charge accumulation portion 66.

The voltage signal based on the photocharge transferred to the floating diffusion portion 71 upon signal readout is represented by $S_1$, the voltage signal based on the reset level before the photocharge is transferred to the floating diffusion portion 71 is represented by $N_1$, and the first difference is represented by $SN_1$. Further, the voltage signal based on the photocharge accumulated in the floating diffusion portion 71, first charge accumulation portion 66 and second charge accumulation portion 67 where the floating diffusion portion 71 is reset immediately before reading out is represented by $S_3$. Furthermore, the voltage signal of the reset level or corresponding thereto of the floating diffusion portion 71, first charge accumulation portion 66 and second charge accumulation portion 67 where the floating diffusion portion 71 is reset is represented by $N_2$, the third difference is represented by $SN_3$, and the calculation value of the third difference $SN_3$ is represented by $SN_{3'}$. In this instance, the calculation value $SN_{3'}$ can be calculated in the following manner:

$$SN_1 = S_1 - N_1$$

$$SN_3 = S_3 - N_2$$

$$G = SN_1 / SN_2$$
$$= (C_{fd} + C_{sg} + C_{cap})/C_{fd}$$

$$SN'_3 = G \times SN_3 \times T_{pd}/T_{cap}$$

Where the predetermined threshold value set in advance before the first difference $SN_1$ in the optical response characteristic becomes saturated and within a range within which the optical response characteristic exhibits a linear variation is represented by $V_t$ and the pixel signal of the processing object pixel is represented by SN, the pixel signal SN is outputted in the following manner:
where $SN_1 < V_t$, $SN = SN_1$
($SN_1$ is substituted into SN)
where $V_t \le SN_1$, $SN = SN_{3'}$
($SN_{3'}$ is substituted into SN)

5. Modification Example

In the working example 3 described hereinabove, photocharge overflowing from the photodiode 61 in a high illuminance state is accumulated into the first charge accumulation portion 66 through the first transfer gate portion 62 and is further accumulated into the second charge accumulation portion 67 through the fifth transfer gate portion 73. In other words, the working example 3 is characterized in that photocharge overflowing from the photodiode 61 in a high illuminance state is accumulated into the photodiode 61 and is accumulated also into the first and second charge accumulation portions 66 and 67 in addition to the photodiode 61.

Figure 47A:
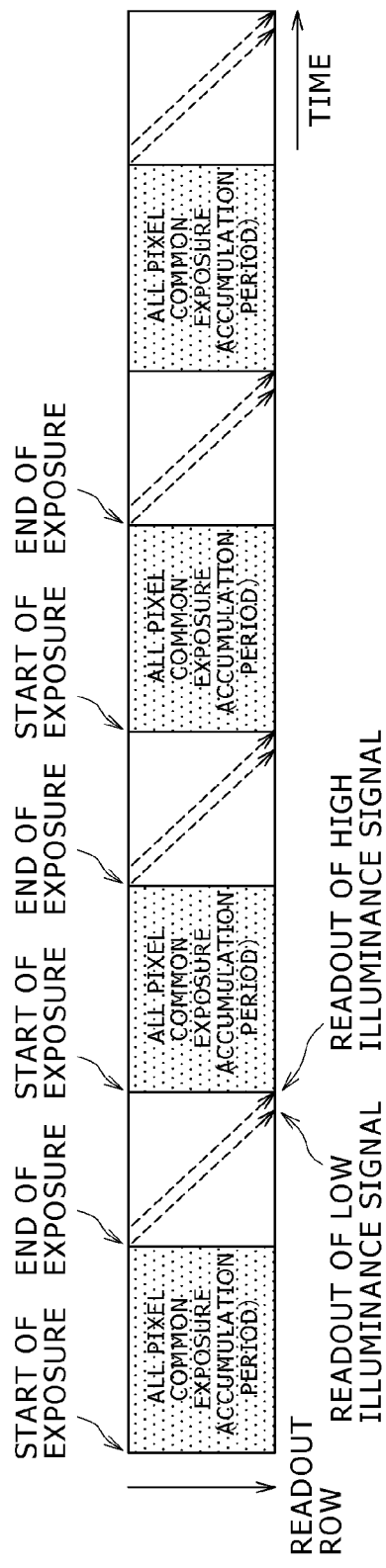
FIGS. 47A and 47B depict diagrammatic views illustrating operation of a unit pixel that are consistent with the present invention.

However, with the pixel configuration according to the working example 3, exposure cannot be carried out within a readout period of photocharge as apparent from FIG. 47A which illustrates one embodiment of the operation of the pixel that is consistent with the present invention. Therefore, a pixel configuration wherein photocharge is accumulated only into the photodiode 61 is proposed as a modification.

Also in this instance, the essence of the present invention that photocharge after read out from the photodiode 61 is accumulated selectively using the first charge accumulation portion 66 and the second charge accumulation portion 67 is maintained. In particular, photocharge overflowing from the first charge accumulation portion 66 after read out from the photodiode 61 is accumulated into the second charge accumulation portion 67. To this end, naturally an overflow path is required between the first charge accumulation portion 66 and the second charge accumulation portion 67.

Figure 47B:
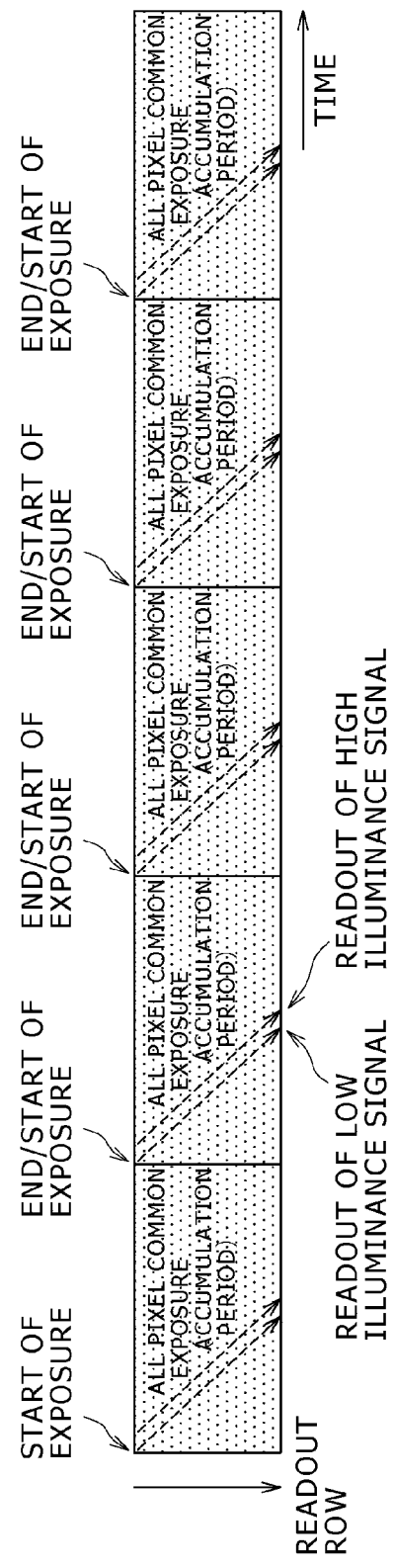

By adopting the pixel configuration wherein photocharge is accumulated only into the photodiode 61, since exposure can be carried out within a photocharge readout period as seen from FIG. 47B which illustrates operation of the pixel, seamless operation which includes no cut within the exposure period during moving picture image pickup can be implemented. However, since the photocharge is accumulated only into the photodiode 61, the dynamic range is limited by the saturation charge amount of the photodiode 61. Therefore, such great expansion of the dynamic range as in the working example 3 cannot be anticipated.

However, by accumulating photocharge selectively using the first charge accumulation portion 66 and the second charge accumulation portion 67, which is the essence of the present invention, the total area of the charge accumulation portion for accumulating photocharge can be reduced. Accordingly, since the area of the photodiode 61 can be expanded by an amount by which the total area can be reduced, the dynamic range can be expanded indirectly.

Further, while, in the embodiment of the present invention described above, the present invention is applied to a CMOS image sensor wherein unit pixels are disposed in a matrix, the present invention is not limited to a CMOS image sensor. In other words, the present invention can be applied to various solid-state image pickup apparatus of the X-Y address type wherein unit pixels are disposed two-dimensionally in rows and columns.

Further, the present invention can be applied not only to solid-state image pickup apparatus which detect a distribution of the incident light amount of visible light and picks up the same as an image but also to solid-state image pickup apparatus which pick up a distribution of the incident amount of infrared rays, X-rays, particles or the like as an image.

It is to be noted that the solid-state image pickup apparatus may be formed as a one-chip apparatus or may be formed as a module in which an image pickup section and a signal processing section or an optical system are packaged collectively and which has an image pickup function.

6. Electronic Device

The present invention is not limited to a solid-state image pickup apparatus but can be applied to image pickup apparatus such as a digital still camera and a video camera, portable terminal apparatus having an image pickup function such as a portable telephone set, and various electronic device which use a solid-state image pickup apparatus in an image fetching section, that is, a photoelectric conversion section, such as a copying machine which uses a solid-state image pickup apparatus in an image reading section. It is to be noted that an image pickup apparatus may have a form of the module which is incorporated in an electronic device, that is, may have a form of a camera module.

Figure 48:
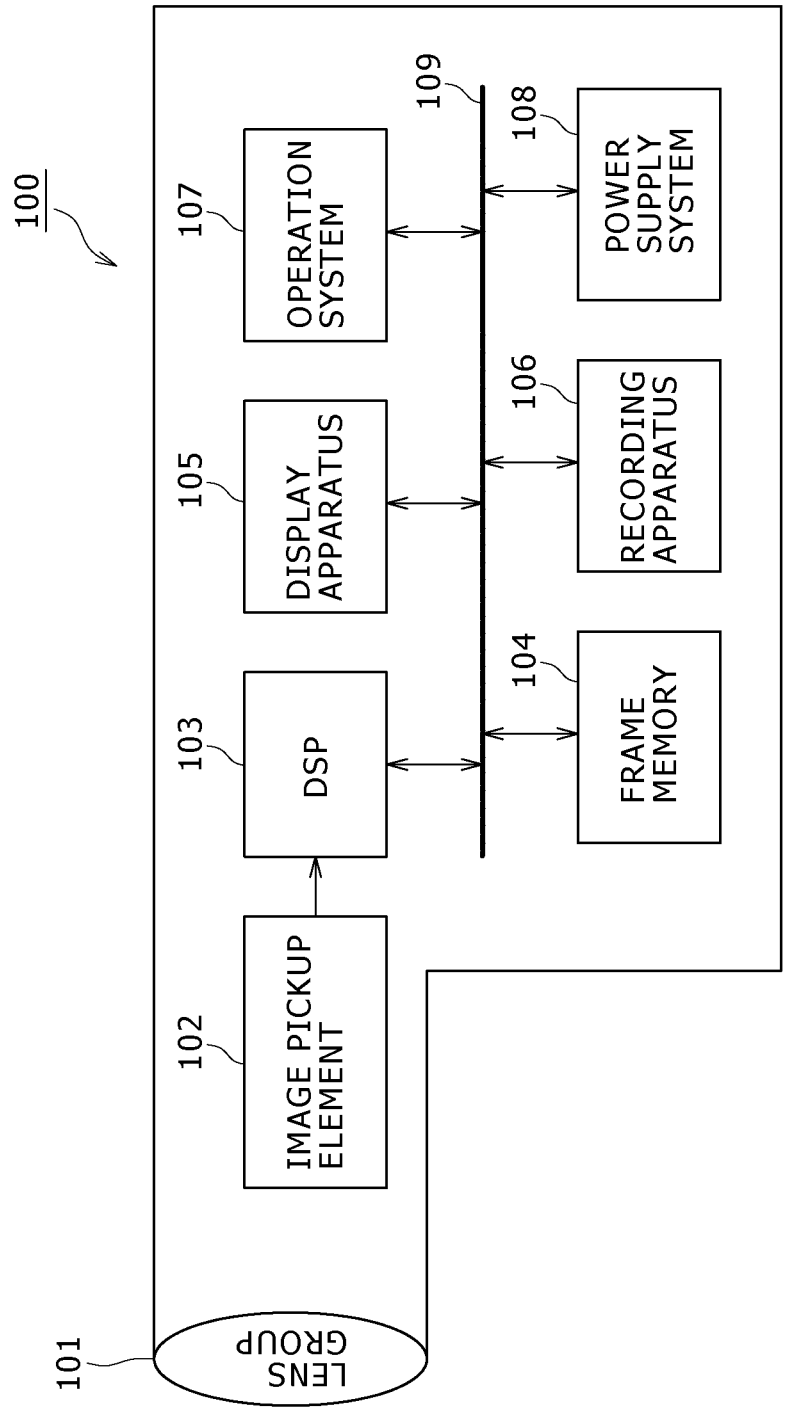
FIG. 48 depicts a block diagram showing one embodiment of a configuration of an image pickup apparatus that is consistent with the present invention.

FIG. 48 shows an image pickup apparatus consistent with the present invention.

Referring to FIG. 48, the image pickup apparatus 100 according to the embodiment of the present invention includes an optical system including a lens group 101 and so forth, an image pickup element, that is, an image pickup device 102, a DSP circuit 103, a frame memory 104, a display apparatus 105, a recording apparatus 106, an operation system 107 and a power supply system 108. The DSP circuit 103, frame memory 104, display apparatus 105, recording apparatus 106, operation system 107 and power supply system 108 are connected to each other by a bus line 109.

The lens group 101 takes in incident light, that is, image light from an image pickup object and forms an image of the light on an image face of the image pickup element 102. The image pickup element 102 coverts the light amount of the incident light of the image formed on the image face of the image pickup element 102 by the lens group 101 into an electric signal in a unit of a pixel and outputs the electric signal as a pixel signal.

The display apparatus 105 is formed from a panel type display unit such as a liquid crystal display apparatus or an organic EL (electroluminescence) display apparatus and displays a dynamic picture or a still picture picked up by the image pickup element 102. The recording apparatus 106 records the dynamic picture or the still picture picked up by the image pickup element 102 on a recording medium such as a video tape or a DVD (Digital Versatile Disk).

The operation system 107 issues an operation instruction in regard to various functions which the image pickup apparatus has in response to an operation thereof by a user. The power supply system 108 suitably supplies various powers, which are used as operation power supplies for the DSP circuit 103, frame memory 104, display apparatus 105, recording apparatus 106 and operation system 107 to the supply objects.

The image pickup apparatus of the configuration described above can be used as an image pickup apparatus of a video camera, a digital still camera, a camera module for a mobile device such as a portable telephone set and so forth. By using the solid-state image pickup apparatus such as the CMOS image sensor 10 according to the embodiment described hereinabove as the image pickup element 102 in the image pickup apparatus, the following working-effects can be achieved.

In particular, the CMOS image sensor 10 according to the embodiment described hereinabove can implement a picked up image free from distortion by global exposure. Accordingly, the CMOS image sensor 10 can be implemented as an image pickup apparatus which is suitable for use for image pickup of an image pickup object moving at a high speed which cannot permit image distortion or for sensing applications which require simultaneity of a picked up image.

Further, the CMOS image sensor 10 according to the embodiment described hereinabove can assure a greater saturation charge amount without deteriorating the picture quality of a picked up image at dark or in a low illuminance state in comparison with the existing art which achieves global exposure. In other words, the capacitance value with which photocharge can be accumulated can be increased. Then, if a greater saturation charge amount can be assured, then if the saturation charge amount may be equal, then the unit pixel size can be reduced by an amount corresponding to an amount by which a greater saturation charge amount can be assured. Consequently, increase of the number of pixels can be anticipated. Accordingly, improvement in picture quality of a picked up image can be anticipated.

The present invention is not restricted to the foregoing description. There is no restriction to the pixel structure to the overflow path, the conductive layer of the surface layer portion of the embedded MOS capacitor, and also the circuit diagrams, timing charts and so forth can be modified in various manners without departing from the subject matter of the present invention.

It should be understood by those skilled in the art that various modifications, combinations, sub-combinations and alterations may occur depending on design requirements and other factors insofar as they are within the scope of the appended claims or the equivalents thereof.

What is claimed:

1. A solid-state imaging device comprising:
a photodiode;
a floating diffusion region;
a first charge accumulation region distinct from the floating diffusion region;
a second charge accumulation region distinct from the floating diffusion region;
a first transfer gate between the photodiode and the first charge accumulation region; and
a second transfer gate between the first and second charge accumulation region and the floating diffusion region,
wherein,
a charge generated in the photodiode is distributed into the first charge accumulation region and the second charge accumulation region based on an amount of charge,
the charge is transferred among the first and second charge accumulation regions by application of respective signals to the first and second charge transfer gates,
the first charge accumulation region is a first capacitor of a first type and the second charge accumulation region is a second capacitor of a second type that is different from the first type, and
a capacitance value per unit area of the second capacitor is higher than a capacitance value per unit area of the first capacitor.

2. The solid-state imaging device of claim 1, wherein a capacitance of the second capacitor is higher than a capacitance of the first capacitor.

3. The solid-state imaging device of claim 1 further comprising:
a third transfer gate between the first charge accumulation region and the floating diffusion region.

4. The solid-state imaging device of claim 1, wherein the first transfer gate has an overflow path via which a portion of the charge generated in the photodiode and exceeding a predetermined amount is transferred.

5. The solid-state imaging device of claim 3 further comprising:
a reset line;
a reset unit electrically coupled to the floating diffusion region and the reset line;
a signal line;
an amplifying unit electrically coupled with the floating diffusion region and the signal line; and
a selection unit electrically coupled with the amplifying unit and the signal line.

6. The solid state imaging device of claim 3 further comprising a fourth transfer gate between the photodiode and the second charge accumulation region.

7. The solid state imaging device of claim 1, wherein the first capacitor includes an embedded MOS capacitor.

8. The solid state imaging device of claim 7, wherein the second capacitor includes a stack type capacitor.

9. The solid state imaging device of claim 1, wherein a charge in a low illuminance state is accumulated in the first charge accumulation region.

10. The solid state imaging device of claim 1, wherein a charge in a high illuminance state is accumulated in the second charge accumulation region.

11. An electronic apparatus comprising:
a solid state imaging device including (a) a photodiode, (b) a floating diffusion region, (c) a first charge accumulation region distinct from the floating diffusion region, (d) a second charge accumulation region distinct from the floating diffusion region, (e) a first transfer gate between the photodiode and the first charge accumulation region, and (f) a second transfer gate between the second charge accumulation region and the floating diffusion region,
wherein,
- a charge generated in the photodiode is distributed into the first charge accumulation region and the second charge accumulation region based on an amount of charge,
- the charge is transferred among the first and second charge accumulation regions by application of respective signals to the first and second charge transfer gates,
- the first charge accumulation region is a first capacitor of a first type and the second charge accumulation region is a second capacitor of a second type that is different from the first type, and
- a capacitance value per unit area of the second capacitor is higher than a capacitance value per unit area of the first capacitor.

12. The electronic apparatus of claim 11, further comprising a lens unit positioned in front of the solid state imaging device.

13. The electronic apparatus of claim 11, wherein the solid state imaging device is included in a camera.

14. The solid-state imaging device of claim 1, wherein:
- the first capacitor includes an embedded MOS capacitor, and
- the second capacitor includes a stack type capacitor.

15. The solid-state imaging device of claim 1, wherein the second capacitor includes at least one of a planar type MOS capacitor, a junction type capacitor, a stack type capacitor, a trench type capacitor, or any combination thereof.

16. The solid-state imaging device of claim 1, wherein the second capacitor is configured as a plurality of different capacitor structures such that the capacitance value per unit area of the second capacitor is increased.

* * * * *